(12) United States Patent
Robertson et al.

(10) Patent No.: US 10,053,384 B2
(45) Date of Patent: Aug. 21, 2018

(54) SYSTEM AND PROCESS FOR REMOVING NITROGEN COMPOUNDS AND ODORS FROM WASTEWATER AND WASTEWATER TREATMENT SYSTEM

(71) Applicant: Biofilter Systems, LLC, Gainesville, FL (US)

(72) Inventors: Mark B. Robertson, Gainesville, FL (US); David O'Keefe, Gainesville, FL (US); John D. Cox, Gainesville, FL (US); Daniel T. White, Gainesville, FL (US)

(73) Assignee: Biofilter Systems, LLC, Gainesville, FL (US)

( * ) Notice: Subject to any disclaimer, the term of this patent is extended or adjusted under 35 U.S.C. 154(b) by 252 days.

(21) Appl. No.: 14/986,008

(22) Filed: Dec. 31, 2015

(65) Prior Publication Data

US 2016/0115059 A1 Apr. 28, 2016

Related U.S. Application Data

(63) Continuation of application No. 13/830,480, filed on Mar. 14, 2013, now Pat. No. 9,272,931, which is a (Continued)

(51) Int. Cl.
*C02F 9/00* (2006.01)
*C02F 3/20* (2006.01)
(Continued)

(52) U.S. Cl.
CPC ............ *C02F 9/00* (2013.01); *B01D 21/01* (2013.01); *B01D 29/117* (2013.01);
(Continued)

(58) Field of Classification Search
CPC ..... C02F 9/00; C02F 3/14; C02F 3/305; C02F 1/766; C02F 1/68; C02F 1/5281;
(Continued)

(56) References Cited

U.S. PATENT DOCUMENTS 3,980,556 A 9/1976 Besik
4,033,875 A 7/1977 Besik
(Continued)

OTHER PUBLICATIONS

Lauria, Jim. "Economy, Efficiency Drive Trend Toward Decentralized Water Treatment". Water Online The Magazine, Clearwater Edition May 7, 2012: p. 8-10 <http://proddownloads.vertmarkets.com.s3.amazonaws.com/download/d9c4784b/d9c4784b-af99-4a87-8779-a04a003909ed/original/8_cleanwater_2012_teamchem_s.pdf>.

(Continued)

*Primary Examiner* — Joseph Drodge
(74) *Attorney, Agent, or Firm* — Mayback & Hoffman, P.A.; Gregory L. Mayback

(57) ABSTRACT

A wastewater treatment system includes a wastewater collection system, at least one aeration subsystem aerating the aerobic portion, and at least one filtration subsystem. The wastewater collection system has an anoxic portion, an aerobic portion downstream of the anoxic portion, an anaerobic portion downstream of the aerobic portion. The filtration subsystem includes at least one bioreacting filter receiving fluid from the aerobic portion, being operable to filter wastewater received from the aerobic portion, and discharging filtered fluid into the anoxic portion, an oxygen contactor fluidically connected between the aerobic portion and the at least one bioreacting filter and operable to diffuse oxygen into the fluid being supplied from the aerobic portion, and an oxygen supply operable to supply oxygen to the oxygen contactor.

19 Claims, 32 Drawing Sheets

Related U.S. Application Data continuation-in-part of application No. 13/748,131, filed on Jan. 23, 2013, now Pat. No. 9,440,870, which is a continuation of application No. 13/240,608, filed on Sep. 22, 2011, now Pat. No. 8,388,833, which is a continuation of application No. PCT/US2011/020967, filed on Jan. 12, 2011, which is a continuation-in-part of application No. 12/793,144, filed on Jun. 3, 2010, now Pat. No. 8,585,892, said application No. 13/830,480 is a continuation-in-part of application No. 12/793,144, filed on Jun. 3, 2010, now Pat. No. 8,585,892, application No. 14/986,008, which is a continuation-in-part of application No. 14/051,876, filed on Oct. 11, 2013, now abandoned, which is a continuation of application No. 12/793,144, filed on Jun. 3, 2010, now Pat. No. 8,585,892, application No. 14/986,008, which is a continuation-in-part of application No. 13/748,131, filed on Jan. 23, 2013, now Pat. No. 9,440,870.

(60) Provisional application No. 61/751,041, filed on Jan. 10, 2013, provisional application No. 61/294,521, filed on Jan. 13, 2010, provisional application No. 61/385,603, filed on Sep. 23, 2010.

(51) Int. Cl.

| | | |
|---|---|---|
| *C02F 3/30* | (2006.01) | |
| *B01D 21/01* | (2006.01) | |
| *C02F 3/00* | (2006.01) | |
| *C02F 3/28* | (2006.01) | |
| *C02F 3/08* | (2006.01) | |
| *B01D 29/11* | (2006.01) | |
| *C02F 1/52* | (2006.01) | |
| *C02F 1/68* | (2006.01) | |
| *C02F 1/76* | (2006.01) | |
| *C02F 3/14* | (2006.01) | |
| *C02F 1/00* | (2006.01) | |
| *C02F 101/16* | (2006.01) | |
| *C02F 103/20* | (2006.01) | |
| *B01F 5/00* | (2006.01) | |

(52) U.S. Cl.
CPC .............. *C02F 1/5281* (2013.01); *C02F 1/68* (2013.01); *C02F 1/766* (2013.01); *C02F 3/006* (2013.01); *C02F 3/085* (2013.01); *C02F 3/14* (2013.01); *C02F 3/20* (2013.01); *C02F 3/2833* (2013.01); *C02F 3/30* (2013.01); *C02F 3/302* (2013.01); *C02F 3/303* (2013.01); *C02F 3/305* (2013.01); *B01F 5/0057* (2013.01); *C02F 1/001* (2013.01); *C02F 2101/16* (2013.01); *C02F 2101/163* (2013.01); *C02F 2101/166* (2013.01); *C02F 2103/20* (2013.01); *C02F 2209/006* (2013.01); *C02F 2209/008* (2013.01); *C02F 2303/02* (2013.01); *Y02W 10/12* (2015.05); *Y02W 10/15* (2015.05)

(58) Field of Classification Search
CPC .. C02F 3/303; C02F 3/20; C02F 3/085; C02F 3/2833; C02F 3/302; C02F 3/006; C02F 3/30; C02F 2101/166; C02F 2103/20; C02F 2101/16; C02F 2209/008; C02F 2303/02; C02F 1/001; C02F 2101/163; C02F 2209/006; C02F 3/02; C02F 3/081; C02F 3/12; C02F 3/301; C02F 3/087; C02F 1/008; C02F 1/52; B01D 21/01; B01D 29/117; B01D 21/0018; B01D 21/0021; B01D 21/0024; B01D 21/003; B01D 21/0033; B01D 21/0096; B01D 21/30; B01D 21/302; B01D 21/307; B01D 21/34; B01D 36/04; Y02W 10/15; Y02W 10/12; B01F 5/0057

USPC ...... 210/85, 143, 150, 151, 202, 220, 221.2, 210/605, 616, 617, 620, 630, 919, 920, 210/194, 195.1, 196, 532.1, 532.2, 521

See application file for complete search history.

(56) References Cited

U.S. PATENT DOCUMENTS

| | | | |
|---|---|---|---|
| 4,104,167 A | 8/1978 | Besik | |
| 4,202,774 A | 5/1980 | Kos | |
| 4,836,921 A | 6/1989 | Hahn | |
| 4,869,815 A | 9/1989 | Bernard et al. | |
| 4,986,905 A * | 1/1991 | White | C02F 3/006 210/104 |
| 5,269,911 A * | 12/1993 | Stegall, Sr. | B01D 24/12 210/108 |
| 5,320,750 A | 6/1994 | Krofta | |
| 5,505,862 A | 4/1996 | Sonnenrein | |
| 5,514,277 A | 5/1996 | Khudenko | |
| 5,520,803 A | 5/1996 | Russell et al. | |
| 5,534,159 A | 7/1996 | Krieger | |
| 5,616,241 A | 4/1997 | Khudenko | |
| 5,618,413 A | 4/1997 | Todd et al. | |
| 5,725,760 A * | 3/1998 | Monteith | E03B 3/03 210/170.03 |
| 5,792,368 A | 8/1998 | Robertson | |
| 5,863,441 A | 1/1999 | Krofta | |
| 5,879,567 A | 3/1999 | Robertson | |
| 5,922,112 A | 7/1999 | Zappi et al. | |
| 5,979,012 A | 11/1999 | Fritz | |
| 6,126,827 A | 1/2000 | Johnson, Jr. et al. | |
| 6,075,496 A | 6/2000 | Harriman | |
| 6,143,187 A | 11/2000 | Robertson | |
| 6,159,365 A | 12/2000 | Kigel et al. | |
| 6,174,434 B1 | 1/2001 | Krofta | |
| 6,256,640 B1 | 7/2001 | Smalley | |
| 6,605,219 B2 | 8/2003 | Lambert | |
| 6,616,833 B2 | 9/2003 | Lynch | |
| 6,692,642 B2 | 2/2004 | Josse et al. | |
| 6,767,464 B2 | 7/2004 | Boyd et al. | |
| 6,845,336 B2 | 1/2005 | Kodukula et al. | |
| 6,846,666 B2 | 1/2005 | Kumar et al. | |
| 6,954,701 B2 | 10/2005 | Wolfe | |
| 6,988,394 B2 | 1/2006 | Shedd et al. | |
| 7,062,406 B2 | 6/2006 | Patwardhan et al. | |
| 7,096,128 B2 | 8/2006 | Saylor | |
| 7,118,674 B2 | 10/2006 | Dimitriou et al. | |
| 7,226,539 B2 | 6/2007 | Dong et al. | |
| 7,264,732 B2 | 9/2007 | Bradley | |
| 7,353,113 B2 | 4/2008 | Sprague et al. | |
| 7,424,399 B2 | 9/2008 | Kahn et al. | |
| 7,429,320 B2 | 9/2008 | Holt | |
| 7,429,478 B2 | 9/2008 | Kumar et al. | |
| 7,468,135 B2 | 12/2008 | Holt | |
| 7,520,990 B2 | 4/2009 | Ruocco et al. | |
| 7,534,357 B2 | 5/2009 | Markle et al. | |
| 7,566,400 B2 | 7/2009 | Harmon et al. | |
| 7,658,851 B2 | 2/2010 | Nelson et al. | |
| 7,718,067 B2 | 5/2010 | Holt | |
| 7,734,379 B2 | 6/2010 | Graves | |
| 7,794,592 B2 | 9/2010 | Brown | |
| 7,794,596 B2 | 9/2010 | Patterson | |
| 8,372,274 B2 * | 2/2013 | Early | C02F 3/06 210/134 |
| 8,388,833 B2 | 3/2013 | Robertson | |
| 8,585,892 B2 | 11/2013 | Robertson | |
| 8,958,917 B2 | 2/2015 | Wolfe et al. | |
| 9,056,783 B2 | 6/2015 | Wolfe | |
| 2002/0133302 A1 | 9/2002 | Matsui | |
| 2003/0141229 A1* | 7/2003 | Chaffee | B01D 24/002 210/97 |
| 2003/0209476 A1 | 11/2003 | Josse et al. | |

(56) References Cited

U.S. PATENT DOCUMENTS

| | | |
|---|---|---|
| 2004/0230455 A1 | 11/2004 | McKinney et al. |
| 2005/0021359 A1 | 1/2005 | McKinney |
| 2005/0045557 A1 | 3/2005 | Daigger et al. |
| 2006/0000782 A1 | 1/2006 | Bowers et al. |
| 2006/0021924 A1 | 2/2006 | White et al. |
| 2006/0254965 A1* | 11/2006 | Turley ............... C02F 3/12 210/195.1 |
| 2007/0045178 A1 | 3/2007 | Brase |
| 2007/0045179 A1 | 3/2007 | Brase |
| 2007/0114174 A1 | 5/2007 | Peeters et al. |
| 2007/0122874 A1 | 5/2007 | Suthanthararajan et al. |
| 2007/0163965 A1 | 7/2007 | Wolfe |
| 2008/0047895 A1 | 2/2008 | Elefritz et al. |
| 2008/0073266 A1 | 3/2008 | McWhirter et al. |
| 2008/0201018 A1* | 8/2008 | Graves ............... G05B 23/027 700/275 |
| 2008/0225762 A1 | 9/2008 | Soliman |
| 2009/0026132 A1* | 1/2009 | Costa ............... C02F 3/04 210/607 |
| 2009/0107924 A1 | 4/2009 | Kigel et al. |
| 2010/0051523 A1* | 3/2010 | Lowe ............... C02F 3/006 210/106 |
| 2010/0204924 A1 | 8/2010 | Wolfe |
| 2010/0282654 A1 | 11/2010 | Hauschild |
| 2011/0132822 A1 | 6/2011 | Kaw |
| 2011/0307203 A1 | 12/2011 | Higgins |
| 2012/0000849 A1 | 1/2012 | Fassbender |
| 2012/0097590 A1 | 4/2012 | Early |
| 2012/0187042 A1 | 7/2012 | Coleman |

OTHER PUBLICATIONS

International Search Report, International Application No. PCT/US11/20967; dated Mar. 23, 2011.

"U.N. Report:: Let's Turn Foul Water From Mass Killer Into Global Treasure." CNN Health. Mar. 22, 2010. <http://us.cnn.com/2010/HEALTH/03/22/united.nations.water.report/index.html?hpt=C2>.

"Time to Cure Global Tide of Sick Water". United Nations Environment Programme. Mar. 22, 2010. <http://www.unep.org/Documents.Multilingual/Default.asp?DocumentID=617&ArticleID=6504&I=en&t=long>.

"The 'Cap and Trade' Approach to Nutrient Removal." Water Online. Aug. 14, 2013. <http://www.wateronline.com/doc/the-cap-and-trade-approach-to-nutrient-removal-0001?sectionCode=Editorial&templateCode=SponsorHeader&user=2482088&souce=nl: 37949.

Ba Dieu, City of Houston, Public Works and Engineering Department, Wastewater Operations Branch, "Application of the SCADA System in Wastewater Treatment Plants," Published in ISA Transactions, vol. 40, (2001), pp. 267-281.

Manfred Schulze et al., "Real Time Control of Urban Wastewater Systems—Where Do We Stand Today?," Journal of Hydrology, vol. 299, (2004), pp. 335-348.

A. Mirsepassi et al., "Application of Artificial Neural Networks to the Real Time Operation of Water Treatment Plants," Department of Civil and Mining Engineering, University of Wollongong, NSW, 2522 Australia, published in 1995 by IEEE.

* cited by examiner

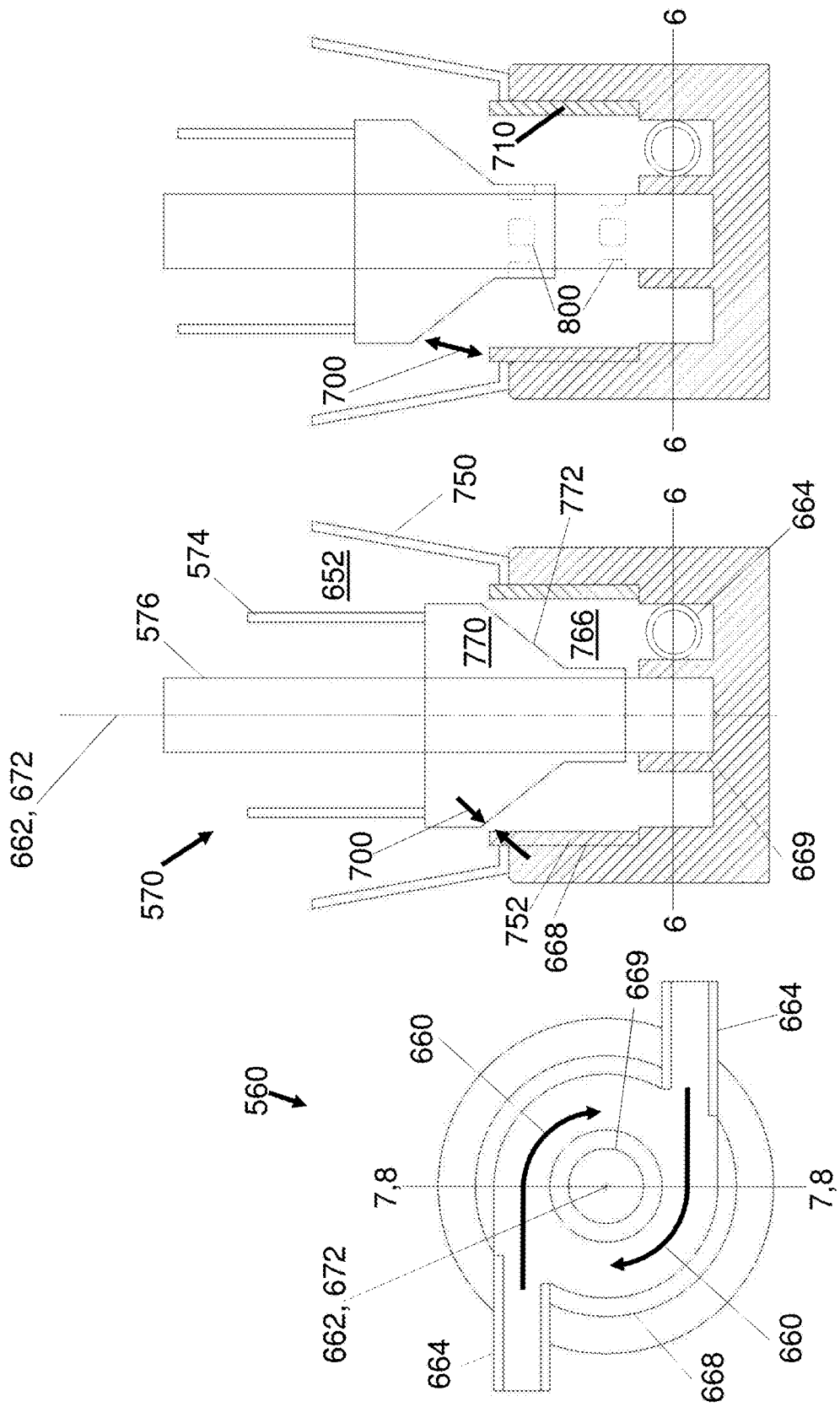

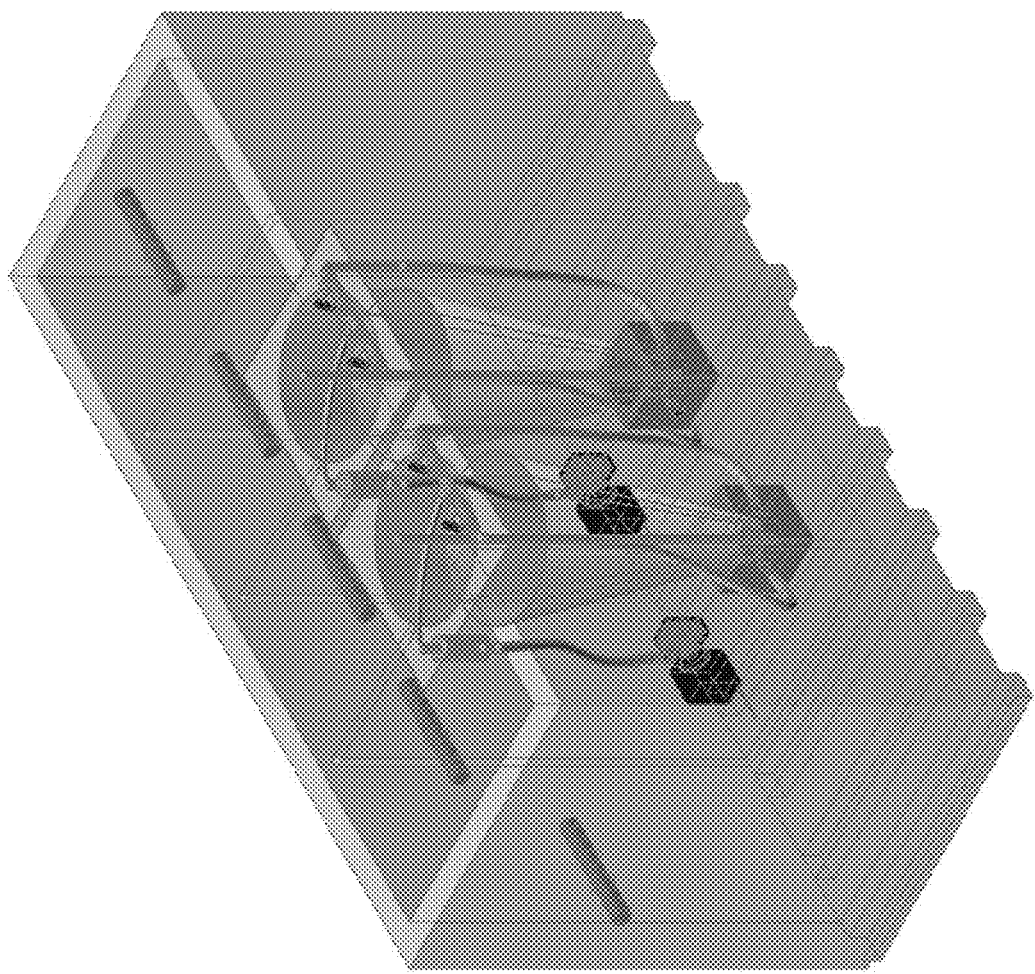

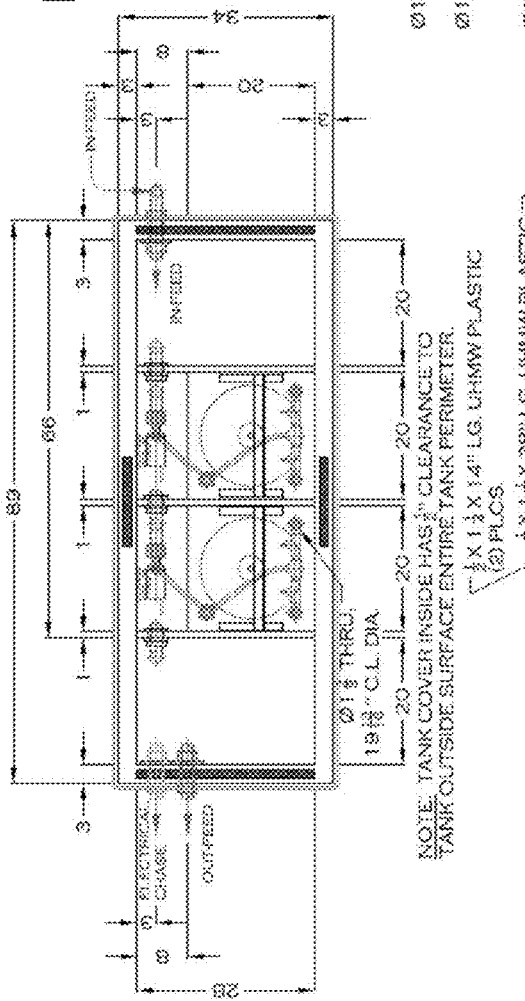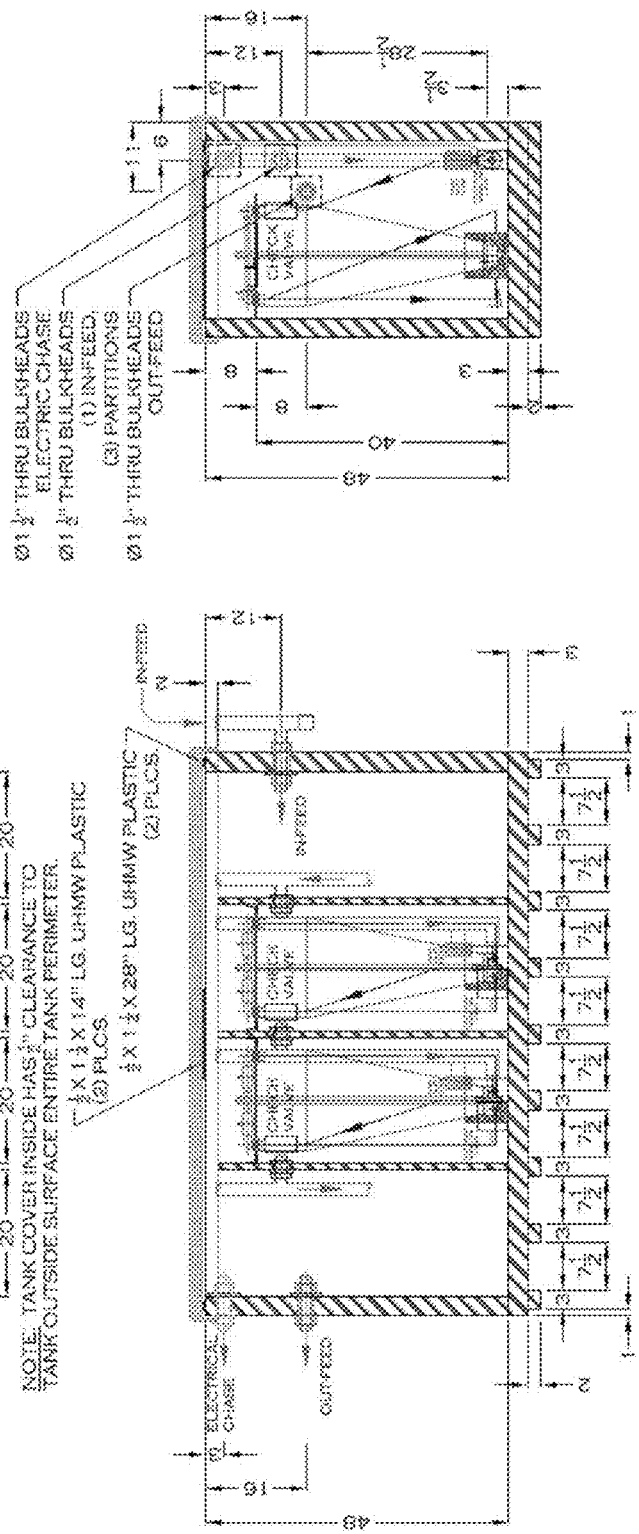

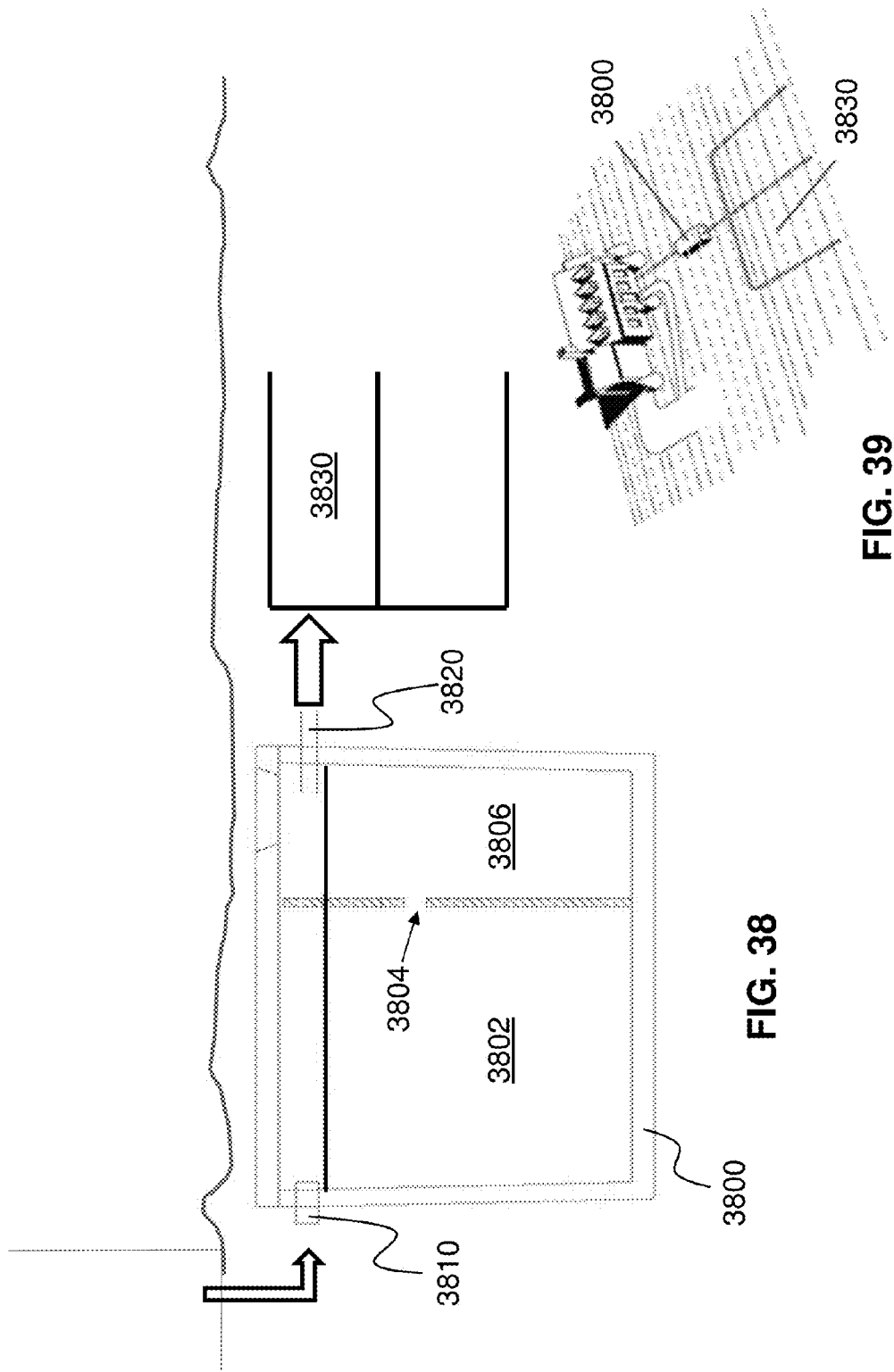

SYSTEM AND PROCESS FOR REMOVING NITROGEN COMPOUNDS AND ODORS FROM WASTEWATER AND WASTEWATER TREATMENT SYSTEM

CROSS-REFERENCE TO RELATED APPLICATIONS

This application:
is a continuation of U.S. patent application Ser. No. 13/830,480, filed on Mar. 14, 2013, now U.S. Pat. No. 9,272,931, which:
  claimed the priority of U.S. Provisional Patent Application Ser. No. 61/751,041, filed on Jan. 10, 2013);
  is a continuation-in-part of U.S. patent application Ser. No. 13/748,131, filed on Jan. 23, 2013, which is a continuation of U.S. patent application Ser. No. 13/240,608, filed on Sep. 22, 2011, now U.S. Pat. No. 8,388,833, issued Mar. 5, 2013, which:
    is a continuation of International Patent Application No. PCT/US2011/020967, filed Jan. 12, 2011, which:
      is a continuation-in-part of Ser. No. 12/793,144, filed on Jun. 3, 2010, now U.S. Pat. No. 8,585,892, issued Nov. 19, 2013 (which application claimed the priority to U.S. Provisional Application Ser. No. 61/294,521 filed on Jan. 13, 2010); and
      claimed the priority to U.S. Provisional Application Ser. No. 61/385,603 filed on Sep. 23, 2010; and
    is a continuation-in-part of Ser. No. 12/793,144, filed on Jun. 3, 2010, now U.S. Pat. No. 8,585,892, issued Nov. 19, 2013 (which application claimed the priority to U.S. Provisional Application Ser. No. 61/294,521 filed on Jan. 13, 2010);
is a continuation-in-part of U.S. patent application Ser. No. 14/051,876, filed on Oct. 11, 2013, now abandoned, which is a continuation of U.S. patent application Ser. No. 12/793,144, filed on Jun. 3, 2010, now U.S. Pat. No. 8,585,892, issued Nov. 19, 2013, which claimed the priority to U.S. Provisional Application Ser. No. 61/294,521 filed on Jan. 13, 2010); and
is a continuation-in-part of U.S. patent application Ser. No. 13/748,131, filed on Jan. 23, 2013, now U.S. Pat. No. 9,440,870, which is a continuation of U.S. patent application Ser. No. 13/240,608, filed on Sep. 22, 2011, now U.S. Pat. No. 8,388,833, issued Mar. 5, 2013, which:
  is a continuation of International Patent Application No. PCT/US2011/020967, filed Jan. 12, 2011, which:
    is a continuation-in-part of Ser. No. 12/793,144, filed on Jun. 3, 2010, now U.S. Pat. No. 8,585,892, issued Nov. 19, 2013 (which application claimed the priority to U.S. Provisional Application Ser. No. 61/294,521 filed on Jan. 13, 2010); and
    claimed the priority to U.S. Provisional Application Ser. No. 61/385,603 filed on Sep. 23, 2010;
  claimed the priority to U.S. Provisional Application Ser. No. 61/385,603 filed on Sep. 23, 2010
and
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present invention lies in the field of removing waste and odors from wastewater using multi-zone aerobic and/or anaerobic fluidized expansion chambers. Waste can include, but is not limited to, nitrogenous waste such as ammonia, nitrite, and nitrate. In an exemplary embodiment, the present disclosure relates to system and processes for processing wastewater arising from confined animal feeding operations (CAFOs). Another exemplary embodiment includes a web-based wastewater treatment monitoring and control system. A further exemplary embodiment is an improved septic tank and septic tank monitoring device. Yet another exemplary embodiment described herein relates to a filter for municipal drinking water.

BACKGROUND OF THE INVENTION

Microbial denitrification is a frequently used and inexpensive method of removing nitrogenous waste from wastewater. Two common configurations utilize either packed beds (also referred to as fixed film) or fluidized beds. Denitrifying microbial cultures have been supported on a variety of substrates including sand, ceramics, polymers, clay, and gels, to name a few. Fluidized bed denitrification systems offer a cost-effective solution to wastewater treatment, as they are self-adapting and provide a very large reactive surface area for a given volume compared to fixed film-based filtration systems. The primary disadvantage of microbial systems (or bioreactors) is that the organisms require an environment conducive to supporting their metabolic needs. While biological treatment systems can be flexible and robust, temperature, pH, oxygen content, and contaminant levels are variables to be controlled for optimum performance. Despite this requirement, microbial denitrification is still a cost effective way to treat wastewater.

Such systems can, and typically are, used in conjunction with other wastewater unit processes to achieve acceptable levels of biological oxygen demand (BOD) and/or the removal of other pollutants including, but not limited to, phosphorus, nitrogen, heavy metals, miscellaneous solids, and toxic organics.

The U.S. Department of Agriculture (USDA) and the U.S. Environmental Protection Agency (EPA) promulgate regulations that require entities generating wastewater to confine the discharge to permissible levels. Examples of regulated materials and chemicals included in discharged wastewater are ammonia, phosphates, nitrates, nitrites, and heavy metals. Typically, entities generating wastewater create holding ponds at their site. These ponds can be part of the treatment system and act as storage structures for the wastewater before, during, and after processing. Some processes allow the entities to either discharge their effluent to local waterways, others recycle the treated water by reusing it, for example, for cleaning or irrigation. Addition of wastewater treatment systems prior to these holding facilities can reduce the size required for these holding ponds.

Various entities spend millions of dollars annually to treat their wastewater. The cost of discharging untreated water to a municipal wastewater treatment facility can be prohibitive. In addition, every dollar spent on such discharge could have been spent on other, more beneficial, endeavors, including, for example, improvements to facilities.

Some existing denitrification filters may use a fluidized bed bioreactor having an inverted cone shape. Such a configuration optimizes the active volume of the bioreactor and reduces the volume and pumping requirements for any given throughput due to the high velocity of the liquid at the small part of the cone relative to the average liquid velocity of the entire vessel. An exemplary configuration of a fluidized bed reactor is shown in FIG. 1. In this filter, wastewater W is injected through the top of the filter element through a pipe that discharges at the base of the fluidized bed reactor. In FIGS. 1 and 2, the exemplary filter 100 can receive water to be treated W from either of two input bulkheads 110. Passing through horizontal fill pipes 120, the water W enters a vertical injector pipe 130 and exits out ports 140 adjacent the lowermost end of the vertical injector pipe 130 into the interior 102 of the filter body. Accordingly, the high-pressure stream of water W is forced upwards through the column of bed material 150, e.g., sand (not shown but indicated by dotted underline), which material 150 fills a lowermost portion of the filter's interior (for example, up to fill line 160 when dry). As the water W mixes with the bed material 150, it creates a fluidized bed having an upper boundary above fill line 160. A cone-shaped filter maximizes the efficiency of the fluidization within the column of the fluidized bed. An ideal fluidized bed reactor is one where the entire volume of the bed material becomes fluidized. Cone shaped fluidized beds (compared to straight cylinders) are more tolerant of variations in flow rates and media size uniformity, which can lead to media washout in cylinders. It is beneficial if this filter system design is self-leveling and has a built-in overflow capability. To function best, however, a fluidized bed's long axis should be oriented as close to vertical as possible.

In FIGS. 1 and 2, if the filter uses standard 3-inch diameter plumbing, for example, then standard 3-inch parts can be used. At the top of the plumbing, a 3-inch DWV clean out 200 can be connected to a 3-inch cross 202. The horizontal fill pipes 120 can comprise a pair of 3-inch by 7.25-inch sch-160 PVC fittings each on opposing sides of the cross 202 with each being connected to one of a pair of 3-inch by 20.5-inch sch-160 PVC fittings through a 3-inch compression coupling 204. Each of the horizontal fill pipes 120 is terminated by one of the two input bulkheads 110. The hatched areas of the pipes connected to the cross 202 illustrate the cement joints of the respective pipes. The vertical injector pipe 130 can be a 3-inch by 89-inch sch-160 PVC pipe that is terminated at the bottom thereof by a 4-inch bulkhead 206 holding a 3-inch drain gate 208, a 4-inch by 2-inch bushing 210, and, finally, a 2-inch plug 212. In this exemplary embodiment, four 1.5-inch holes, 2.5-inches on center are at the lower end of the vertical injector pipe 130.

An exemplary diagram for a denitrification process flow that can use a fluidized bed reactor 100 is provided in FIG. 3. Effluent wastewater W is introduced into a set 300 of sumps and filters that are configured in series because microbial reduction of ammonia in an influent stream is a multi-stage process. In a first stage 310, ammonia ($NH_3$) is converted to nitrate ($NO_3$) in the presence of oxygen, an aerobic process called nitrification. Oxygen can be added either as $O_2$ or as a constituent of air. Nitrates are as problematic as ammonia as a contaminant in waste streams. Accordingly, nitrates must be treated as well. As such, in a second stage 320, nitrates are converted to atmospheric nitrogen ($N_2$) in an anaerobic process called denitrification. The number of aerobic and anaerobic filters in any given system is not fixed, but rather depends on the nature of the wastewater being treated and the desired characteristics of the system effluent. FIG. 3 shows a configuration where the first aerobic stage is succeeded by two anaerobic stages. As shown in FIG. 3, the influent W is discharged into an aerobic sump 312 where air 330, for example, is injected to maintain an adequate oxygen concentration sufficient for the aerobic microbes in the ammonia reduction stage of the process. This aerated water is recirculated through a first set of two fluidized bed reactors 314. Aerobically treated water $W_1$ from the aerobic sump 312 then flows to the first of two series-connected anaerobic sumps 322, 324. A second set of two fluidized bed reactors 326 recirculate influent water $W_1$ within a first anaerobic sump 322, which discharges partially treated water $W_2$ to a second anaerobic sump 324, at which a third set of two fluidized bed reactors 328 recirculate fluid therein. Denitrified water $W_3$ flows out of the second anaerobic sump 324 to a final sump 340, where any number of secondary removal systems 350 can be present. For example, if another pollutant is to be removed, then a secondary removal system 350 can be used. Treated water $W_4$ from this final sump 340 can then either be recycled or discharged. Possible direction of the treated water $W_4$ can be to a storage pond, a natural water body, and/or to a wastewater treatment facility as desired. Each of the sumps 312, 322, 324 can be accommodated to fit the needs of a particular facility.

The basic chemical process for treatment of the liquid in the first stage 310 involves aerating a stream of ammonia-rich wastewater and introducing this wastewater to an aerobic sand filter(s) where it first contacts an aerated zone. Here, the ammonia is converted to $NO_3$ as set forth in the following equation:

$NH_4 + 2O_2 \rightarrow NO_3^- + 2H+ + H_2O.$

Then, the nitrate-rich effluent of the first stage 310 enters at least one anaerobic filter where a high density of denitrifying bacteria converts the nitrate to $N_2$ as set forth in the following equation:

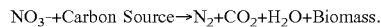
$NO_3^- + \text{Carbon Source} \rightarrow N_2 + CO_2 + H_2O + \text{Biomass}.$ This two-step process is represented in the schematic flow diagram of FIG. 4, which also includes the vertical orientation of influent and effluent within the system of FIG. 3. First, effluent wastewater W is introduced into the aerobic sump 312, the nitrification sump. Liquid from the nitrification sump 312 is removed from the bottom thereof and injected in the filter 314 through the lower port(s) 140. The pressure provided by the liquid coming out of the port 140 is made sufficient to maintain fluidization of the bed material in the filter 314. The fluid in the nitrification sump 312 is aerated, which aeration can occur directly in the nitrification sump 312 or indirectly in a separate aeration sump 312', the latter of which is shown in FIG. 4. In this first stage 310, ammonia converts to nitrate.

Ammonia-free liquid containing nitrate $W_1$ is, then, transferred to an anaerobic sump 322 of the second stage 320. Liquid from the anaerobic sump 322 is injected into the filter(s) 326 through the lower port(s) 140. The pressure provided by the liquid coming out of the port 140 is made sufficient to maintain fluidization of the bed material in the filter(s) 326. The fluid in the anaerobic sump 322 is not aerated, enabling the bacteria in the filter(s) 326 to convert nitrate in the filter 326 to $N_2$. If further anaerobic filtration is needed to further convert the nitrate (or completely convert the nitrate if still present), the portion of the second stage 320 shown in FIG. 4 can be repeated as desired (indicated with the ellipses in FIG. 4) and, as shown in FIG.

3 with one repetition, to transfer effluent $W_n$ from the anaerobic sump 322 to additional repetitive filtration stages.

It is desirable to remove as much solids from wastewater as possible before introducing the wastewater W into the denitrification system. One way to remove such solids is to first send the wastewater W to a solids separator (e.g., a screw press or inclined screen solids separator), in which some of the suspended solids are removed. These solids can be used as a soil amendment if desired. The liquid portion that exits from the solids separator can then be treated with the denitrification system to remove other contaminants.

Removal of nitrogen and odor causing contaminants from wastewater can allow for the reuse of this water for process and waste flushing purposes. Such a practice lowers fresh water usage, which is more environmentally friendly and cost effective than constantly using fresh water.

The flow of water needed to keep the fluidized sand filter systems fluidized often exceeds the overall flow of liquid through the system. As a result, fluidized sand filter systems have traditionally needed to be coupled with additional tankage (sumps) to hold the additional water needed to keep the beds fluidized. This need for additional tankage increases the footprint of the system by as much as two times. Accordingly, there is a need for a system that reduces this extra space for sumps.

Residences, commercial and industrial establishments generate wastewater or sewage. Sewage includes household waste from toilets, baths, kitchens and washing machines as well as wastewater produced from industrial processes like food and chemical production. In a typical metropolitan area all of these sources of wastewater are connected by a network of underground sewers to a sewage treatment plant where the water is processed to eliminate components in the water that could harm the environment. The sewer system includes pipes and pumping stations that move the wastewater from its sources to the waste treatment plant. Some sewer systems also handle storm water runoff. Sewage systems capable of handling storm water are called combined systems. These systems are expensive to operate as they must have the capacity to process surges of storm water along with the normal volume of sewage they treat. As a result, many municipalities have separate sewage and storm water treatment facilities.

Conventional sewage treatment generally includes three stages, generally referred to as primary, secondary, and tertiary or advanced treatment. Primary treatment is a process in which raw sewage is screened or treated in holding basins to remove solids. In one part of this primary treatment, the solids can be physically separated by a solids separator, for example, with an inclined screen or sluice having small holes sufficient to allow liquid to pass therethrough but not a significant amount of solids. The raw sewage is poured over the sluice, resulting in a dry pile of solids at the bottom of the incline with the liquid part of the sewage seeping through the holes into a liquid sewage, holding basin. In the holding basin, a scum layer forms and includes, for example, oil, grease, soap, and plastics in a septic application, solid animal waste in a CAFO, acid whey in a cheese factory, and grain (e.g., hops and barley) in a brewery. Any solids and scum are separated from the water and the remaining liquid is, then, further processed. In the secondary treatment step, nutrients, organic constituents, and suspended solids are removed by bacterial organisms in a managed environment. Tertiary or advanced treatment involves the further nutrient and suspended solids removal and disinfection before it is discharged into the environment.

Sewage can also be treated close to where it is generated using septic tanks, biofilters, or aerobic treatment systems. These systems process the wastewater produced from residential, commercial, or agricultural sources at or near the location where they are generated. These systems, which include septic tanks, do not require extensive sewer systems and are, generally, used in locations where access to sewage treatment plants is not practical. Septic tanks employ physical and biological removal of organics similarly to conventional sewage treatment plant but do not have the capacity to handle large surges of wastewater. Because the water in a septic tank is discharged at the same rate it enters the system (referred to as a "plug-flow" process), the input waste stream can exceed the capacity of the system to process the water before it is discharged. As a result, these systems can and do discharge untreated sewage into the water table. This is a deleterious condition that needs to be eliminated.

As shown, for example, in FIG. 38, underground septic tanks 3800 receive household wastewater through an inlet 3810. The received wastewater enters a first chamber 3802, where solids settle and a scum layer is formed. These settled solids are anerobically digested in the first chamber 3802. Water substantially free of these solids pass through an opening 3804 and into a second chamber 3806, where additional settling and digestion occurs. No effluent exits the septic tank 3800 until the water rises to a level above a bottom surface of an outlet 3820. When the level is sufficiently high, effluent (preferably in the form of water) exits the septic tank 3800 and is channeled to a drain field 3830, as shown in FIG. 39, where additional digestion occurs and impurities are trapped in the soil. Problems associated with septic tanks 3800 are many. First, they are always full. Second, flow rate into the septic tank 3800 varies dramatically. As a plug-flow process, when the waste stream exceed the capacity of the septic tank 3800 (such as when a large number of people generate wastewater at the household from parties, extra house guests, excessive use of showers), the septic tank 3800 discharges untreated sewage directly into the water table. When this happens the drain field 3830 is compromised and unprocessed water is discharged into the soil and environment.

Importantly, virtually all septic tanks 3800 are not monitored by local utilities, primarily because septic tanks 3800 are located in areas not served by the utility and/or are rural or agricultural. Thus, most septic tanks 3800 are entirely off the monitoring grid.

It would, therefore, be beneficial to prevent and/or avert such disadvantages and to allow for monitoring of septic tanks.

Subdivisions and planned urban developments that are not located near sewage treatment plants sometimes use wastewater treatment systems called package plants. Package plants are miniature sewage treatment plants that are configured to handle the needs of a subdivision or an institution, such as a school, from which bathroom and cafeteria wastewater can be processed. Like septic tanks, package plants can be overloaded hydraulically during peak loading hours, after lunch is served for example, when large volumes of wastewater enter the system, forcing contaminated water to be discharged before it can be properly processed. Preventing this condition is desirable.

In municipal areas where large, centralized wastewater treatment facilities are established, sewage can be effectively processed and water discharged into the environment can be controlled and regulated. In rural areas where package plants and septic systems are employed, however, wastewater discharge into the environment is uncontrolled, largely unregulated and contaminants are routinely discharged into the environment. Preventing such discharge is desirable.

The same is true for agricultural operations, particularly, large establishments like confined animal feeding operations and dairy farms. There are no standard agricultural wastewater treatment systems on the market. Typically, each farming operator retains a wastewater treatment consultant and a custom system is designed to meet their individual needs. Due to the massive amounts of waste created by these facilities and the high cost of municipal-class treatment systems, agricultural waste processing systems often rely on large lagoons to provide secondary and tertiary processing of their waste. Unfortunately, these systems are subject to failure due to overflow from heavy rains and leakage from the lagoon basin. Consequently, nutrient-rich water can be discharged into the aquifer and surrounding bodies of water. Preventing such discharge is desirable.

Thus, a need exists to overcome the problems with the prior art systems, designs, and processes as discussed above.

SUMMARY OF THE INVENTION

The invention provides a multi-stage bioreactor for effluent denitrification and systems and methods for removing nitrogenous waste (e.g., ammonia, nitrite, nitrate) and odors from wastewater using multi-zone aerobic and/or anaerobic fluidized expansion chambers that overcome the hereinafore-mentioned disadvantages of the heretofore-known devices and methods of this general type and that provide such features with a reduced footprint and, in doing so, improves fluidization of the bed material.

The invention provides wastewater treatment systems and processes utilizing the multi-stage bioreactor that overcome the hereinafore-mentioned disadvantages of the heretofore-known devices and methods of this general type and that prevent contaminated water from being discharged and easily and routinely monitors the wastewater treatment system so that verification of non-discharge of contaminated water can be made.

The bioreactor portion of the invention pertains to systems and processes for treating nitrogenous pollutants and odors in wastewater through a controlled biological process. The primary element of control in the invention is a quantifiable control of wastewater velocity through the system utilizing a controlled interaction of vessel geometry with biological components of the system. Other control parameters of the systems and processes include pH, temperature, and oxygen saturation of the wastewater. Parameters of the systems and processes include some combination of the following:

1) reduction of Chemical Oxygen Demand (COD);
2) reduction of Biological Oxygen Demand (BOD);
3) reduction of Odor;
4) conversion of ammonia ($NH_3$) to nitrate ($NO_3$); and
5) conversion of nitrate ($NO_3$) to atmospheric nitrogen ($N_2$).

Bacteria are maintained as a biofilm on solid media within a vessel of the inventive bioreactor. The solid media is particulate and of sufficient buoyancy to be suspended with a flow of water through the vessel. The degree of buoyancy is controlled by the velocity of water, the density of the particles, and the shape of the particles and is described by the equation:

$$\varepsilon = \left[\frac{18 N_{Re} + 2.7 N_{Re}^{1.687}}{N_{Ga}}\right]^{0.213}$$

where: $\varepsilon$=bed void fraction;
$N_{Re}$=Particle Reynolds Number; and
$N_{Ga}$=Galileo Number,
and is further discussed in U.S. Pat. No. 4,032,407 to Scott et al., the disclosure of which is incorporated herein by reference in its entirety.

Processes of the invention involve decoupling treatment time and system flow-through using an improved sump feature. This feature optimizes the process to achieve a variety of process outcomes. For example, there is a reduction of odor while the nitrogen content of wastewater is maintained for fertilizer use by conversion of ammonia to nitrate while the conversion of nitrate to $N_2$ is inhibited.

This optimized control and monitoring system can be implemented not only for a single facility's wastewater treatment, but also can be expanded to monitor and document a community or watershed wide system of wastewater treatment facilities that permits later verification of no discharge or permissible discharge, throughout any particular time period of the facility's operational history. More specifically, the invention provides a solution to the problem of the verification of treating wastewater from rural and agricultural sources by creating a virtual wastewater treatment system including a network of independent treatment or filtration systems that are instrumented to measure critical process parameters such as process flows, water levels, water temperature, pH, nutrient concentration, total suspended solids, actual and potential effects of local weather conditions, and others. The data produced and recorded by these individual sub-systems are, then, transmitted electronically and captured at a central location, at which the received data is further analyzed and used to manage the systems remotely. The invention, thereby, provides oversight to the control and operation of the treatments systems being monitored.

On a local site level, parameters that are measured by various probes and instruments connect to a central processing unit (e.g., a personal computer), which contains and executes software that captures, processes, and records the sensed data and, then, remotely operates a number of responsive process control mechanisms such as valves, pumps, chemical dispensers, etc., to optimize the operation of a particular filtering system or to shut down one or more components or operations in the case of failure or need for repair. During times when the processed output exceeds the limits permitted for lawful or proper discharge (for example, the amount allowable under a particular permit), the invention can proactively divert output flow into a holding facility (i.e., tank or pond) for reprocessing until concentration levels at the wastewater system output achieve compliance, at which time permissible discharge can occur. This "smart" interactive process is capable of monitoring and reporting on a local or regional basis (by coordinating the monitoring of adjacent sites or sites on the same waterway) and, in real-time, allowing numerous advantages in monitoring the actual and potential discharges into a natural system, not the least of which is to allow affected dischargers to trade, sell, or exchange excess capacity or allowances.

Each of these treatment systems connects through the Internet or through other remote electronic measures to a central monitoring location, where operational parameters and maintenance of the systems can be observed and controlled. The monitoring location is able to view the data recorded by each treatment system, and, in an embodiment where a remote viewing system is used in conjunction therewith (for example, a web camera), operational problems are observed and diagnosed remotely. If any problems occur that need physical repair or service, a live technician could then be dispatched to fix the filter system or that filter could be shut down remotely or its output diverted remotely until proper operation of the filter was restored, thereby entirely preventing discharge of non-compliant water.

In this way, each of the treatment systems can be connected as a network to a central monitoring station where the output of all of the networked systems is monitored on a continuous basis to achieve compliance and protect against unauthorized discharge of contaminated water into the environment. The invention provides continuous water treatment capability to a large number of distributed filter systems (e.g., physically separate and, possibly, far apart from one another) at a cost that is many factors cheaper than the cost of a conventional sewer system. Where, in particular, all discharge is treated at an even more expensive regional wastewater treatment facility such as those operated by city and state governments.

With the foregoing and other objects in view, there is provided, in accordance with the invention, a wastewater treatment system includes a wastewater collection system, at least one aeration subsystem aerating the aerobic portion, and at least one filtration subsystem. The wastewater collection system has an anoxic portion, an aerobic portion downstream of the anoxic portion, an anaerobic portion downstream of the aerobic portion. The filtration subsystem includes at least one bioreacting filter receiving fluid from the aerobic portion, being operable to filter wastewater received from the aerobic portion, and discharging filtered fluid into the anoxic portion, an oxygen contactor fluidically connected between the aerobic portion and the at least one bioreacting filter and operable to diffuse oxygen into the fluid being supplied from the aerobic portion, and an oxygen supply operable to supply oxygen to the oxygen contactor.

In accordance with another feature of the invention, the wastewater collection system is a lagoon.

In accordance with a further feature of the invention, there is provided a first curtain partitioning the lagoon into the anoxic portion and the aerobic portion and a second curtain partitioning the lagoon into the aerobic portion and the anaerobic portion.

In accordance with an added feature of the invention, the wastewater collection system is a plurality of lagoons.

In accordance with an additional feature of the invention, there is provided a first lagoon is the anoxic portion, a second lagoon is the aerobic portion downstream of the first lagoon, and a third lagoon is the anaerobic portion downstream of the second lagoon.

In accordance with yet another feature of the invention, there is provided a pretreatment solids separator processing the wastewater prior to entry into the anoxic portion.

In accordance with yet a further feature of the invention, the at least one bioreacting filter has an external sump defining a sump cavity for receiving wastewater therein, an internal fluidized-bed filter disposed in the sump cavity and supported upright by the external sump, the filter having an upwardly expanding, hollow, conical filter body and filter media inside the filter body, and an output fluidically connected to the filter and operable to discharge filtered wastewater from the filter.

In accordance with yet an added feature of the invention, there is provided an irrigation system drawing water from the anaerobic portion and operable to irrigate an area.

In accordance with yet an additional feature of the invention, there is provided a monitoring subsystem comprising monitors operable to measure wastewater process parameters of the wastewater treatment system selected from at least one of the group consisting of process flow, water level, water temperature, pH, nutrient concentration, total suspended solids, actual weather condition at the wastewater treatment system, and effects of local weather condition on the wastewater treatment system.

In accordance with again another feature of the invention, there are provided control devices operable to receive at least one control command and, dependent upon the at least one control command received, to alter at least one parameter of the wastewater treatment system.

In accordance with a concomitant feature of the invention, there is provided a communication device operatively connected to the wastewater treatment system and to the control devices and operable to send information corresponding to the wastewater process parameters measured by the monitors, to receive control messages corresponding to the at least one control command, and to transmit the at least one control command to at least one of the control devices to, thereby, alter a wastewater process parameter.

The invention provides wastewater treatment systems and processes utilizing the multi-stage bioreactor that overcome the hereinafore-mentioned disadvantages of the heretofore-known devices and methods of this general type.

Although the invention is illustrated and described herein as embodied in a multi-stage bioreactor for effluent denitrification, in systems and methods for removing nitrogenous waste and odors from wastewater using multi-zone aerobic and/or anaerobic fluidized expansion chambers, in systems and processes for wastewater treatment of high-strength waste such as CAFOs and food processors, in processes utilizing the multi-stage bioreactor, in systems and processes for filtering drinking water, and for improvements in septic tanks, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIG. 6 is a fragmentary, horizontal cross-sectional view of an injection base of the filtration system of FIG. 5 along section line 6-6 in FIGS. 7 and 8;

FIG. 7 is a fragmentary, vertical cross-sectional view, along section line 7,8-7,8 in FIG. 6, of the injection base of FIG. 6 and a flow regulation device of FIG. 5 with the float valve in an almost closed state;

FIG. 8 is a fragmentary, vertical cross-sectional view, along section line 7,8-7,8 in FIG. 6, of the injection base and flow regulation device of FIG. 7 with the float valve in an open state;

FIG. 23 is a top plan view of the filtration system of FIG. 19 in an exemplary embodiment sized to fit through a standard doorframe;

FIG. 24 is a cross-sectional view of the filtration system of FIG. 23 from a left side thereof;

FIG. 25 is a cross-sectional view of the filtration system of FIG. 23 from an in-feed side thereof;

FIG. 26 is a top plan view of another exemplary embodiment of a filtration system according to the invention;

FIG. 38 is a fragmentary, diagrammatic, vertical cross-sectional view of a prior art septic tank system;

FIG. 39 is a fragmentary, perspective view of a household with the prior art septic tank system of FIG. 38;

DETAILED DESCRIPTION OF THE INVENTION

Figure 2:
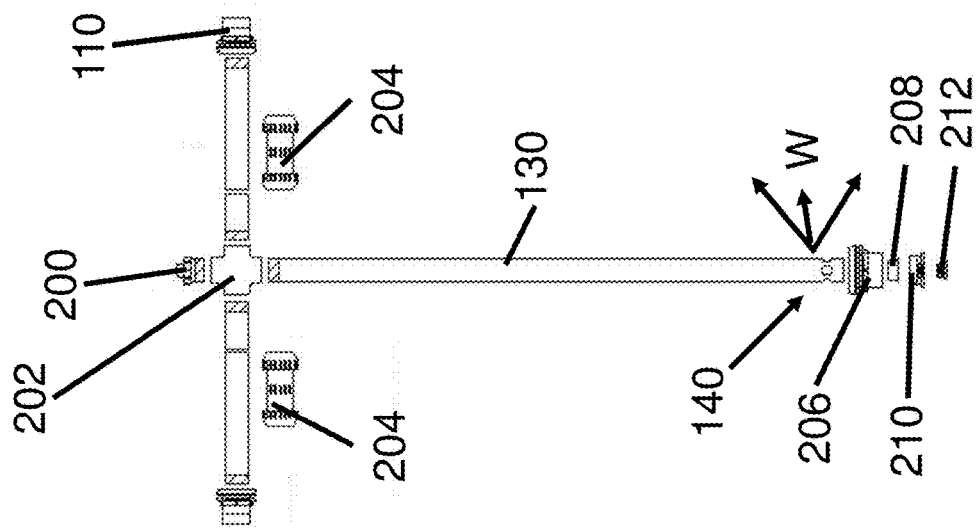
FIG. 2 is an exploded, side elevational view of plumbing parts of the fluidized bed reactor of FIG. 1.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software," "software application," and the like as used herein, are defined as a sequence of instructions designed for execution on a computer system. A "program," "software," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 5:
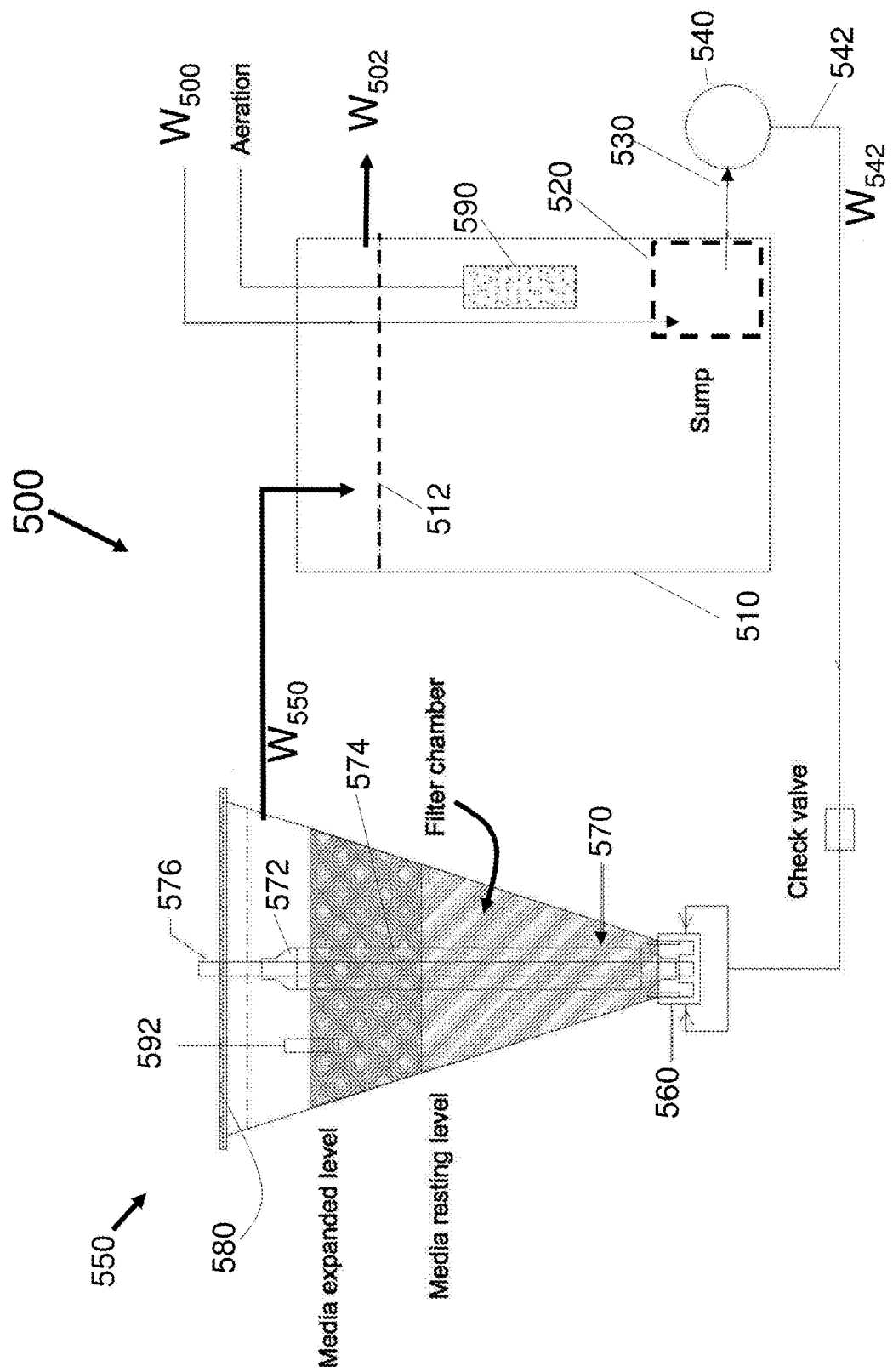
FIG. 5 is a vertical cross-sectional view and flow diagram of a filtration system according to one exemplary embodiment of the invention where the filter is separate from the sump.

Described now are exemplary embodiments of the present invention. Referring now to the figures of the drawings in detail and first, particularly to FIG. 5, there is shown a first exemplary embodiment of a denitrification system and process 500 according to the invention. This configuration of a sump and fluidized bed reactor is the same for both the anaerobic and aerobic stages with the exception of an aeration device used in the latter. FIG. 5, therefore, is an example of an aerobic stage because an aeration device 590 is present in the sump 510. With respect to the inventive features, however, they apply to both anaerobic and aerobic stages even though only the aerobic stage is illustrated here.

Incoming wastewater $W_{500}$ enters a filter sump 510 at a pump entry section 520. In the invention, this effluent $W_{500}$ is directed not into the sump 510 at any location therein but, rather, at a location adjacent a filter pump inflow conduit 530, this location is referred to herein as the pump entry section 520. The pump entry section 520 is defined only diagrammatically (with dashed lines) because it can be implemented in a variety of ways. In one exemplary embodiment, the pump entry section 520 can be two vertical walls extending upward from the bottom of the sump 510 at a bottom corner thereof to form an open-topped box. As long as the filter pump 540 is pumping at the same time the effluent $W_{500}$ is entering the sump 510, then virtually all of the effluent $W_{500}$ will be drawn into the pump 540 before exiting the open-topped box 520. Another exemplary configuration of the pump entry section 520 can be formed by a similar assembly of two corner walls to form a second open-topped box but these walls extend above the water level 512 of the sump 510. In such a configuration, therefore, all effluent $W_{500}$ is drawn into the pump 540—so long as the effluent $W_{500}$ does not overflow this open-topped box 520. If aeration of the fluid in an aerobic sump 510 is desired, it can be performed as shown in FIG. 5 by aerating the sump fluid outside the pump entry section 520. Alternatively, or additionally, the sump fluid inside the pump entry section 520 can be aerated. (Aeration can even be performed outside the sump 510 when fluidically connected to the sump 510 by input and output conduits similar to the secondary removal system 350 configuration shown in FIG. 3. The pump 540 transfers fluid in the pump entry section 520 to the fluidized bed reactor 550 of the invention at its injection base 560.

Filtered fluid $W_{550}$ processed by the fluidized bed reactor 550 enters the sump 510 from the fluidized bed reactor 550. As this fluid $W_{550}$ is cleaner than the fluid contained in the sump 510, it can enter the sump 510 at or near the sump's water level 512. This fluid $W_{550}$ can also enter the sump 510 at any other level as desired. Treated water $W_{502}$ leaves the sump 510 from the water level 512 as the fluid highest in the sump 510 is taken as being most free from the wastewater constituent filtered out by the fluidized bed reactor 550. For removal of the treated water $W_{502}$, in one exemplary embodiment, the wall of the sump 510 can be provided with an output port acting as a drain and, thereby, define the highest point of the water level 512 (so long as the rate of incoming treated water $W_{502}$ does not exceed the rate of drain plus the rate of any incoming wastewater $W_{500}$ if it enters the sump 510 and not only the pump entry section 520). In another exemplary embodiment, a flexible outlet tube can be connected to a device floating at the top of the fluidized bed and act as a skimmer to draw off the uppermost layer of liquid in the sump 510. Such a tube can float on top of the water and, therefore, allow the water level 512 to vary as desired.

Figure 1:
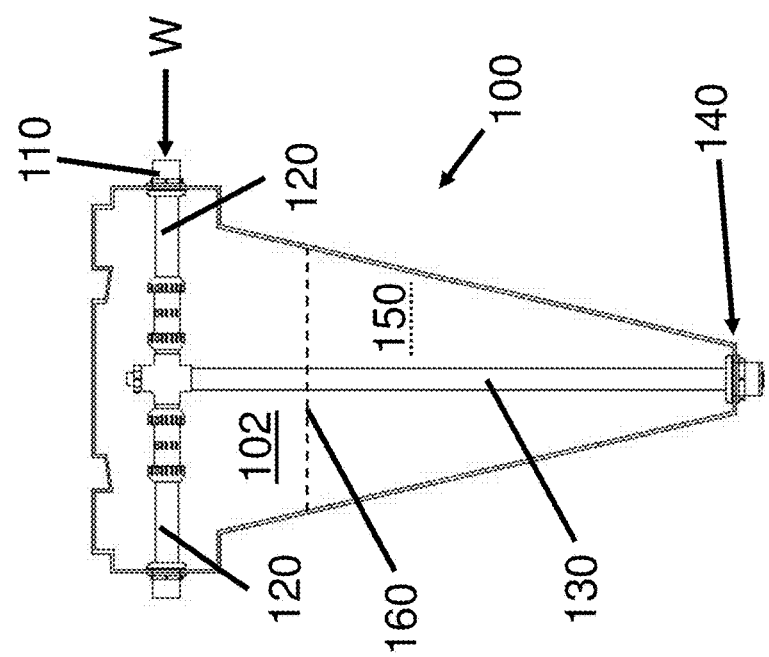
FIG. 1 is a vertical, partially cross-sectional view of a prior art fluidized bed reactor.

The invention includes a novel injector assembly 560, 570 that provides the water to be filtered $W_{542}$ to the bottom of the fluidized bed reactor 550 in a special way. This injector assembly is comprised of an injection base 560 and a flow regulation device 570. The injector assembly 560, 570 can be best seen in FIGS. 6, 7, and 8. In contrast to the prior art fluid injection system 120, 130, 140 (shown in FIG. 1) that forces the effluent W downwardly into the bottom of the fluidized bed reactor 550 from above, the injector assembly 560, 570 of the invention provides the water to be filtered $W_{542}$ into the bottom of the fluidized bed reactor 550 differently. More specifically, and with particular reference to FIG. 6, the injection base 560 provides the water to be filtered $W_{542}$ horizontally with respect to the Earth and tangentially with respect to the central axes 662, 672 of both the injection base 560 and the flow regulation device 570. FIG. 6 shows a cross-section of the injection base 560 along plane 6-6 shown in FIGS. 7 and 8. Multiple injection ports 664 are connected fluidically to the pump output 542 to receive the water to be filtered $W_{542}$ therethrough. As shown by the arrows 660, the water to be filtered $W_{542}$ enters the mixing chamber 766 of the injection base 560 substantially horizontally and in a straight line. Then, as it passes a point (e.g., a mid-point, here, the cross-sectional line 7,8-7,8), the flow is caused to spiral around the central axes 662, 672 and form a liquid cyclone or vortex. Having nowhere downward to go, the injected liquid spirals upwards in the mixing chamber 766 and into the interior chamber 652 of the fluidized bed reactor's body 750 where the filter media is present. Even though two injection ports 664 are illustrated, the inventive injector assembly 560, 570 can have one or more than two ports 664.

The novel water injector of FIGS. 6, 7, and 8 has significant advantages over the prior art. First, the new system provides three pathways for injecting fluid into the base of the filter as compared to the prior art system, which had only one. This is important if the water supply line became occluded due to a power failure, for example. Multiple inlets provide redundancy and security for restarting the fluidization. Next, in contrast to the prior art, the center inlet tube can also be used to supply wastewater (saturated with oxygen) straight to the base of the filter for maximum filtration effectiveness. The novel injector also is more robust and offers more mounting/plumbing options. The novel injector housing allows for modification to the center tube, thus allowing individual systems to be "custom tailored" to a specific system (different flow rates, media size, media density, etc.). Finally, multiple inlets in the base also allow for multiple supply pumps if such a configuration is desirable.

A watertight connection between the body 750 of the fluidized bed reactor 550 and the injection base 560 is created in this exemplary embodiment by a hollow lower tube 752 of the body 750 fitting snugly within an upper cavity 668 of the injection base 560.

As the vortex moves upwards, it presses against a lower plug 770 of the flow regulation device 570 at a lower expansion surface 772. Here, the lower expansion surface 772 has an annular shape increasing in diameter from bottom to top in the fluid movement direction (i.e., vertically upwards in the orientation shown in FIGS. 7 and 8). Of course, this shape can be changed as desired, for example, an inverted pear shape produces a slightly different result. This shape is not required to increase in diameter from inside to outside. Other shapes are possible.

Figure 10:
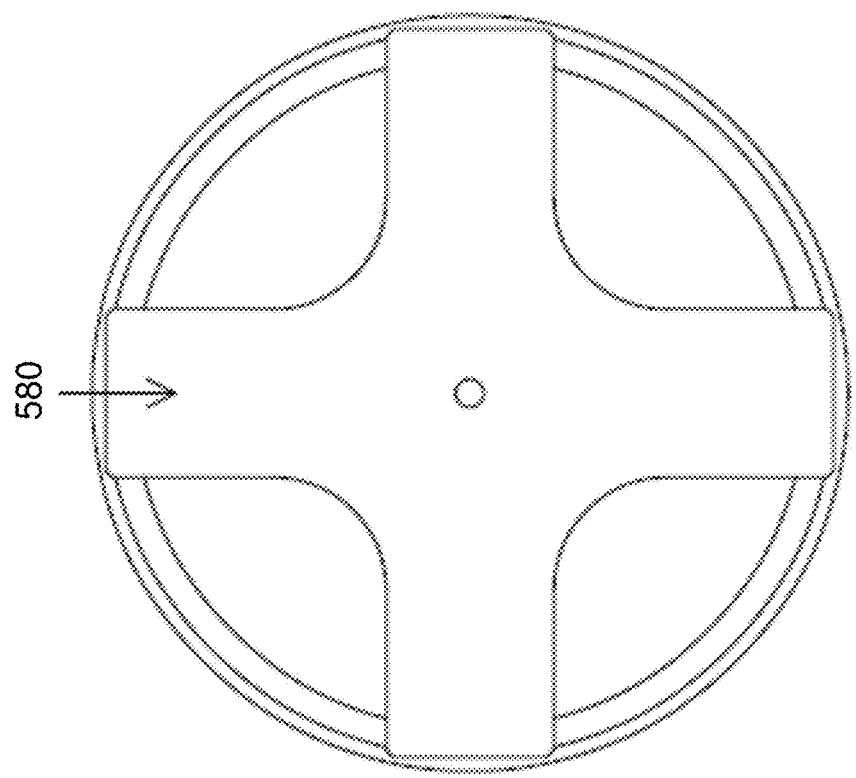
FIG. 10 is a plan view of an alternative exemplary embodiment of a support plate of the flow regulation device of FIG. 5.

The flow regulation device 570 is shown only partially in FIGS. 7 and 8 but in its entirety in FIG. 5. This exemplary embodiment of the flow regulation device 570 is made up of the lower plug 770, an upper collar 572, a hollow body 574 connected to both the lower plug 770 and the upper collar 572, and a central support tube 576 about which the lower plug 770 and the upper collar 572 are slidably disposed. The central support tube 576 fits into a socket 669 in the center of the injection base 560 and terminates, as shown in FIG. 5, above the body 750 of the fluidized bed reactor 550. A support plate 580 supports the central support tube 576 at the top of the fluidized bed reactor 550. The support plate 580 can be simply a strip of material spanning the entirety of the upper diameter of fluidized bed reactor 550 and having a hole in the center allowing the central support tube 576 to protrude therethrough. Alternatively, the support plate 580 can have the same central hole to fit the central support tube 576 therein but also be disk-shaped to cover the entire top opening of the body 750, thus preventing any contaminant in the environment from entering the top of the fluidized bed reactor 550. This upper and lower connection stabilizes the central support tube 576 and the entire float assembly 560, 570 within the fluidized bed reactor 550. The support plate 580 serves to center and support the air injection/support tube 576, to center and support the cone of the filter, and to allow over-flow water to return to the sump 510. An alternative embodiment of the support plate 580 is shown in FIG. 10.

With the connected assembly of the upper collar 572, the hollow body 574, and the lower plug 770 sliding about and along (vertically) the central support tube 576, these figures illustrate how the injection base 560 and the flow regulation device 570 cooperate to divert the flow upwards towards the sides of the fluidized bed reactor 550 and simultaneously have the flow regulation device 570 act as a float or check valve of the fluidized bed reactor 550. More specifically shown by the transition from FIG. 7 to FIG. 8, the flow regulation device 570 lifts up from the force of the water, or, alternatively, is adjusted to a fixed position, thus diverting towards the sides of the interior chamber 652. The flow regulation device 570 falls back down when such flow is interrupted. This lift creates a flow gap 700 between the lower expansion surface 674 and the uppermost portion of the interior walls 710 of the injection base 560. As such, when pressure exists in the mixing chamber 766, the gap 700 is open and large as shown in FIG. 8, thus permitting liquid to flow into the filter media, the pressure of the liquid preventing filter media from entirely filling and, thereby clogging, the internal mixing chamber 766. Conversely, when pressure in the mixing chamber 766 is reduced or eliminated, before the filter media has a chance to enter the mixing chamber 766, the lower plug 770 completely enters the mixing chamber 766 (slightly lower in the mixing chamber 766 than shown in FIG. 7) to close the gap 700. When so closed, the lower plug 770 prevents filter media from settling into the internal mixing chamber 766 and plugging up the fluidized bed reactor 550. While the pressure of liquid entering the mixing chamber 766 may be sufficient to lift the float valve, the annulus between the central support tube 576 and the hollow body 574 can be filled with air and/or water to adjust buoyancy of the flow regulation device 570 either positively or negatively.

In an addition to the embodiment illustrated in FIGS. 5 and 7, the central support tube 576 (as well as the lower plug 770) can be fitted at the bottom with one or more outlets 800 (shown diagrammatically with dashed lines in FIG. 8) and at the top with a fluid supply to, for example, supply oxygen, air, water, or another fluid under pressure inside the interior mixing chamber 766. If desired, water can be injected into the central support tube 576 to clear material or filter media that somehow has bypassed the float valve and clogged the interior mixing chamber 766. This unclogging is referred to as "burping" the filter. While these outlets 800 are shown as discrete openings, the portion of the central support tube 576 where the openings 800 are shown can, instead, contain a porous material that would allow air or water to flow into the fluidized bed but prevent sand from clogging the openings.

Positioned anywhere inside the fluidized bed reactor 550 can be various sensors. One such sensor 592 (an oxygen probe for example) is shown as hanging from the support plate 580 and within the fluidized bed of filter media. Such sensors can measure temperature, dissolved solids, pH, dissolved oxygen, or other filter characteristic. If desired, data from such sensors can be used to adjust process parameters and, for example, be managed by microprocessor control. In the embodiment of FIG. 5, the fluidized bed reactor 550 is separate from the sump 510. This configuration still has the relatively large footprint described above.

Figure 9:
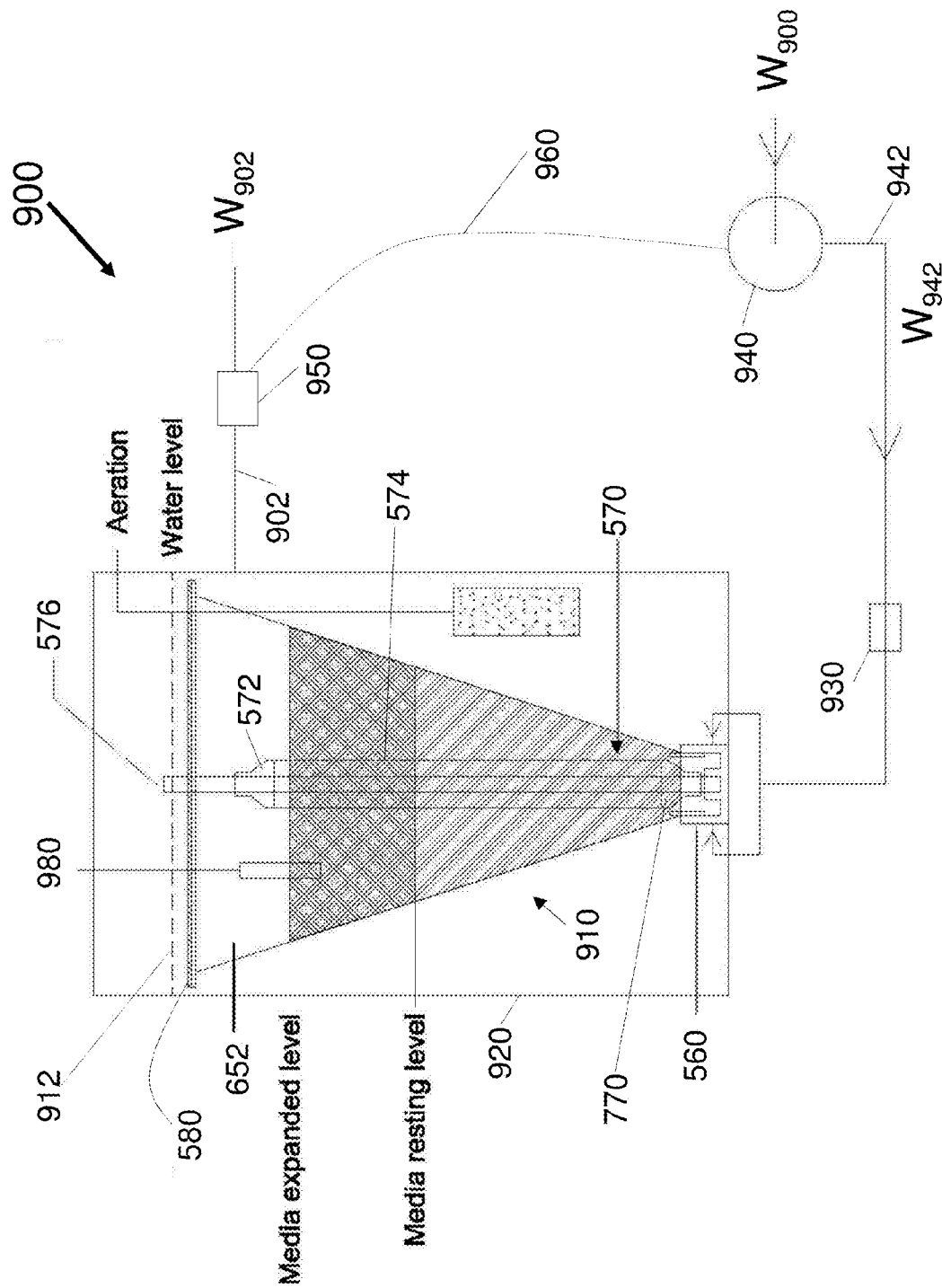
FIG. 9 is a vertical cross-sectional view and flow diagram of a filtration system according to another exemplary embodiment of the invention where the filter is within the sump.

In an alternative embodiment of the invention shown in FIG. 9, in contrast, the inventive filtration system 900 places the fluidized bed reactor 910 actually inside the sump 920. Mounting the fluidized bed reactor 910 in the sump offer several distinct advantages over mounting the fluidized bed reactor 910 externally. First, it eliminates expensive and complex support structure required for a conical tank. Second, placing the fluidized bed reactor 910 inside a sump offers outstanding mounting stability and protects the filter from being accidentally knocked over. Next, the fluidized bed reactor 910 has far better temperature stability because the fluidized bed reactor 910 is insulated by the water in the sump. Also, there is less thermal loss from a second external structure and its related plumbing. Fourth, the footprint of the entire system is greatly reduced (by about 40-50 percent). A fifth advantage is a significant reduction in the likelihood of a spill because all of the related plumbing of the fluidized bed reactor 910 is contained in the sump. Finally, such a configuration simplifies construction and shipping, which is not insignificant for a large filter system.

The injector assembly of this embodiment also is comprised of the same injection base 560 and flow regulation device 570 of the injector assembly of FIG. 5. As such, this injector assembly receives wastewater to be treated $W_{900}$ from a pump 940 through a pump output 942. This pump output 942 provides the water to be filtered $W_{942}$ into the bottom of the fluidized bed reactor 910 horizontally with respect to the Earth and tangentially with respect to the central axis of both the injection base 560 and the flow regulation device 570. This exemplary embodiment of the flow regulation device 570 also includes the lower plug 770, the upper collar 572, the hollow body 574 connected to both the lower plug 770 and the upper collar 572, and the central support tube 576 about which the lower plug 770 and the upper collar 572 are slidably disposed.

As the configuration and operation of the injection base 560 and the flow regulation device 770 in FIG. 9 are the same as already described above, the features thereof are not explained again. The support plate 580 also functions similarly to support the central support tube 576 at the top of the fluidized bed reactor 910. With the connected assembly of the upper collar 572, the hollow body 574, and the lower plug 770 sliding about and along (vertically) the central support tube 576, FIG. 9 illustrates how the injection base 560 and the flow regulation device 570 cooperate to divert the flow upwards towards the sides of the fluidized bed reactor 910 and simultaneously have the flow regulation device 570 act as a float or check valve of the fluidized bed reactor 910.

The embodiment of FIG. 9, however, differs with respect to the water level 912. Here, overflow of the fluidized bed reactor 910 always enters the sump 920—because the fluidized bed reactor 910 exists inside the sump 920. Accordingly, the water level 912 (shown with a dashed line) can be above the support plate 580.

There are significant and varied benefits by locating the fluidized bed reactor 910 inside the sump 920. First, as mentioned above, the footprint of the filtration stage reduces by half. Second, for example, the support plate 580 (or some other support at the upper end of the fluidized bed reactor 910) can be fixed to the inside of the opposing walls of the sump 920. With the injection base 560 also secured to the floor of the sump 920, the sump 920, itself, becomes the support structure for the fluidized bed reactor 910, thereby eliminating all of the expensive parts and assembly costs for the separate support structure required by the prior art and by the reactor configuration shown in FIG. 5. This savings of cost and materials is not insignificant. Next, the water surrounding the entire fluidized bed reactor 910 provides stability and support to the entire outer surface of the fluidized bed reactor 910. The water also serves to insulate the fluidized bed and stabilize temperature variations.

In an addition to the embodiment illustrated in FIG. 9, the central support tube 576 (as well as the lower plug 770) can be fitted at the bottom with one or more outlets 800 (like the ones shown diagrammatically with dashed lines in FIG. 8) and at the top with a fluid supply to, for example, supply oxygen, air, water, or another fluid under pressure inside the interior mixing chamber 766. If desired, water can be injected into the central support tube 576 to clear material or filter media that somehow has bypassed the float valve and clogged the interior mixing chamber 766. In addition to or instead of injecting fluid through the central support tube 576, oxygen or air can be injected downstream of check valve 930, into one or both of the injection ports 664 of the injection base 560, or into the mixing chamber 766. This injection can be used to alter the filtration process, for cleaning clogs, and/or for reestablishing fluidization (burp), to name a few.

If the pump 940 is the only measure for injecting effluent into the filtration system 900, then too much flow will cause the sump 920 to overflow, even if the treated water $W_{902}$ leaving the sump 920 is allowed to freely flow out through a skimmer tube 902 in the side wall of the sump 920. If desired, therefore, a flowmeter 950 can reside at the skimmer tube 902 and, through a communication device 960, provide information to the pump 940 in a feedback loop to regulate pump 940 activity. Such feedback can occur by a direct connection, wirelessly, or indirectly through a separate control system, such as a microcomputer connected to the Internet, for example.

Like the embodiment of FIG. 5, positioned anywhere inside the fluidized bed reactor 910 or the sump 920 can be various sensors. One such sensor 980, e.g., an oxygen probe, is shown as hanging from the support plate 580 and within the fluidized bed of filter media inside the fluidized bed reactor 910. Such sensors can measure temperature, dissolved solids, pH, oxygen, or other filter characteristics. If desired, data from such sensors can be used to adjust process parameters and, for example, be managed by microprocessor control. Examples of these alternatives are described in further detail below.

Various process characteristics of filtration according to the invention can be described with respect to FIGS. 5 to 8. The process of removing nitrogenous waste (such as ammonia, nitrite, and/or nitrate) and odors from wastewater using multi-zone aerobic, anaerobic (or both) fluidized expansion chambers first has incoming wastewater $W_{500}$ enter the sump 510 from external non-illustrated pump(s), siphon tube(s), overflow barrier(s) or gravitational flow, to name a few. The sump 510 acts as an "accumulator" for the wastewater $W_{500}$ being filtered, thus insuring the attached biological filter's supply pump 540 always has a steady supply of water for consistent media fluidization. If the sump 510 is oversized, it will contain water during high flow events and allow it to be properly processed by the filter system 500 over longer periods of time, i.e., there is no wash out. The turnover rate into the sump 510 partially dictates the dwell time for the water being treated. A slower intake flow allows the wastewater to be more thoroughly processed by the filtration system 500 as more wastewater passes through the media. Even under conditions of no flow, the filtration system 500 remains active and fluidized. This is significant when dealing with batch flow or fluctuating wastewater flows.

The water being treated is ideally kept at a temperature of between 40 and 100 degrees Fahrenheit, at a pH of between 5 and 8, at oxygen levels greater than 2.0 mg/l for aerobic filtration and less than 1.0 mg/l for anaerobic filtration. Oxygen probes mounted or suspended in the media allows aeration to be properly set for the desired form of filtration. Oxygen can be added (if needed) to the wastewater in the sump 510. Other probes to detect temperature, pH, etc. can be used as well. Water $W_{542}$ enters the fluidized bed reactor 550 at the bottom center. The flow rate can be highly variable, but there should be enough water entering the chamber 652 to cause the resting media to become continuously "fluidized or expanded" above the resting level. But, the flow rate should not be fast enough to wash the media out of the fluidized bed reactor 550. "Pulsing" the inlet flow rate (periodically) above normal operation levels is helpful in insuring that the media does not have a chance to form "dead zones" where the media can de-fluidize and clump. The biological chamber 652 in the fluidized bed reactor 550 is a multi-zone, multi-diameter vessel that can be either an open-topped or pressurized container, depending upon the given circumstances. Progressively increasing the fluidized bed reactor's diameter drastically lengthens the "dwell time" of water being treated therein, allowing the water to be in contact with the bacteria for far longer periods of time than it would be in a cylinder of similar height. Depending upon the shape and flow rate, this can be an order of magnitude (or more) of additional exposure time to the media. The diameter increase also helps prevent media loss by decreasing the water velocity through the internal chamber 652. The solid media in the fluidized portion of the fluidized bed reactor 550 needs to have negative buoyancy and to be relatively uniform in classification. Fixed media can also be installed in the top portion of the biofilter (above the fluidized media) to provide additional bacterial attachment points.

Another exemplary embodiment of the filter housing differs from a straight-sided cone. In such an embodiment, the walls can have a variable sweep (like a soda-bottle shape, for example). A variable sweep to the sidewalls allows the flow dynamics to be optimized for different media types and applications. Also, the filter chamber 652 can be built either as pressurized systems (water enters and leaves the filter under pressure) or as non-pressurized systems (water enters under pressure but drains from sump under gravity). Both types have individual applications and benefits. There also is a benefit to coupling fluidized bed reactors with anaerobic digesters. The anaerobic digesters mineralize additional nitrogen in the process of converting organic matter in the waste to methane. The additional mineralized nitrogen becomes available for removal from the wastewater and the methane from the anaerobic digester can be used to produce energy. If the final effluent is desired to be used as a fertilizer, then the fluidized bed reactor can be configured to convert ammonia nitrogen to nitrate but without the final conversion of the nitrate to atmospheric nitrogen ($N_2$). By doing this, the volatility of the nitrogen is reduced and less of the fertilizer value of the effluent will be lost during application of the effluent to the crops being fertilized. It is noted that nitrate is a preferred form of nitrogen for most crops.

What has been primarily described above are systems and processes for treatment of wastewater in a context independent from the overall environment, such as a singular facility. It has been discovered that the above systems/processes are not simply for stand-alone applications independent of the environment or other facilities. Rather, a single facility can be interconnected to a remote location for external control and monitoring. In this way, not only can the facility be operated to insure that no wastewater is discharged into the environment in a "micro" perspective, but the guarantee of non-discharge can be documented automatically with verifiable systems and reliable devices. Interconnection of a number of different systems in the environment or to other systems/processes provides enhanced benefits. More particularly, the invention is able to coordinate a particular wastewater system of the invention with other, separate wastewater systems so that an entire area (such as all wastewater systems along a particular waterway, for example) can be monitored and documented; this being referred to as a "macro" perspective of wastewater processing and control. Before describing the macro-system embodiment, an exemplary micro-process is described with regard to FIG. 11—"micro" referring to a singular bioreactor in this example and "macro" referring to the bioreactor combined with its surroundings and interconnections and its affect on the environment and other wastewater treatment facilities. To place the systems and processes of the invention in context, an exemplary embodiment is explained with regard to treatment of wastewater that would be generated from a dairy farm or other livestock-using industry location. In addition to treating wastewaters from confined animal feeding operations, the inventive fluidized bed reactor can be used to treat other wastewater streams including aquaculture, pond and lake maintenance, food processing, brewery and other fermentation and distillation processes, municipal and residential wastewaters, and other industrial wastewaters that require the removal of odors and nitrogen compounds.

In general, generated waste is collected in various ways, either through toilets or, in the dairy farm example, by washing manure off the floor of a dairy barn. Even though washing with water is an effective way of clearing the manure from the barn floor, the water then has to be treated/disposed of in some way. This flush water can be fresh water, which has a negative affect on the environment, or, according to an exemplary embodiment of the invention, the flush water can be recycled water processed from the wastewater treatment system of the invention itself.

Figure 11:
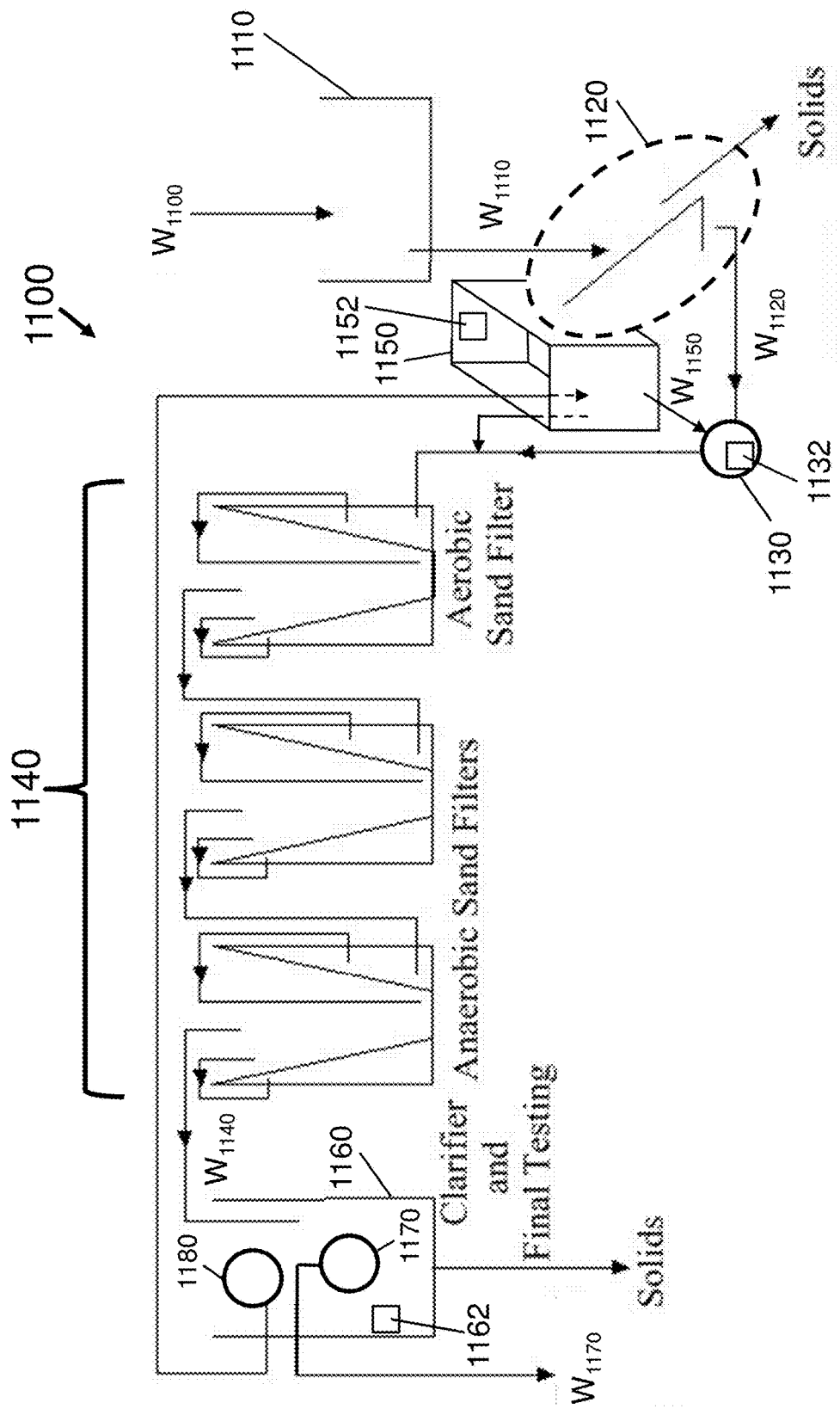
FIG. 11 is a diagrammatic flow diagram of a wastewater treatment system according to an exemplary embodiment the invention.

With regard to FIG. 11, the wash-off manure-water mixture $W_{1100}$ is collected in a holding facility or tank 1110, which could be a lagoon. The manure-containing water $W_{1110}$ is diverted to a solids separator 1120 (diagrammatically indicated by a dashed line) and the solids are removed for use as a soil amendment or bedding, for example. The solids-free water can be contained in a non-illustrated sump if desired. A pump 1130 injects the solids-free water $W_{1120}$ into the sump of a first stage of a bioreactor 1140 according to the invention. Here, the bioreactor 1140 is shown with one aerobic and two anaerobic filter stages, in particular, sand filters. This exemplary configuration also employs the low-footprint filter configuration of the invention shown in FIG. 9. This configuration is only exemplary and can be expanded in any configuration as desired or as described herein. The water pump 1130 for pumping solids-free water has two inputs, the first solids-free water $W_{1120}$ arrives from the output of the solids separator 1120 and the second $W_{1150}$ arrives from an output of a pre-filter sump 1150, which is described in further detail below.

After passing through an aerobic filtration stage and at least one anaerobic filtration stage (typically two or more), the filtered water $W_{1140}$ enters a post-filter holding sump 1160, which can be a lagoon or any other holding area that contains the filtered water $W_{1140}$ and prevents it from being discharged into the environment in any way, even when the system 1100 is not functioning or when the sump 1160 experiences a sudden influx, whether of fresh water, of wastewater, or of any other contamination. In this way, the water $W_{1140}$ in the post-filter sump 1160 can be monitored at all times to determine if the quality of the water $W_{1140}$ is at or below permissible discharge levels. The post-filter sump 1600 being large enough to handle any output volume of the bioreactor 1140 allows the system 1100 of the invention to control very precisely what is discharged. To insure that only verified effluent is discharged out from the system, only when the contents of the post-filter sump 1160 is measured as "pollutant-free" (according to desired standards that can vary from system to system) will the output pump 1170 be allowed to remove water therefrom and transfer "clean" water $W_{1170}$ into the environment, which could be a sewer system, cropland, or a local waterway, to name a few. If, in contrast, the water $W_{1140}$ in the post-filter sump 1160 has an unacceptable level of contamination, then a recirculation pump 1180 transfers the water $W_{1140}$ from the post-filter sump 1160 back into the pre-filter sump 1150 for reprocessing in the biofilter 1140.

Sensor suites can be located at various locations in the inventive system. As used herein, a "sensor suite" can be one or more sensors, each measuring or detecting at least one characteristic of the water, the associated physical structure, the associated local environment of the structure, and/or the machinery associated with the structure. According to an exemplary embodiment, the water pump 1130 has a first sensor suite 1132, the pre-filter sump 1150 has a second sensor suite 1152, and the post-filter sump 1160 has a third sensor suite 1162. Of course, additional or alternative sensor suites can be located at any part or stage of the systems and processes of the invention. "First," "second," and "third" is not used here to describe a temporal association of the components or a physical association of the components; these labels are only used as identifiers to separate the understanding of the various sensor suites from one another. In one embodiment, for example, the three sensor suites 1132, 1152, and 1162 can be a single system with various parts and functions.

Exemplary sensors can include alarms, for example, visual (e.g., lights), aural (e.g., speakers), and/or communicative (e.g., an email or any electronic signal). The alarm signals can be sent directly, as in a monitoring booth at the location, or indirectly, e.g., transmitted through the Internet to a remote and/or automated site. Cameras can also be used as sensors. A camera can include a microphone when noise conditions are desired to be monitored. Water detection sensors can monitor water spills at any part of the systems/processes. With any of these sensors, it is beneficial to log data measured by each sensor so that past status can be verified and, possibly, future problems predicted. Data can be logged by local analog machines (e.g., paper and pen cylinders) or digital machines (e.g., electronic signals corresponding to current states) can transmit or store the data.

Parameters of the water including temperature, pH, oxygen ($O_2$) content, oxidation/reduction (ReDox), ammonia ($NH_3$), Nitrate ($NO_3$), flow (both presence and rate), total suspended solids (TSS), and fluidized bed level/height can each be measured with respective sensors. An example of a data table that can be kept by a respective sensor suite 1132, 1152, 1162 or set of sensor suites is set forth in the following table.

|  | 1132 | 1152 | 1162 |
|---|---|---|---|
| Temp | $T_1$ | $T_2$ | $T_3$ |
| pH | $pH_1$ | $pH_2$ | $pH_3$ |
| $O_2$ | $Ox_1$ | $Ox_2$ | $Ox_3$ |
| ReDox | $eH_1$ | $eH_2$ | $eH_3$ |
| $NH_3$ | $NH_1$ | $NH_2$ | $NH_3$ |
| $NO_3$ | $NO_1$ | $NO_2$ | $NO_3$ |
| Flow (y/n) | y/n | y/n | y/n |
| Flow (gpm) | $F_1$ | $F_2$ | $F_3$ |
| TSS | $TS_1$ | $TS_2$ | $TS_3$ |
| Bed Height | $BH_1$ | $BH_2$ | $BH_3$ |

As described above, many water treatment systems do not have the capacity to handle large surges of wastewater. As a result these systems routinely discharge polluted water because output water is discharged at the same rate it enters the system—when input flow exceeds processing capabilities of the system, the polluted water simply exits the system. The configuration of the inventive system 1100 described with regard to FIG. 11, eliminates this disadvantageous inability to process surges by sizing the holding tank 1110, the post-filter sump 1160, and the pre-filter sump 1150 sufficiently large enough to handle any surge that the system 1100 might experience. If the sensor 1132, 1152, and 1162 can monitor any or all of process flows, containment water levels, water temperatures, pH, nutrient concentrations, total suspended solids, actual and potential effects of local weather conditions, and others, then appropriate valves, pumps, and diverters can be actuated automatically to prevent any contaminated effluent from being discharged.

On a local site level, parameters that are measured by various probes and instruments connect to a central monitoring system (e.g., a personal computer), which contains and executes software that captures, processes, and records the sensed data and, then, remotely operates a number of responsive process control mechanisms such as valves, pumps, chemical dispensers, etc., to optimize the operation of a particular filtering system or to shut down one or more components or operations in the case of failure or need for repair. During times when the processed output exceeds the limits permitted for lawful or proper discharge (for example, the amount allowable under a particular permit), the invention can proactively divert output flow into a holding facility (i.e., tank or pond or sump) for reprocessing until concentration levels at the wastewater system output achieve compliance, at which time permissible discharge can occur. This "smart" interactive process is capable of monitoring and reporting on a local or regional basis (by coordinating the monitoring of adjacent sites or sites on the same waterway) and in real-time, allowing numerous advantages in monitoring the actual and potential discharges into a natural system, not the least of which is to allow affected dischargers to trade, sell or exchange excess capacity or allowances.

Figure 12:
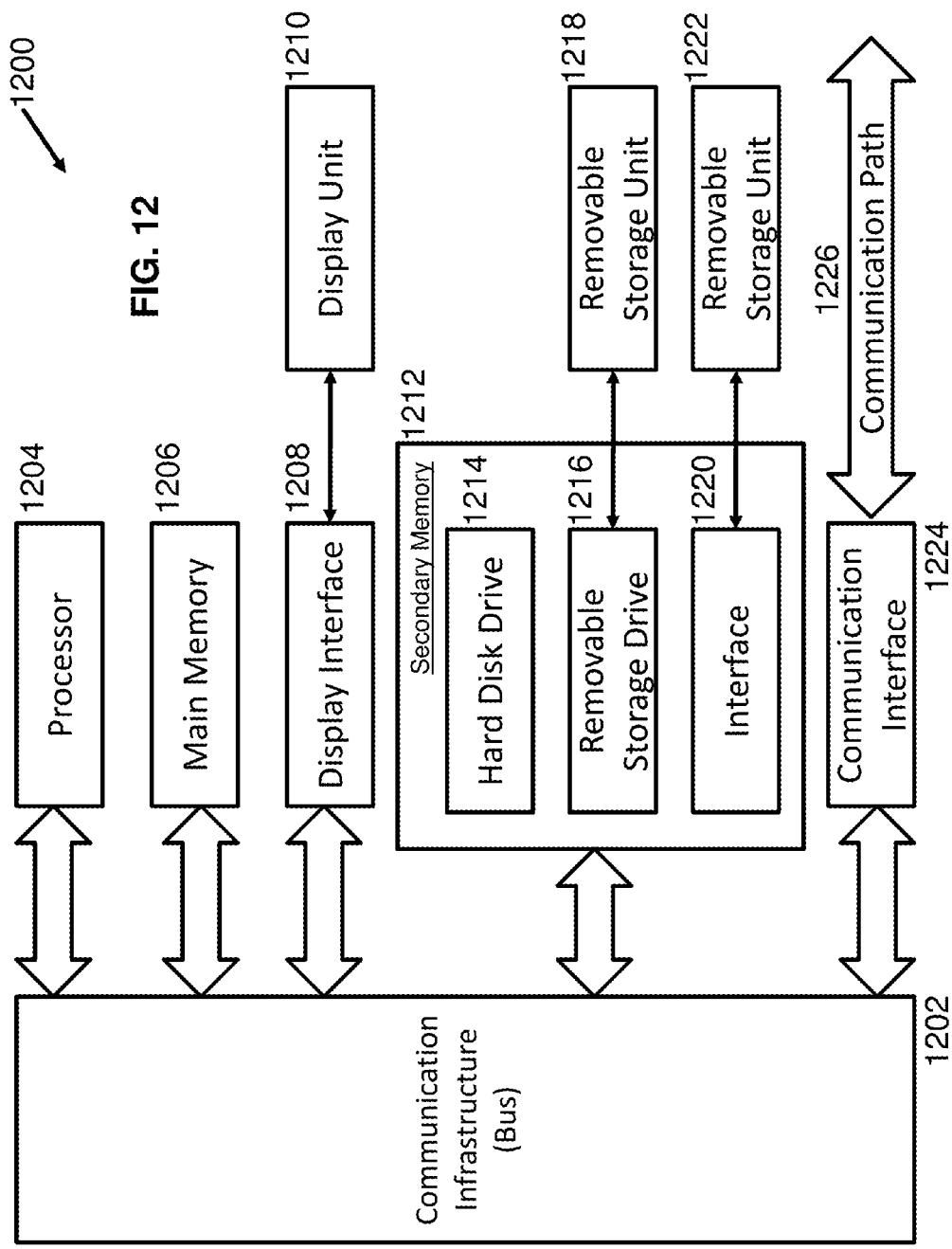
FIG. 12 is a block circuit diagram illustrating a computing system for implementing the central monitoring system according to an exemplary embodiment of the present invention.

FIG. 12 is a high-level, block diagram illustrating a detailed view of a computing system 1200 useful for implementing the central monitoring system according to embodiments of the present invention. The computing system 1200 is based upon a suitably configured processing device adapted to implement an exemplary embodiment of the present invention. For example, a personal computer, workstation, or the like, may be used.

In one exemplary embodiment of the present invention, the computing system 1200 includes one or more processors, such as processor 1204. The processor 1204 is connected to a communication infrastructure 1202 (e.g., a communications bus, crossover bar, or network). The computing system 1200 can include a display interface 1208 that forwards graphics, text, and other data from the communication infrastructure 1202 (or from a frame buffer) for display on a display unit 1210. The computing system 1200 also includes a main memory 1206, preferably random access memory (RAM), and may also include a secondary memory 1212 as well as various caches and auxiliary memory as are normally found in computer systems. The secondary memory 1212 may include, for example, a hard disk drive 1214 and/or a removable storage drive 1216, representing a floppy disk drive, a magnetic tape drive, an optical disk drive, etc. The removable storage drive 1216 reads from and/or writes to a removable storage unit 1218 in a manner well known to those having ordinary skill in the art. Removable storage unit 1218, represents a floppy disk, a compact disc, magnetic tape, optical disk, etc. which is read by and written to by removable storage drive 1216. As will be appreciated, components of the computing system 1200 (e.g., the main memory 1206 and/or the removable storage unit 1218) includes a computer readable medium having stored therein computer software and/or data. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer-readable information.

In alternative embodiments, the secondary memory 1212 may include other similar measures for allowing computer programs or other instructions to be loaded into the central monitoring system of the invention. Such measures may include, for example, a removable storage unit 1222 and an interface 1220. Examples of such may include a program cartridge and cartridge interface (such as that found in video game devices), a removable memory chip (such as an EPROM, or PROM) and associated socket, and other removable storage units 1222 and interfaces 1220 that allow software and data to be transferred from the removable storage unit 1222 to the computing system 1200.

The computing system 1200, in this example, includes a communications interface 1224 that acts as an input and output and allows software and data to be transferred between the central monitoring system of the invention and external devices or access points via a communications path 1226. Examples of communications interface 1224 may include a modem, a network interface (such as an Ethernet card), a communications port, a PCMCIA slot and card, etc. Software and data transferred through communications interface 1224 are in the form of signals that may be, for example, electronic, electromagnetic, optical, or other signals capable of being received by communications interface 1224. The signals are provided to communications interface 1224 through a communications path (i.e., channel) 1226. The channel 1226 carries signals and may be implemented using wire or cable, fiber optics, a phone line, a cellular phone link, an RF link, and/or other communications channels.

Herein, the terms "computer program medium," "computer usable medium," and "computer readable medium" are used to generally refer to media such as main memory 1206 and secondary memory 1212, removable storage drive 1216, a hard disk installed in hard disk drive 1214, and signals. The computer program products are measures for providing software to the computer system. The computer readable medium allows the computer system to read data, instructions, messages or message packets, and other computer readable information from the computer readable medium.

Computer programs (also called computer control logic) are stored in main memory 1206 and/or secondary memory 1212. Computer programs may also be received through communications interface 1224. Such computer programs, when executed, enable the computer system to perform the features of the present invention as discussed herein. In particular, the computer programs, when executed, enable the processor 1204 to perform the features of the computer system.

Figure 13:
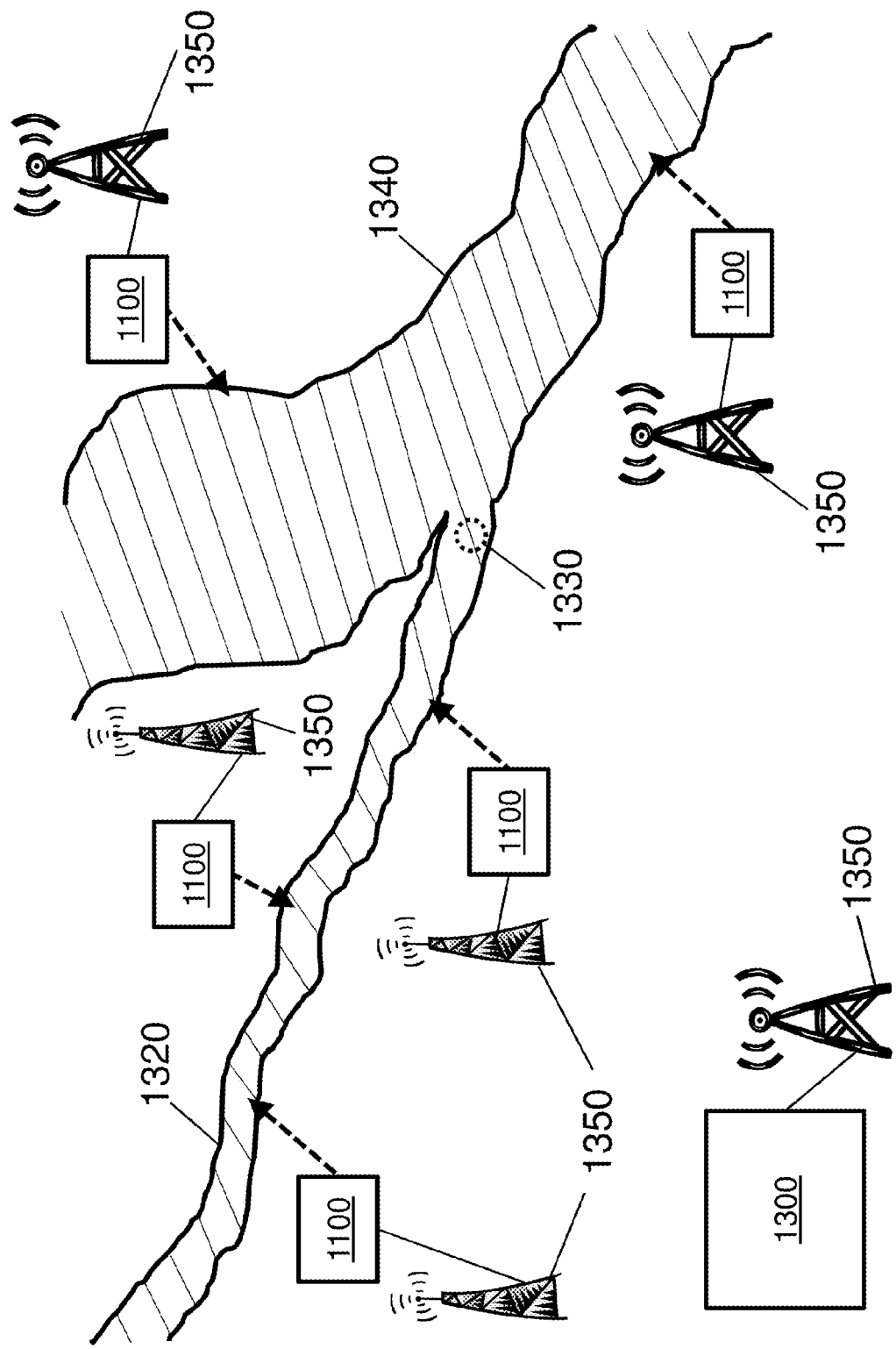
FIG. 13 is a diagrammatic illustration of an exemplary configuration of networked filter systems according to the invention along a particular aquifer.

Each of the inventive filtration systems has the ability to connect through the Internet or through other remote electronic measures to a central monitoring location, where operational parameters and maintenance of the systems can be observed and controlled. The monitoring location is able to view the data recorded by each filtration system (either periodically or in real-time), and, in an embodiment where a remote viewing system is used in conjunction (for example, a web camera), operational problems are observed and diagnosed remotely. If any problems occur that need physical repair or service, a live technician can, then, be dispatched to fix the filter system or that filter system could be shut down remotely or have its output diverted remotely or held until proper operation of the filter was restored. With the inventive connection of various dispersed filter systems, undesired diversion of wastewater into the aquifer is entirely prevented. FIG. 13 diagrammatically illustrates an exemplary configuration of networked filter systems according to the invention along a particular aquifer.

In the macro-system of the invention, each of the individual filtration systems 1100 is connected as a network to a central monitoring station 1300 (i.e., a computing system) where the output of all of the networked systems 1100 is monitored on a continuous basis to achieve compliance and protect against unauthorized discharge of contaminated water into the natural environment. In the exemplary embodiment shown in FIG. 13, three filtration systems 1100 according to the invention are disposed along an individual aquifer 1320, such as a stream. If the only wastewater sources on the stream 1320 are these three systems 1100, and if all effluent of these system 1100 are monitored, then the entire aquifer 1320 can be controlled simply by keeping track of the data generated by the three systems 1100. Of course, monitoring with appropriate measuring devices 1330 at the mouth of the stream 1100 where it exits into a waterway 1340 (such as a river) can insure compliance by the three filtration systems 1100. But, control of the three filtration systems' 1100 output, whether locally or at the central monitoring station 1300, insures that effluent is not placed into the stream 1320 when above minimum permissible tolerances.

Each of the filtration systems 1100 can communicate to the central monitoring station 1300 in any way. In FIG. 13, for example, the communication is shown as occurring wirelessly through respective communication towers 1350. In the macro view of the river 1340, pollution control can be carried out by monitoring not only the three filtration systems 1100 on the stream 1320, but also other filtration systems 1100 along the river 1340 itself. With real time monitoring and recording of data from all of the filtration systems 1100 along the various waterways 1320, 1340, pollutant-free verification can occur easily. As such, the invention provides continuous water treatment capability to a large number of distributed filter systems (e.g., physically separate and, possibly, far apart from one another) at a cost that is many factors cheaper than the cost of a conventional sewer system.

The invention, therefore, creates a virtual wastewater treatment monitoring and control system having a network of independent treatment or filtration systems that are instrumented to measure critical process parameters such as process flows, containment water levels, water temperature, pH, nutrient concentration, total suspended solids, actual and potential effects of local weather conditions, and others. The data produced and recorded by these individual subsystems are, then, transmitted electronically and captured at a central monitoring system of the invention, at which the received data is further analyzed and used to manage the systems remotely. The invention, thereby, provides oversight to the control and operation of the treatments systems being monitored. Not only does the inventive filter system 1100 decrease the space required at a particular wastewater generator, it turns it into a self-contained wastewater treatment plant that can be certified by any appropriate authority for having discharged no wastewater or only an exact, known, permissible quantity.

The filter system 500 shown in FIG. 5 illustrates an exemplary configuration according to the invention that has the filter 550 separated from the sump 510 and the pump 540 separated from both. In such a configuration, both the filter 550 and the sump 510 need their own support structure and the plumbing (e.g., 530, 542) and pump 540, disposed outside the filter 550 and the sump 510, need support as well. Such supporting structure is costly and consumes valuable space. In comparison, the filter system 900 shown in FIG. 9 illustrates an exemplary configuration according to the invention that places the entirety of the filter 910 inside the sump 920. In such a configuration, the supporting structure for the filter 910 is the sump 920 itself. Thus, a separate support structure, along with a significant amount of sump-to-filter plumbing is eliminated. While the pump 540 is shown as disposed outside the sump 920, it can be located therein. Further, the plumbing from the pump 540 to the injection base 560 can also be run inside the sump 920.

The substantially rectangular tanks shown in FIGS. 1 to 9 are beneficial when space is at a premium or when only a small throughput needs to be filtered. For example, if the assembly is to be placed inside a structure, a rectangular tank is a desirable configuration for moving the tank through a door. But, regardless of whether the pump and sump are separated from one another or together, the rectangle configuration becomes difficult and expensive when trying to scale up the system. When piping of greater than three inches is required, the weight of that pipe, with the liquid therein, requires strong and expensive supporting structure. This disadvantage is also present when the pump size increases. Both are costly and increase the required space. Another disadvantage that arises when plumbing and pumps are outside a sump is loss of heat. Exposed pipes means that the environment has a greater affect of the temperature of the liquid in the system. Where the environment is very cold but the filter water still needs to be maintained at filtering temperatures, exposed plumbing will allow heat to escape from the pipes, requiring additional and costly temperature control.

To eliminate such disadvantages, the invention includes another exemplary embodiment of the filtration system that is shown in FIGS. 14 to 17. More specifically, the filtration system 1400 utilizes a reinforced, circular outer container 1410 that holds therein all of the filtering elements 1500 and defines therein a set of independent sumps. Each of the filtering elements 1500 (see FIG. 15) can be similar to those already described, for example, in FIGS. 1, 2, and 5 to 8, but the most similar one is that shown in FIG. 9 because the filter 910 itself rests within the sump 920 and is supported by the walls surrounding the filter 910.

By selecting a particular interior baffle assembly or bulkhead system 1412, and by placing various filters 1500 according to the present invention in at least one of the baffle chambers, the filtration system 1400 becomes self-contained as well as self-supporting. All of the features of the above-mentioned systems are provided while, at the same time, the configuration can be scaled up to very large sizes sufficient to equal or exceed the maximum size and weight requirements for conventional trucks able to haul items such as a solid, one-piece, outer container 1410 from a manufacturer to an end user.

Figure 15:
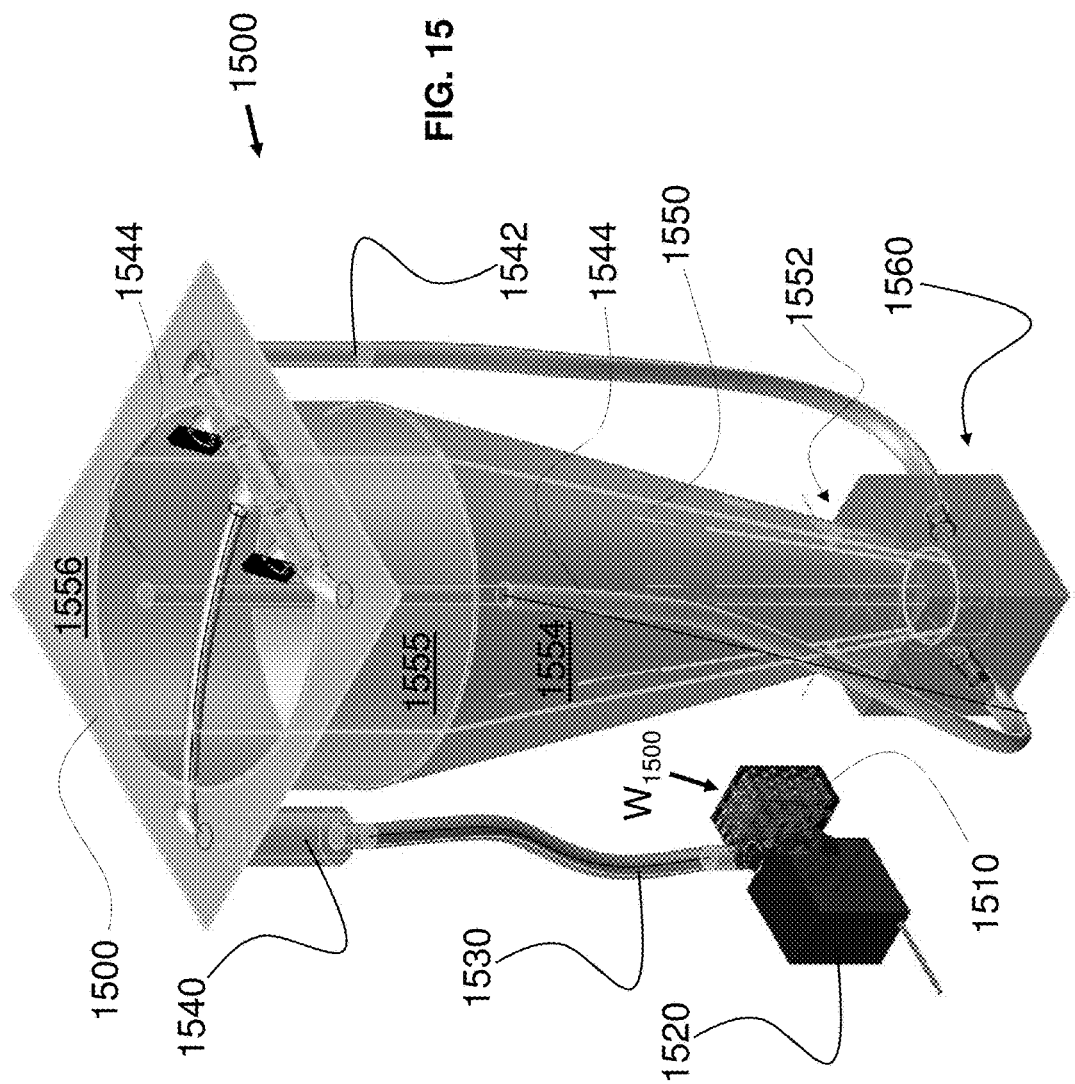
FIG. 15 is a perspective view from a side of a filter element of the system of FIG. 14.

Before describing the overall configuration of the exemplary filtration system 1400, the filtering elements 1500 are described with regard to FIG. 15. Each filter element 1500 is modular and is configured to rest within an individual sump. The individual packing of a filter element 1500 within its own sump is described above in detail and will not be repeated here. More specifically, incoming wastewater $W_{1500}$ from the sump (the bottom of the sump in this exemplary embodiment) enters a pump entry filter 1510 on the inflow side of a filter pump 1520. The filter pump 1520 transfers fluid from the sump through a pump output conduit 1530 and, if desired, through a one-way check valve 1540. The output of the check valve 1540 is directed above the filter body 1550 and, like earlier mentioned filter embodiments, splits into respective injector conduits 1542, 1544, which are directed into an injector assembly 1560 at a base 1552 of the filter body 1550. The injector assembly 1560 is similar to that illustrated in FIGS. 5 to 9 and, therefore, will not be explained again in detail. If desired, a backflow prevention device as shown in FIGS. 6 to 8 can be included and placed about a central support tube 1570 inside the filter body 1550. A non-illustrated fluidized bed is present in a lower cone section 1554 of the filter body 1550 as described above.

The filter cone 1554 of the filter body 1550 in this exemplary embodiment differs from the ones in previous embodiments. More particularly, the upper portion of the taper is substantially cylindrical (this is defined as a relatively small angle of less than 10 degrees because such an angle is needed as a draft angle in the upper cylinder 1555 in order to remove the filter body 1550 out of the mold when created by injection molding or fiberglass, for example). With all fluidized beds, the height of the fluidized column is limited by several factors including flow rate of the water and characteristics of the media. In an exemplary process for using the filter elements 1500, the fluidization height is set to fill the entire height of the cone before it becomes cylindrical. The upper cylinder 1555 of the filter body 1550 above the conical section 1554 is used as a buffer to keep the media (e.g., sand) from overflowing the filter body 1550. By using a cylindrical section 1555 above the conical section 1554 to prevent overflow, the diameter and volume of the sump tank containing the respective filter element 1500 is reduced. Conversely stated, if the conical section 1554 were to continue all the way to the top 1556 of the filter body 1550, then the diameter of the outer tank 1410 will have to increase accordingly. This different filter body configuration allows for a sump tank having a smaller diameter and a lower volume.

Figure 14:
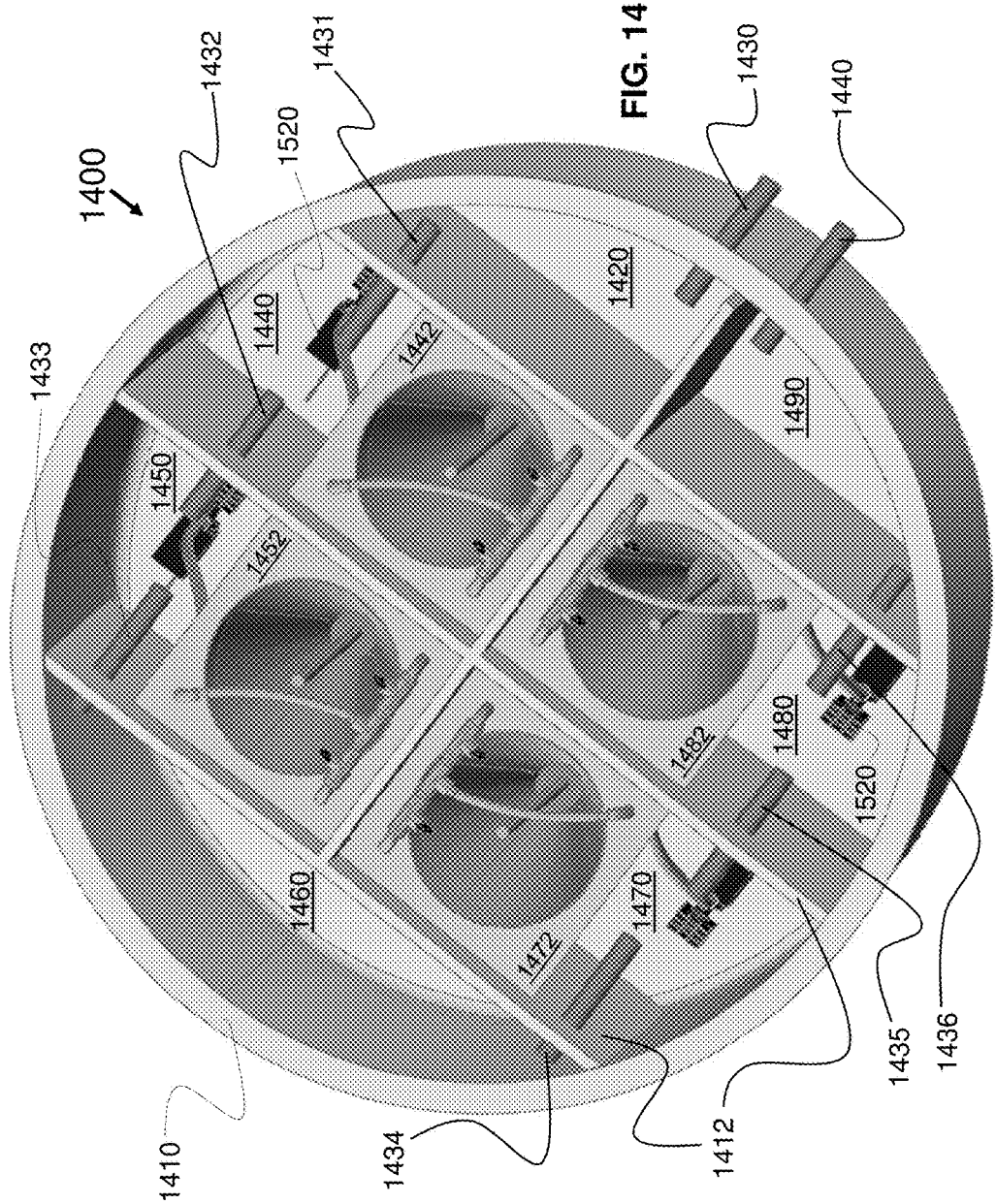
FIG. 14 is a perspective view from above another exemplary embodiment of a filtration system according to the invention.

By routing the conduits from the pump 1520 up to the top 1556 of the filter body 1550 as shown in FIG. 15, access of all fluid conduits of the filter element 1500 is made easy for maintenance from above. While the filter pump 1520 and its pump output conduit 1530 seem to be located in FIG. 15 below the top surface 1556 of the filter body 1560, and therefore obstructed, the filter pump 1520 and pump output conduit 1530 can be placed advantageously in the respective sump to the side of the filter element 1500—resulting in a clear, unobstructed view from above by maintenance crew. This laterally offset orientation is shown in FIG. 14 and described in the following text.

The exemplary configuration of the filtration system 1400 with filtering elements 1500 is described with regard to FIGS. 14 to 17. The filtration system 1400 includes an in-feed conduit 1430, a number of intermediate bulkhead conduits 1431, 1432, 1433, 1434, 1435, 1436, and an out-feed conduit 1440. By organizing the conduits 1430, 1431, 1432, 1433, 1434, 1435, 1436, and 1436, and 1440 from highest in elevation to lowest, in this order, the entire filtration system 1400 can be gravity fed as explained in further detail below.

Fluid to be filtered by the filtration system 1400 enters a first sump 1420 through the in-feed conduit 1430. When the level of fluid in the first sump 1420 is above the bottom of the first intermediate conduit 1431, that fluid flows from the first sump 1420 to a second sump 1440, in which is contained a first filter 1442 of a set of the filter elements 1500.

When the level of fluid in the second sump 1440 is above the bottom of the second intermediate conduit 1432, that fluid flows from the second sump 1440 to a third sump 1450, in which is contained a second filter 1452 of the set of filter elements 1500.

When the level of fluid in the third sump 1450 is above the bottom of the third intermediate conduit 1433, that fluid flows from the third sump 1450 to a fourth sump 1460. Any device for measuring, altering, and/or affecting the fluid can be placed in the fourth sump 1460, for example, an aerator, a pH sensor, or a fluid fractionator. Of course, such devices can be placed in any of the many sumps located within the filtration system 1400. Alternatively, the fourth sump 1460 can be left empty as shown in FIG. 14 or can be subdivided in any number of ways.

When the level of fluid in the fourth sump 1460 is above the bottom of the fourth intermediate conduit 1434, that fluid flows from the fourth sump 1460 to a fifth sump 1470, in which is contained a third filter 1472 of the set of filter elements 1500.

When the level of fluid in the fifth sump 1470 is above the bottom of fifth intermediate conduit 1435, that fluid flows from the fifth sump 1470 to a sixth sump 1480, in which is contained a fourth filter 1482 of the set of filter elements 1500.

Figure 16:
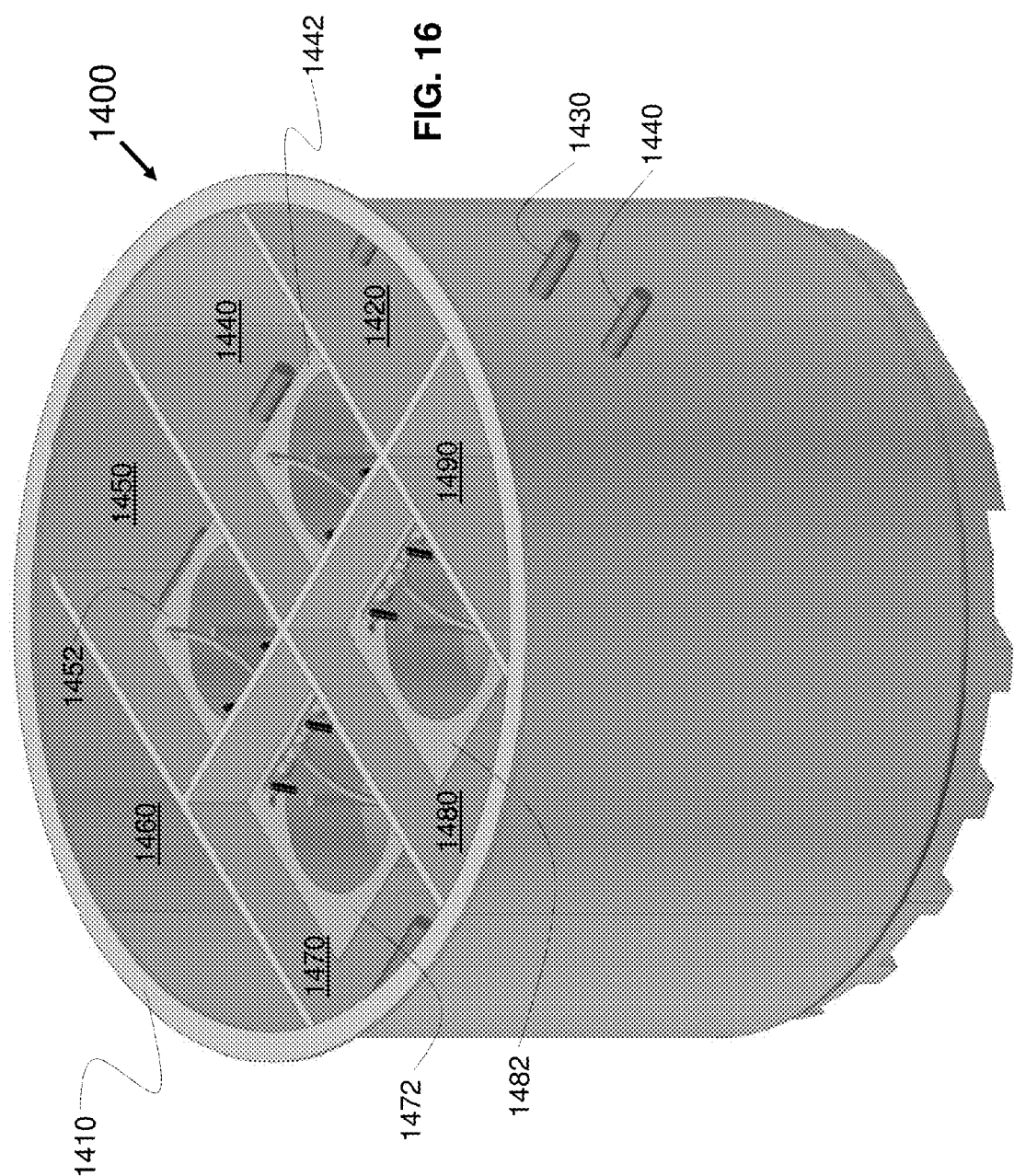
FIG. 16 is a perspective view from the side of the filtration system of FIG. 14.
Figure 17:
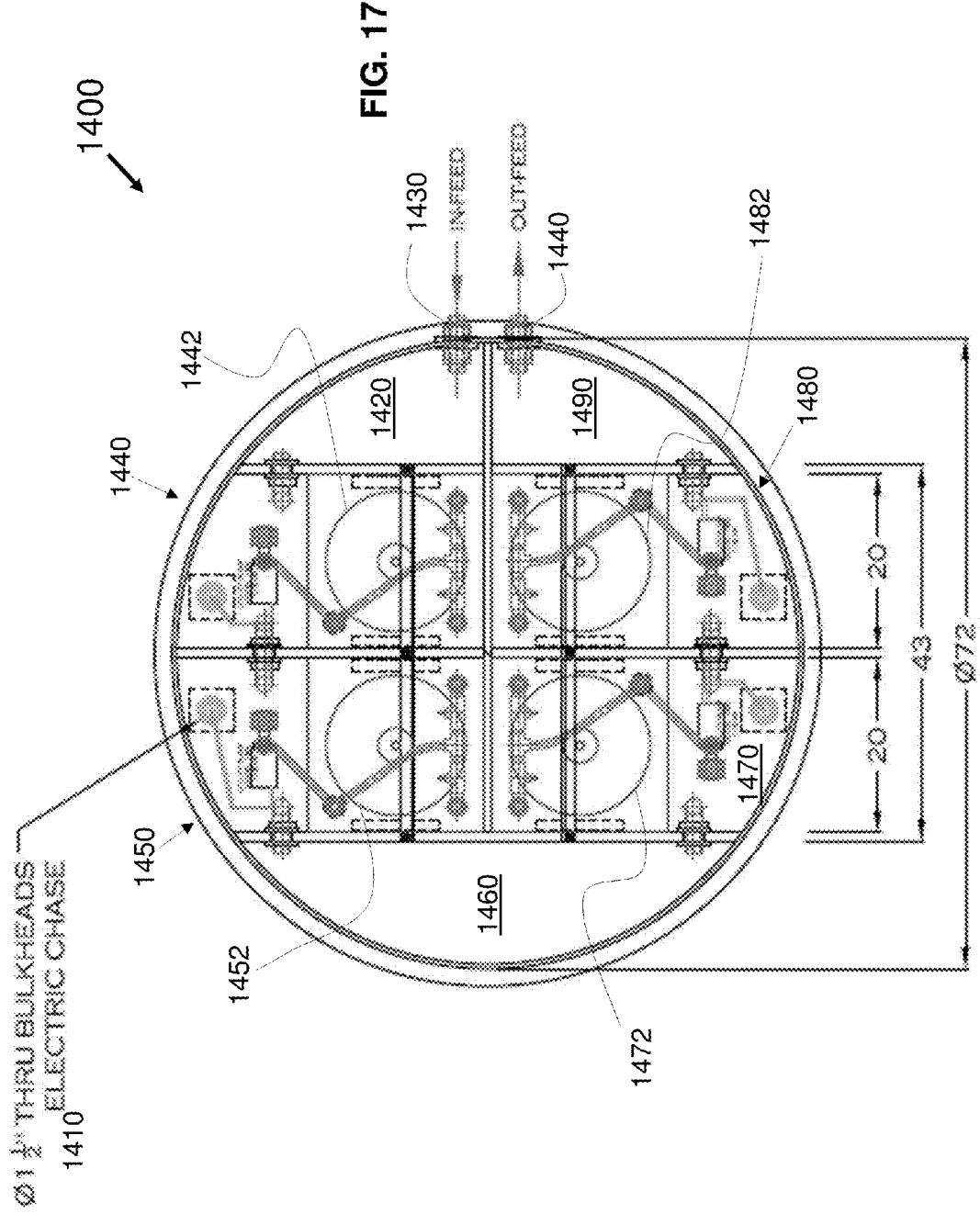
FIG. 17 is an engineering diagram of a plan view of the filtration system of FIG. 14.

When the level of fluid in the sixth sump 1480 is above the bottom of the last intermediate conduit 1436, that fluid flows from the sixth sump 1480 to an output sump 1490. Like the fourth sump 1460, any device for measuring, altering, and/or affecting the fluid in the either of the input or output sumps 1420, 1490 can be placed therein, for example, an aerator, a pH sensor, or a fluid fractionators and the sump 1490 can be subdivided in any number of ways. Alternatively, the input and output sumps 1420, 1490 can be left empty as shown in FIGS. 14, 16, and 17.

In the above-described configuration, therefore, each of the chambers defined by the second 1440, third 1450, fifth 1470, and sixth 1480 sumps forms a filter stage of a four-stage filter defined by the exemplary embodiment of the filtration system 1400. Utilizing the examples of the filters mentioned above, the first filter stages 1440 can be an aerobic filter stage and the remaining filter stages 1450, 1470, and 1480 can be anaerobic filter stages. Although the above-described configuration is illustrated herein as a set of seven sumps, any configuration of bulkheads, filters, sumps, conduits, etc. that can fit inside the tank 1410 is envisioned in the present invention.

Figure 18:
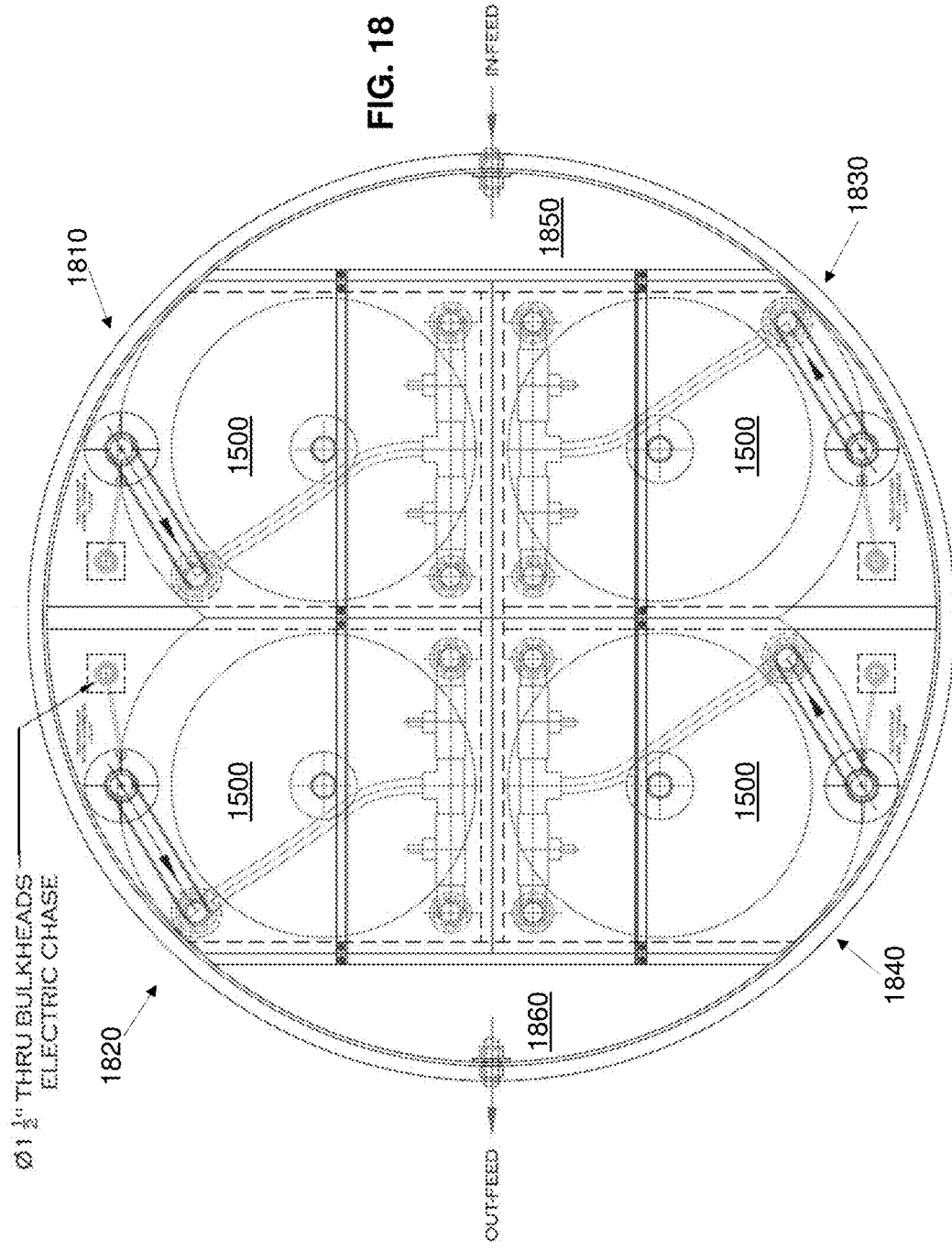
FIG. 18 is a engineering diagram of a plan view of yet another exemplary embodiment of a filtration system according to the invention.

FIG. 18 illustrates another variation of a four-stage filter system 1800 according to the invention. In this system 1800, the filter elements 1500 are relatively larger in comparison to the embodiment of FIGS. 14, 16, and 17 and take up more space in the respective sumps 1810, 1820, 1830, 1840. Additionally, this configuration can be set up as two parallel filters where flow proceeds in the first filter from sump 1850 through sumps 1810 and 1820 and, finally into output sump 1860. In parallel therewith, flow proceeds in the second filter from sump 1850 through sumps 1830 and 1840 and, finally into output sump 1860. For example, filter elements 1500 in sumps 1810 and 1830 can be aerobic filters and filter elements 1500 in sumps 1820 and 1840 can be anaerobic filters. Any variation is possible with appropriate flow diversion through conduits connecting the respective sumps.

An important benefit provided by the round tank is that it lends to scaling up the systems according to the invention to very large sizes. This configuration also provides the benefit of reducing complex systems of feed-through conduits. When attempts to scale-up the embodiments of non-round tank systems described herein, the so-called "smaller" designs, plumbing becomes very complicated and the pumps need to be mounted outside the sumps because of the cramped conditions of the respective sumps. With all sections of the multi-stage filter in a single, one-piece, outer tank 1410 separated by bulkheads 1412, the amount of plumbing required to connect each filter is reduced and any leakage problems are virtually eliminated. The round configurations illustrated optimize area for a self-contained system according to the invention. This is not an absolute. Ovular tanks can be used as well.

Another benefit provided by the assembly of the present invention is that the total footprint is greatly reduced. While the individual tanks in the above-mentioned configurations were kept apart to allow the plumbing fixtures to be connected, in the round-tank design, all of the various subsystems are contained within a single housing. This configuration of the tank is self-supporting and even a large tank does not require any external supports.

Another factor to consider when creating the systems of the invention is regulation of temperature. Biofilters need to operate within certain temperature ranges but these systems also need to be located in, for example, dairy farms in northern states (i.e., cold climates) As such, insulation around and above the system is needed. Where the environment is cold, not only does the external round tank become the support structure, it also insulates the filters naturally by placing them in central sumps. The round, flat exterior of the tank is advantageous because it is relatively easy to add exterior insulation, especially on the closed bottom and easily accessed sides. In an exemplary embodiment, the round tank 1410 is made out of a foam-fiberglass composite the same way a surfboard is made. The composite is very strong and lightweight. The foam-fiberglass composite has an insulating factor of R-18 on the outer walls. This insulation helps to control and regulate the temperature of the filter. For the top of the tank, a non-illustrated insulated lid (e.g., having an R-12 rating) can cover the entire open top and help keep the temperature regulated and prevent both evaporative cooling and contamination from outside sources.

Figure 19:
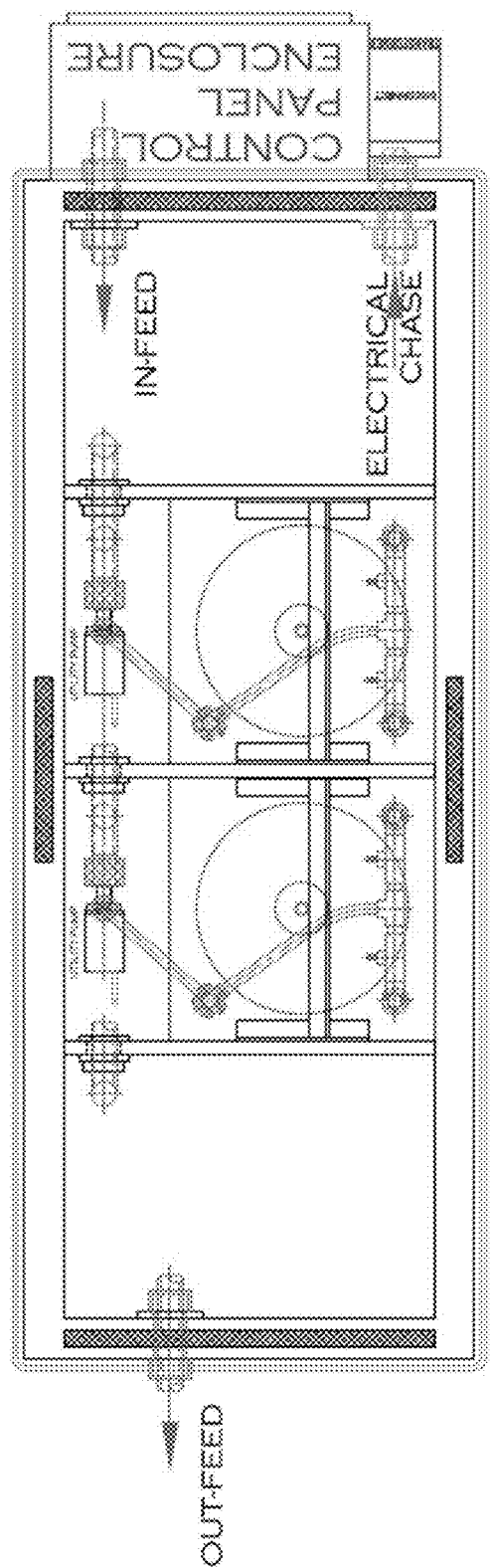
FIG. 19 is a top plan view of an exemplary rectangular configuration of a filtration system according to the invention with a control panel enclosure.
Figure 20:
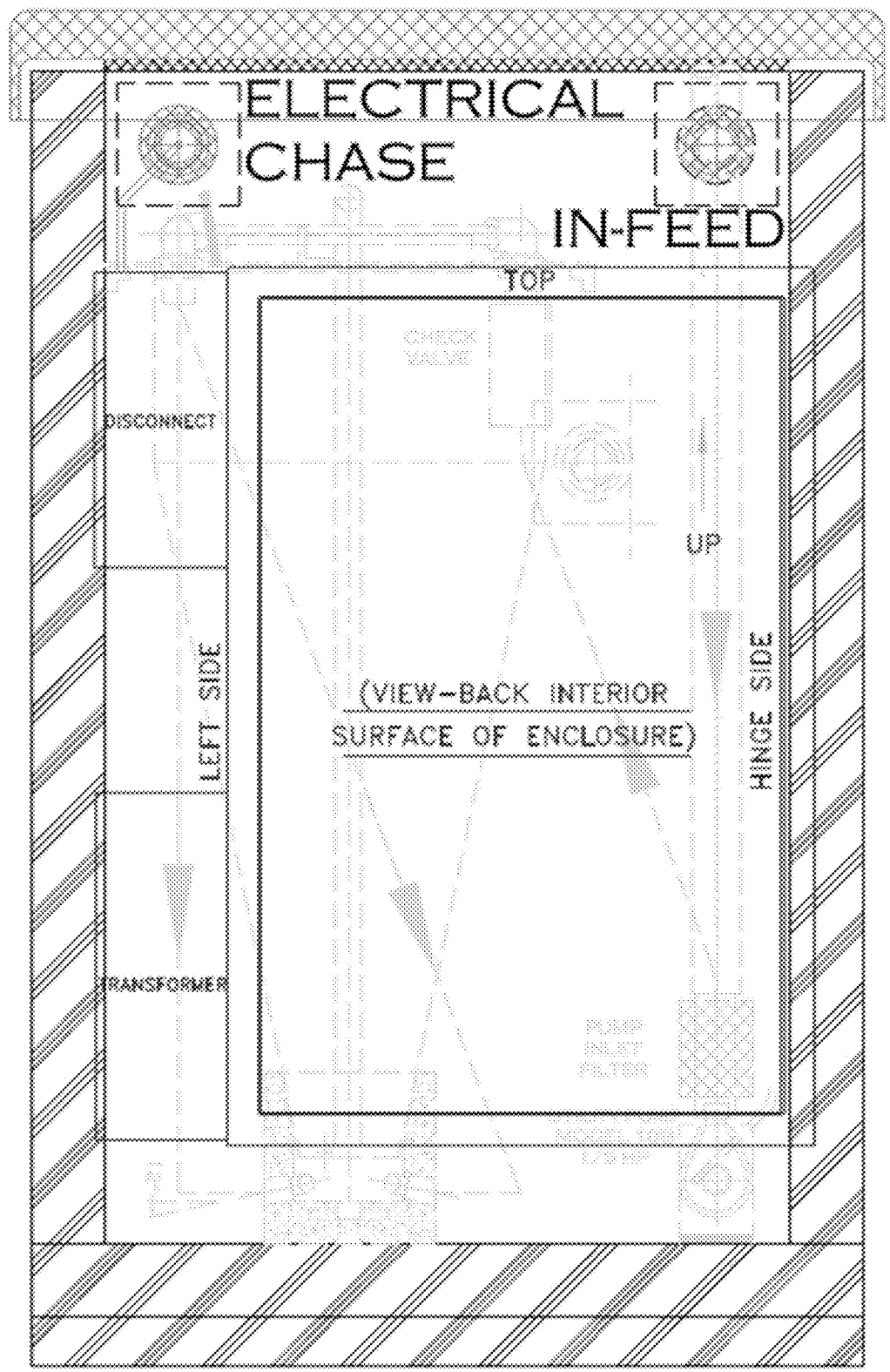
FIG. 20 is an in-feed side elevational view of the filtration system of FIG. 19.
Figure 21:
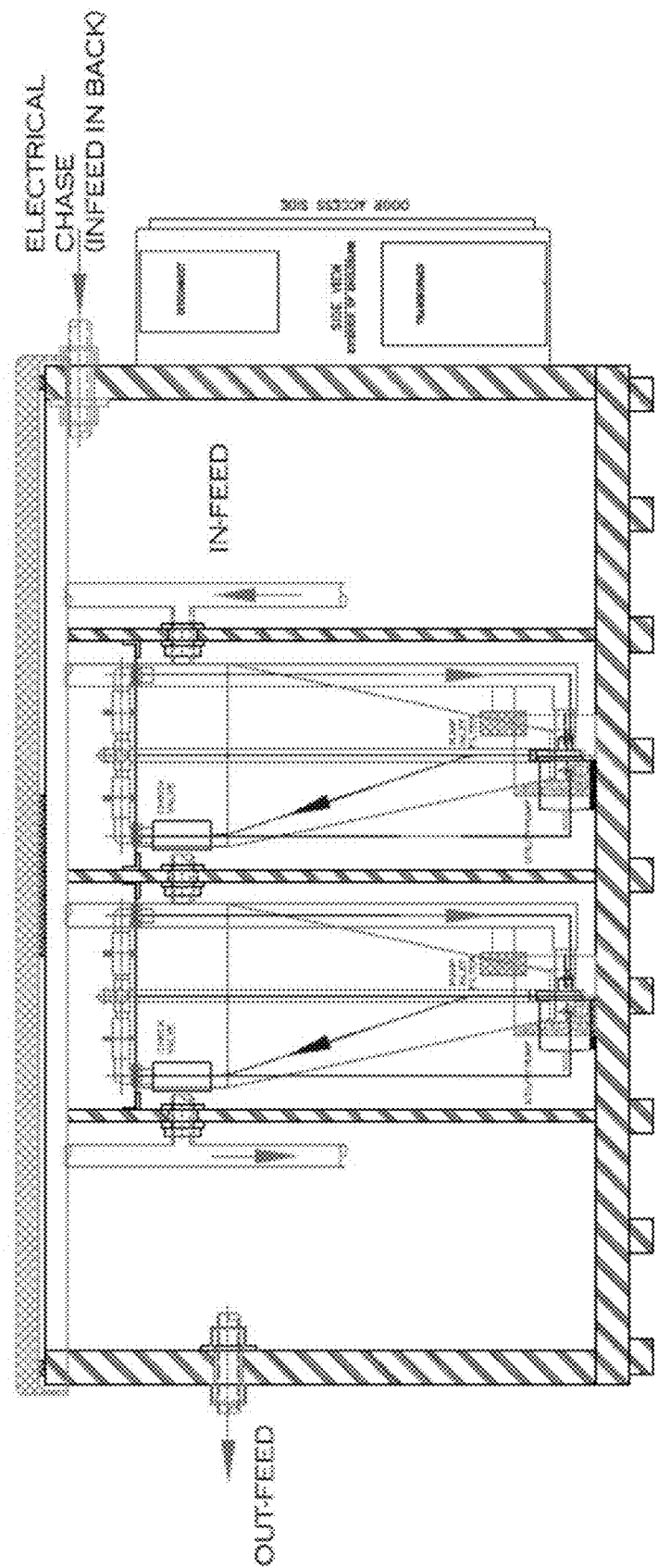
FIG. 21 is a cross-sectional view of the filtration system of FIG. 19 from a left side thereof.

The invention, however, is not limited to round configurations. FIGS. 19 to 30 illustrate variations of rectangular configurations. The rectangular configuration shown in FIGS. 23 to 25 illustrate a configuration that is sized to fit within a standard door. The individual filter elements 1900 disposed within their own sumps 1920, 1930 of the outer tank 1910 separate by bulkheads 1912 are described above in detail and will not be repeated here. A control panel enclosure 1940 is illustrated in FIGS. 19, 20, and 21 and encloses at least the electrical devices associated with this exemplary embodiment. FIG. 19 is a top plan view of the rectangular configuration. FIG. 20 is a side elevational view of the control panel enclosure 1940 and the in-feed side of the outer tank 1910. FIG. 20 includes the following sensor inputs:

1) Temperature Thermocouple 1-10 Locations
2) pH Electronic Probe 4-8 Locations
3) Ammonia Concentration—Gas Probe—1 Location
4) Dissolved Oxygen—Gas Probe—1 Location
5) Nitrate Concentration—Electronic Probe—2-4 Locations
6) Total Dissolved Solids—Electronic Probe—2-4 Locations
7) Total Nitrogen—Electronic Probe—2-4 Locations
8) Vibration—Electronic Probe—2 Locations
9) Oxygen Flow Rate—Electronic Probe—1 Location
10) Oxygen Pressure—Regulator—1 Location
11) pH Chemical Balance—Liquid Flow (Acid and Base)—Electronic Probe—2 Locations
12) Fluid Level—Mechanical—4-8 Locations and includes the following control outputs:

1) Valve Open/Close/Regulate—Motor Control—3 Locations
2) Oxygen Regulation Valve—Motor Control—1 Location
3) Pump on/off Switch—Circuit Breaker—2-3 Locations
4) pH Chemical Dispenser on/off Valves—2 Locations.

Figure 22:
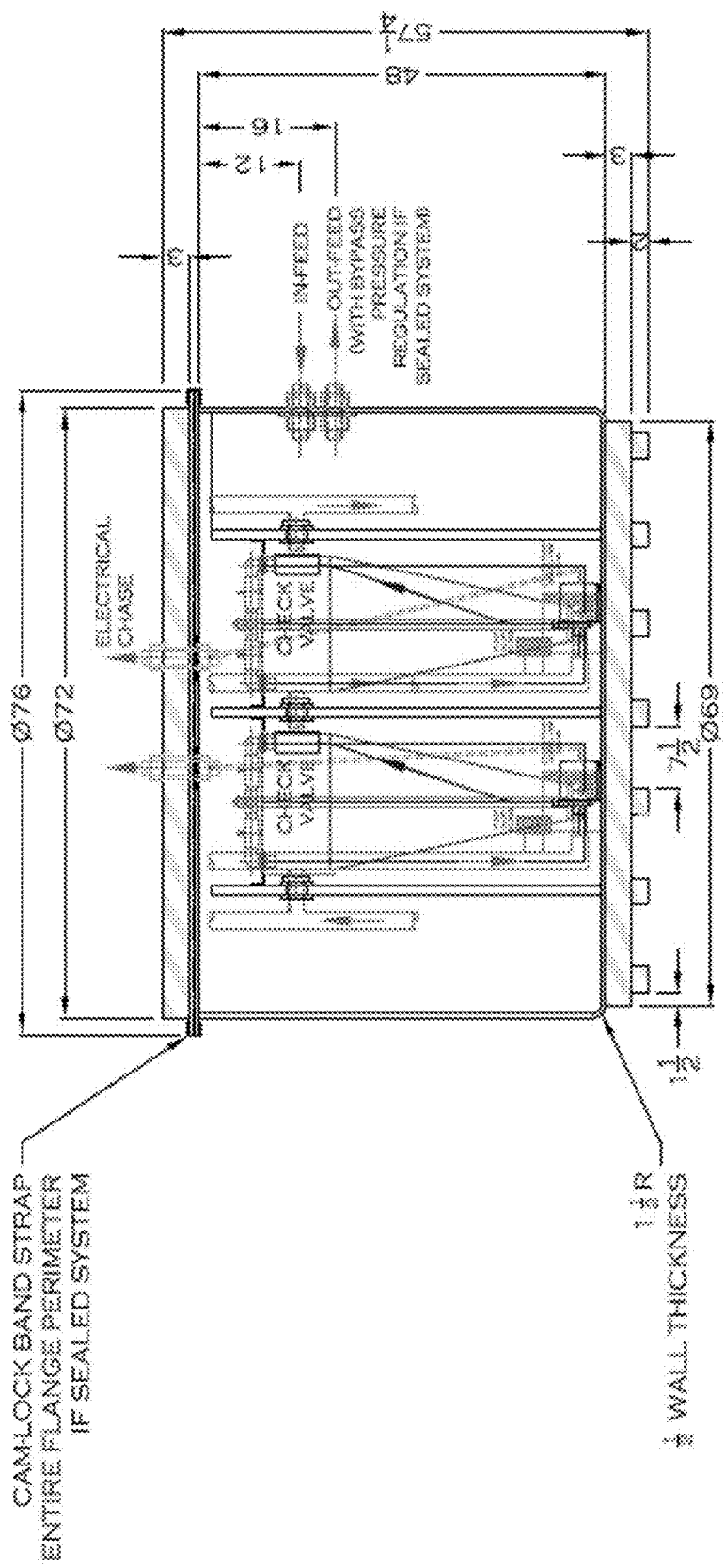
FIG. 22 is a perspective, partially transparent view of the filtration system of FIG. 19.
Figure 29:
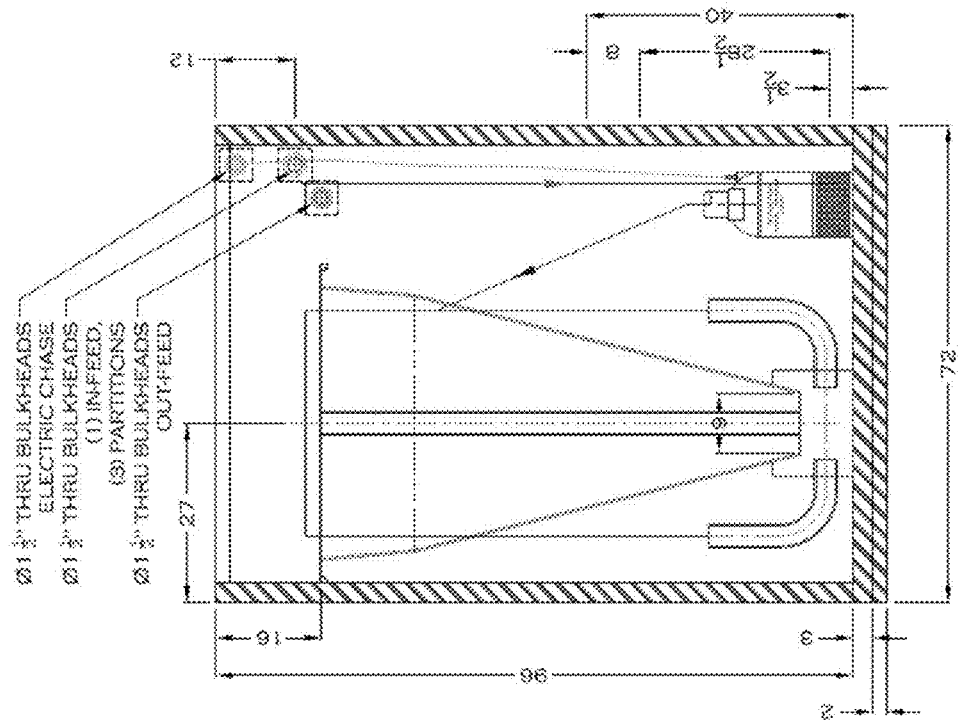
FIG. 29 is a top plan view of the filtration system of FIG. 28.
Figure 27:
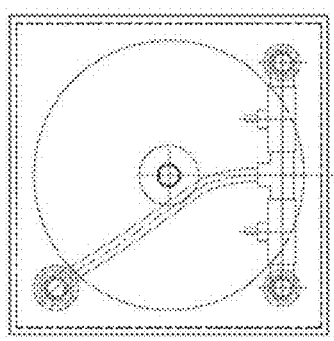
FIG. 27 is a cross-sectional view of the filtration system of FIG. 26.
Figure 28:
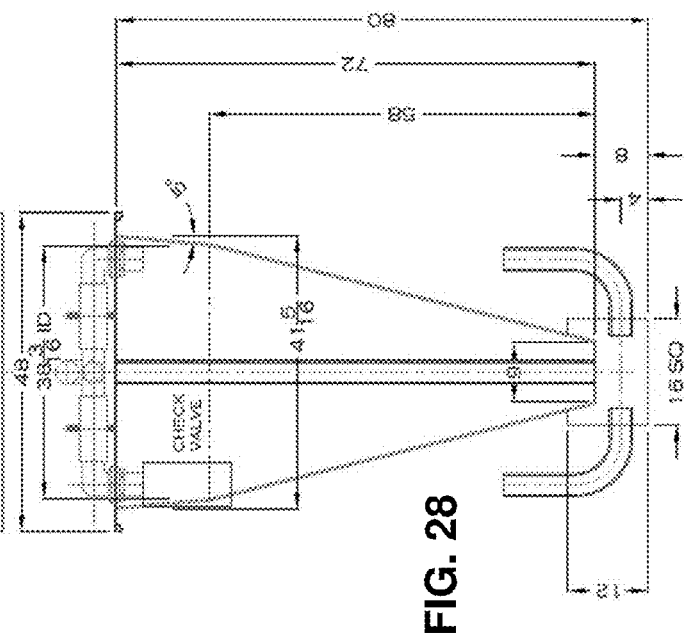
FIG. 28 is a cross-sectional view of the filtration system of FIG. 26 inside an alternative embodiment of a filtration system according to the invention.
Figure 30:
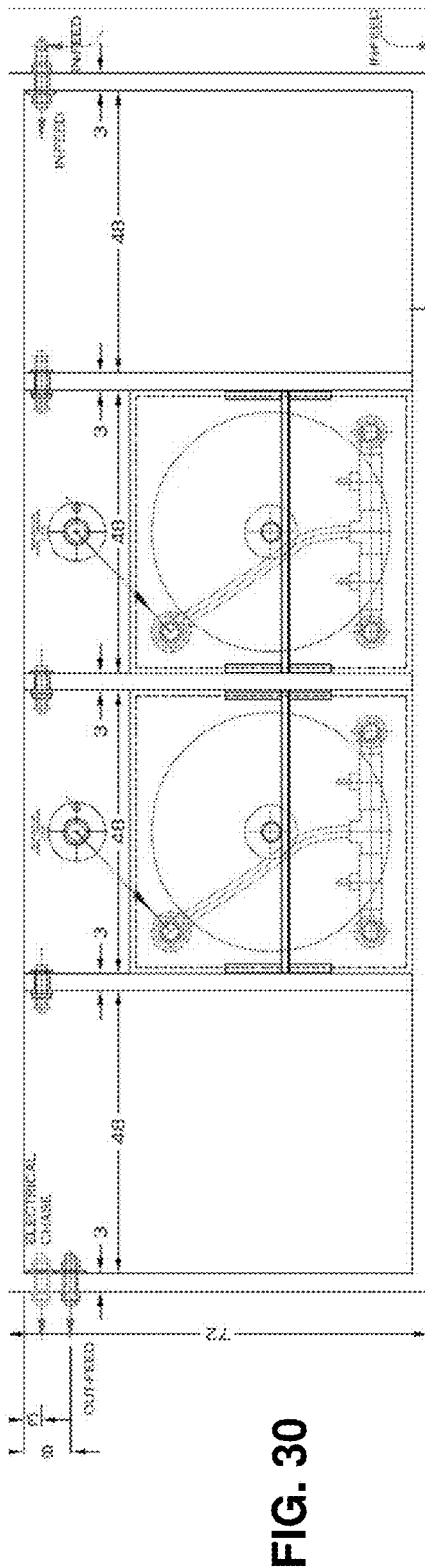
FIG. 30 is a cross-sectional view of the filtration system of FIG. 28 from a left side thereof.

FIG. 21 is a cross-sectional view of the door-sized configuration from the left side of the outer tank 1910. FIG. 22 is a perspective, partially transparent view of the door-sized configuration with the two filter elements 1900. FIGS. 23, 24, and 25 are various side views of a particular exemplary size of this configuration that is able to pass through a standard sized doorframe.

Figure 31:
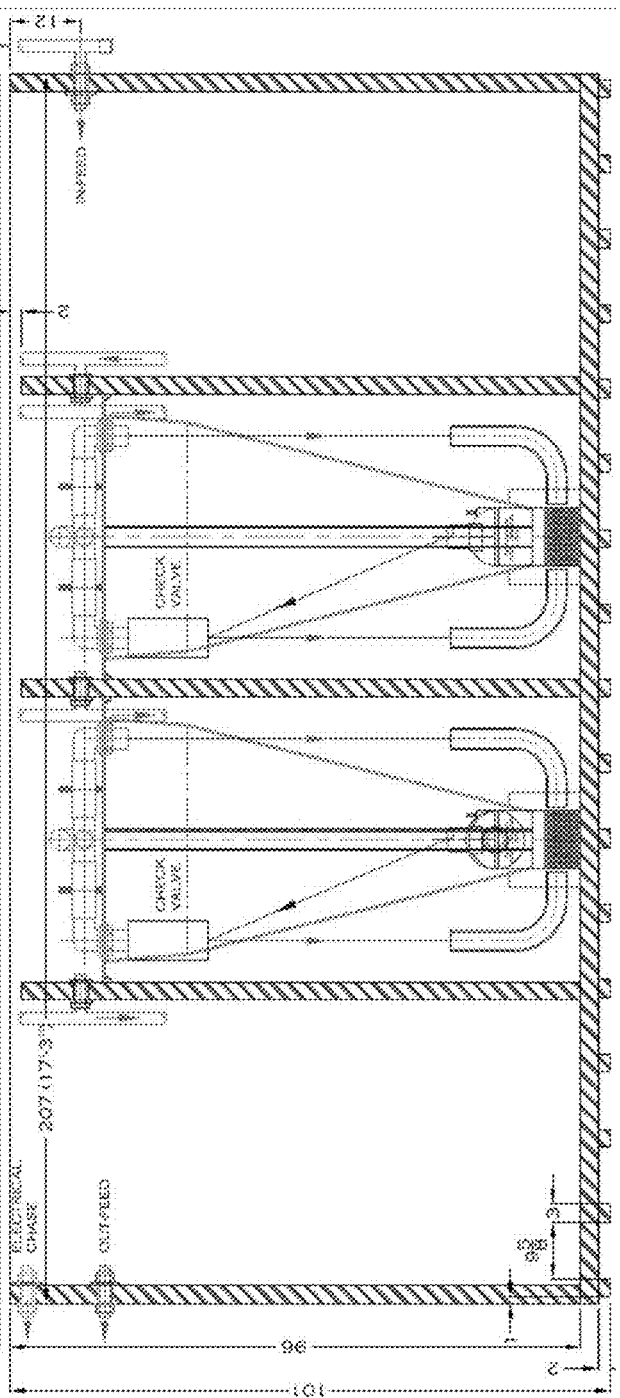
FIG. 31 is a cross-sectional side view of filtration system of FIG. 18.

FIGS. 26 to 30 are various views of a second alternative rectangular configuration that is sized larger than the configuration of FIGS. 23 to 25. FIG. 31 is another view of the exemplary embodiment the round configuration where the sumps are sealed with a lid 3100.

Figure 3:
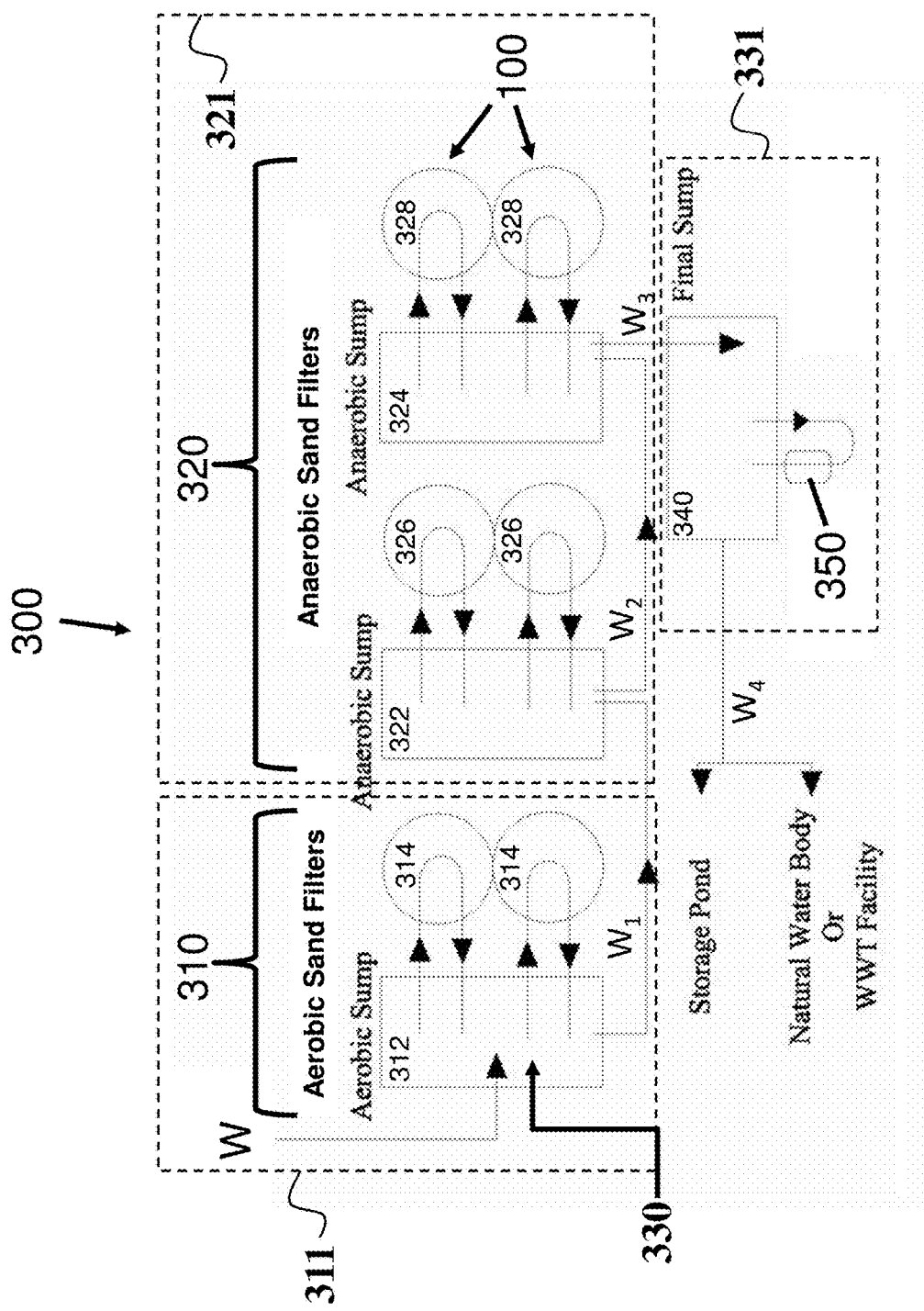
FIG. 3 is a diagrammatic plan view of a prior art denitrification system incorporating the fluidized bed reactor of FIG. 1.
Figure 4:
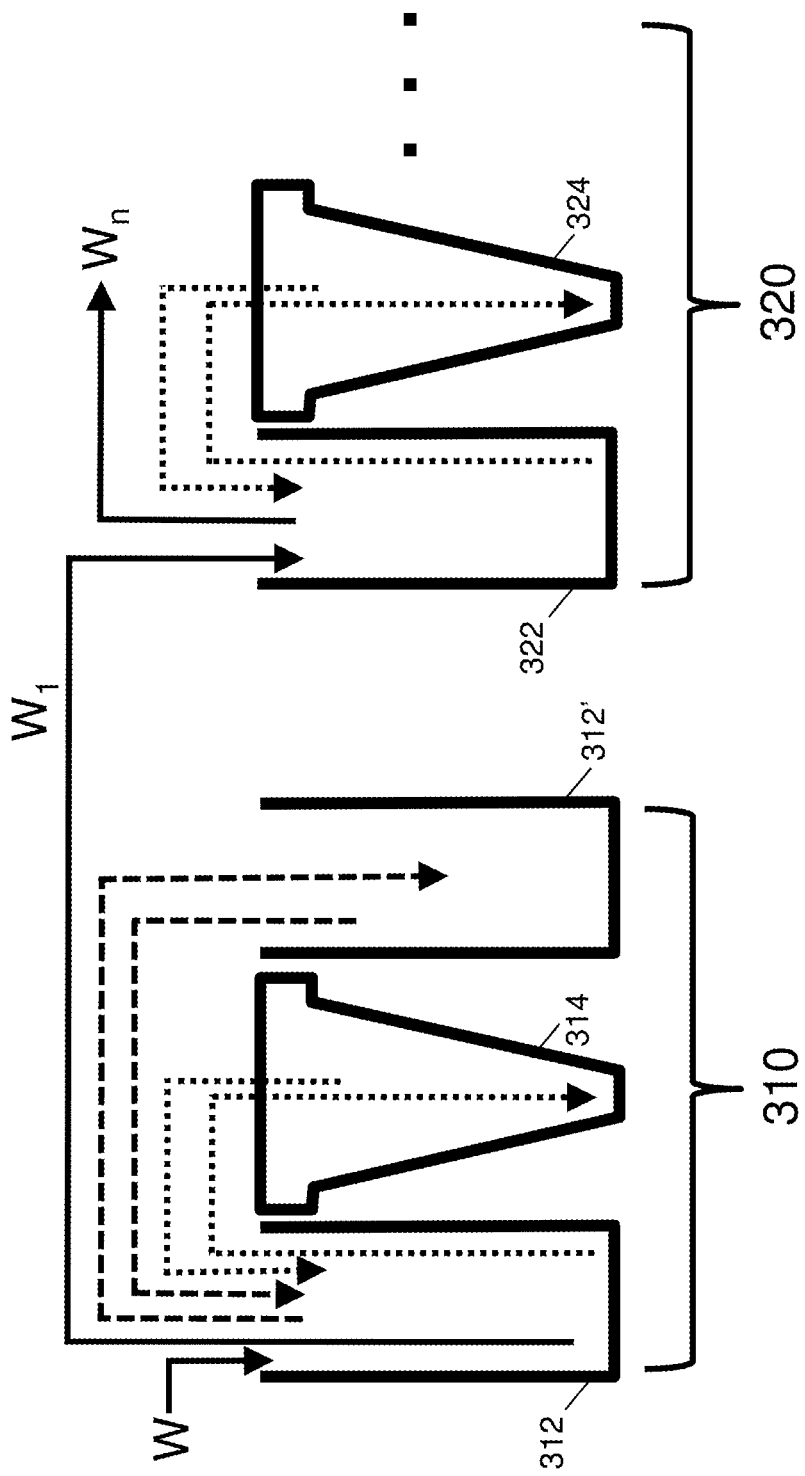
FIG. 4 is a liquid flow diagram of a portion of the denitrification system of FIG. 2.

Various exemplary embodiments of the systems described herein utilize the inventive fluidized bed filtration configurations. While these may be used for significantly large filtration situations, in some instances, the sumps are insufficient to carry out the needs of industrial situations. In such situations, it would be desirable to expand the filtration concept even further. It has been found that the lagoon, itself, can be utilized and operate as a portion of the overall filter. To describe this exemplary embodiment, reference is made to the principles of filtration relevant herein as shown in FIG. 3. First, the filter contains an aerobic stage 311, which includes an aerobic sump 312 and one or more aerobic filters 314, and in which ammonia ($NH_3$) is converted to nitrate ($NO_3$) in the presence of oxygen, the aerobic process referred to as nitrification. In the aerobic sump 312, a first oxygenation step takes place, that is, reduction of COD. Wastewater enters the aerobic sump 312 where oxygen is added to the water through at least one (non-illustrated) aerator. In the aerobic sump 312, COD is consumed in the presence of dissolved oxygen (DO) by heterotrophic bacteria that are indigenous to the wastewater and proliferate in the sludge that builds up in the aerobic sump 312. Heterotrophic bacteria use organic (carbon-containing) compounds as a source of energy and are far more efficient than nitrifying bacteria in consuming oxygen. Enough oxygen must be dissolved in the aerobic sump 312 to significantly reduce the concentration of COD so that the nitrifying bacteria in the filters can nitrify the ammonia, which defines a second oxygenation step. The nitrification of ammonia in this second oxygenation step occurs in the aerobic fluidized particle bed filters 314. The second reason to reduce the COD is to facilitate colonization of the fluidized particles in the filters by a colony of nitrifying bacteria. The proportion of nitrifying bacteria increases as a ratio of COD to total nitrogen decreases. The water circulating through the filters 314 is further oxygenated to allow the nitrifying bacteria to convert the ammonia to nitrate. Water depleted in ammonia and oxygen and rich in nitrate after passing though the filter is then sent to the first anaerobic stage 321.

The first anaerobic stage 321 of the filter 300 includes an anaerobic sump 322 and one or more anaerobic filters 326. A first anaerobic step of denitrifying nitrate and consuming additional COD occurs in the anaerobic sump 322. Nitrate produced in the aerobic filter 310 is consumed by de-nitrifying bacteria living in the sludge and water column of the anaerobic sump 322. Nitrate is converted into atmospheric nitrogen and carbon dioxide through the consumption of COD by the de-nitrifying bacteria. Further anaerobic steps to denitrify remaining nitrate and to consume remaining COD occur in downstream anaerobic filters 324, 328. The purpose of the these anaerobic filters is to increase the population of de-nitrifying bacteria and increase the capacity of the system to remove nitrate from the wastewater by providing a large surface area of media to fix or immobilize these bacteria in the reactor vessel.

A second anaerobic stage 331 occurs in an anaerobic sump 340. Specifically, water $W_3$ leaving the first anaerobic filter stage 321 is sent to this second anaerobic stage 331, in which the anaerobic sump 340 contains a sludge bed that also harbors de-nitrifying bacteria, which bacteria remove additional nitrate that was not removed in first anaerobic stage 321. This sump 340 also allows solid material suspended in the water to settle to the bottom of the sump 340 and clarify the water $W_4$ before it is discharged.

One industrial application requiring significant filtration is the confined animal feeding operation (CAFO). In general, there are two types of CAFOs, flush CAFOs that use water to flush the barns and scrape CAFOs that mechanically move all of the waste. Flush CAFOs (such as dairies) can generate significant wastewater needing treatment. The current manure management system that is failing for such CAFOs in their Nutrient Management Plans (i.e., for removing Nitrogen) typically includes use of a solids separator, anaerobic digestion in a lagoon, and, then, irrigation of land using the wastewater from the lagoon. Typical requirements for irrigation with such wastewater allows for disposal on the soil if the farmer reserves sufficient acreage to apply the Nitrogen in agronomically appropriate rates. In such irrigation disposal processes, it is assumed that one half of the $NH_4$ goes into the atmosphere.

Given a fixed-sized farm, therefore, this means that the farmer must have sufficient acreage to handle the nutrient load for the number of cows in the herd. If the farmer wants to increase the size of this herd, while there is physical space in the barns to accommodate the cattle, there may not be enough land to dispose of the excess wastewater by irrigation from the lagoon. Without an improved treatment system, there is no way to support the almost one pound of nitrogen generated per day for each additional cow. This means that the farmer cannot increase the size of the herd unless a filtration system is added or unless the lagoon becomes more efficient, and enough so to bring the total Nitrogen loading below the state-regulated limit for irrigation disposal of the water. The farmer, therefore, needs to adjust the Nitrogen level at which the farmer can legally irrigate the fixed amount of land with the treated water based on the capacity of the crop to take up Nitrogen and the amount of Nitrogen being produced. The treatment efficacy of this wastewater treatment system can be adjusted by either controlling the amount of aeration and/or the number of filters in operation at any given time.

An exemplary embodiment of the invention adds a Nitrogen removal system described herein and makes the wastewater treatment system more efficient, so efficient that the herd can be increased without increasing the size of the lagoon. To do this, the inventors took note of various properties. First, it is known that Oxygen is used to reduce biological oxygen demand (BOD) and chemical oxygen demand (COD) in wastewater. Dissolved oxygen allows bacteria to break down BOD and COD. Ammonia, a form of Nitrogen is a component of BOD. Thus, in order to increase BOD reduction capacity in a lagoon, more Oxygen needs to be dissolved in the water. Temperature is also a contributing factor in the ability for Oxygen to dissolve in the wastewater. The inventors understood that it is the cost of oxygenation that dominates the cost of wastewater treatment. Thus, lowering the cost of such oxygenation will progress towards a more efficient wastewater treatment system. One way to increase dissolved Oxygen is to install submerged compressed air coarse- or fine-bubble diffusers. However, aeration systems using such diffusers are very inefficient in dissolving Oxygen into water (e.g., 10% of the Oxygen in the air is dissolved, which air only contains 20 percent Oxygen). Further, for coarse-bubble diffusers, only a small percentage of Oxygen is diffused in water from bubblers because each bubble does not contact the water for very long. Most of the air bubbled in the water exits into the atmosphere when the bubbles pop after rising to the surface. For example, the wastewater system described herein would need 50 Horsepower of compressor power running 24/7 to process the wastewater using submerged diffusers. Submerged fine-bubble diffusers have a higher oxygen transfer efficiency than coarse-bubble diffusers but they require a much finer diffuser that requires more compression horsepower to operate and are much more susceptible to fouling.

Another factor taken into consideration by the inventors is that, in order for the nitrifying bacteria in the aerobic filter to nitrify the ammonia (to nitrate), the heterotrophic bacteria must first significantly reduce the organic carbon content (carbonaceous BOD) of the wastewater. To do this, a significant amount of dissolved oxygen must be supplied to the wastewater prior to it being nitrified. Consequently, aeration is the single largest operating cost component in wastewater treatment systems that use it.

The inventors discovered that sheared-bubble surface aerators are much more efficient and easier to maintain than submerged compressed air diffusers. This is due to the fact that sheared-bubble surface aerators do not require compressed air, do not employ a diffuser, and operate on the surface of the water. Sheared-bubble surface aerators use a rotating blade and a venturi to inject fine bubbles into the water. Moreover, this type of aeration system is more efficient because these fine bubbles are neutrally buoyant and have a much higher surface area for a given volume of air compared with coarse bubbles to facilitate the diffusion of oxygen into the water.

Applying this knowledge, an exemplary embodiment of a dissolved oxygen-efficient-lagoon-based wastewater treatment system includes the creation of an anoxic zone within the lagoon, where nitrate produced in the aerobic filter is used to oxidize BOD without adding any dissolved oxygen. Making use of the nitrate produced in the aerobic filter to reduce BOD in the anoxic portion of the lagoon provides two advantages, first, it reduces the amount of aeration required to process the wastewater and, second, it reduces the need for downstream denitrification process such as anaerobic filters and carbon substrate additions (e.g., methanol).

Figure 32:
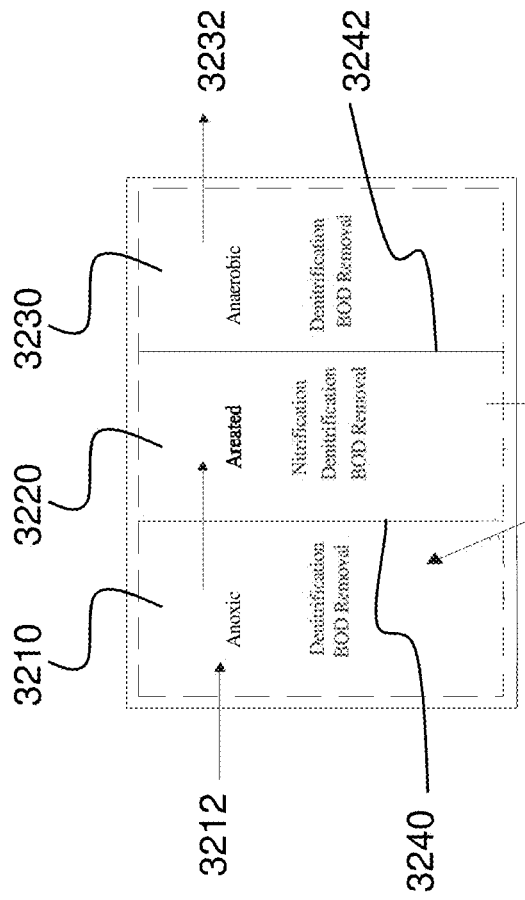
FIG. 32 is a top plan view of an exemplary embodiment of a lagoon-based filtration system according to the invention.
Figure 33:
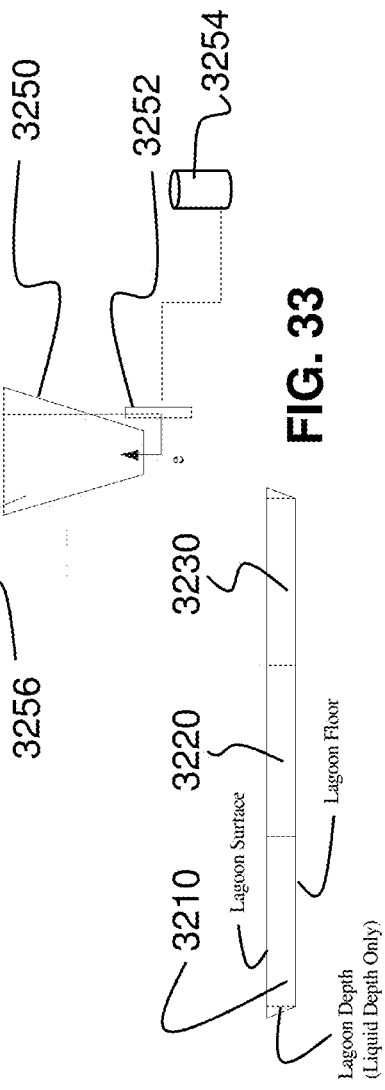
FIG. 33 is a vertical cross-sectional view of the lagoon of FIG. 32.

Application of these principles to a lagoon for wastewater treatment systems is explained with regard to FIGS. 32 and 33. The lagoon is partitioned into multiple sections with curtains. Alternatively and/or additionally, the system can have separate lagoons in any combination including some with such partitions. In either embodiment, in summary, a first stage 3210 of the lagoon receives incoming water 3212 (e.g., liquids from a solid manure separator, anaerobic digester, or other wastewater treatment step). A second aerobic stage 3220 receives water from the first stage 3210 by overflow of a first curtain 3240 separating the first and second stages 3210, 3220. A third anaerobic stage 3230 receives water from the second stage 3220 by overflow of a second curtain 3242 separating the second and third stages 3220, 3230. An aerobic filter 3250 performs nitrification and BOD removal by receiving water from the second stage 3220 and discharging nitrified water into the first stage 3210. Finally, the wastewater 3232 from the lagoon is discharged from the third stage 3230 into an irrigation system, municipal wastewater treatment system, recycled, or sent to other downstream treatment processes.

This process is described in further detail as follows. For illustrating one exemplary embodiment of the inventive process and system, it will be assumed that the lagoon is a wastewater treatment facility of a CAFO flush dairy that has a herd of 1,500 head of cattle. To flush the dairy of waste, 140,000 gallons of water are used daily. In this example, the lagoon is configured to hold approximately 30 days of wastewater and, therefore, is set to have a capacity of 4,200,000 gallons. As such, when the first and second curtains 3240, 3242 are set, each of the stages 3210, 3220, 3230 contains approximately 1,400,000 gallons. For the 1,500 head of cattle, the total solids produced per day is 29,000 pounds. Also produced are 23,100 pounds of COD, 5,750 pounds of BOD, and 1,425 pounds of Nitrogen each day, all of which are contained in the 140,000 gallons of generated wastewater assuming there is no solids separation or anaerobic digestion pretreatment step upstream from the lagoon system.

A first effluent 3212 from the wastewater source is allowed to flow or is pumped into the first stage 3210. The first effluent 3212 is rich in BOD. In addition to the first effluent 3212 from the CAFO, a second effluent 3256 that is enriched with nitrate from the aerobic filter 3250 is also discharged into the anoxic stage 3210 (as will be described in further detail below—as all dissolved Oxygen is consumed within the aerobic filter 3250, the second effluent 3256 does not add sufficient dissolved Oxygen to the first stage 3210 to make it aerobic but the effluent 3256 does supply nitrate to the first stage 3210). Consequently, in the anoxic zone 3210, heterotrophic and de-nitrifying bacteria consume the nitrate provided by the aerobic filter 3250. This nitrate provides the source of oxygen to the heterotrophic bacteria so that they can consume BOD in the first stage 3210. As such, nitrate is converted to atmospheric Nitrogen ($N_2$) and BOD is consumed to reduce the total amount of nitrate in the water of the first stage 3210 and, at the same time, to reduce the quantity of dissolved Oxygen required to remove BOD—in subsequent zones of the lagoon and eliminating the need for anaerobic filters. Using the nitrate produced in the aerated filter 3250 to reduce the BOD is much more efficient than using a de-nitrifying filter as described above with regard to FIG. 3.

Wastewater overflows the anoxic section of the first stage 3210 and enters into an aerated section of the second stage 3220 through the plug-flow process, which means that a gallon entering causes a gallon to exit (as in the process of a septic tank). Reduction of BOD in the aerobic zone of the second stage 3220 starts in a first oxygenation step by adding dissolved Oxygen to the water using aeration. For example, a number of surface aerators (e.g., sheared-bubble surface aerators) inject Oxygen into the water by creating fine bubbles that diffuse into the water while staying in suspension. In the second stage 3220, BOD is consumed in the presence of this dissolved Oxygen by the heterotrophic bacteria indigenous to the wastewater and that proliferate in the sludge that builds up in the second stage 3220. The heterotrophic bacteria use organic (carbon-containing) compounds as a source of energy and are far more efficient than nitrifying bacteria in consuming dissolved Oxygen. Enough Oxygen is dissolved in the second stage 3220 to significantly reduce the concentration of BOD so that the nitrifying bacteria in the aerated filter 3250 can nitrify the ammonia present. Accordingly, wastewater from the second stage 3220 is sent both to the aerated filter 3250 and to the anaerobic third stage 3230.

In the case study described herein, the diary removes 15% of the wastewater contaminants using a screen solids separator and then needs to remove 35% of the remaining Nitrogen to stay within the limitations imposed by its Nutrient Management Plan and acreage. It is understood that there must be enough Oxygen generated by the aerators in the second stage 3220 each day to consume 2,000 pounds of BOD. It is known that 4,000 pounds of dissolved Oxygen are needed to consume this BOD production. To generate this amount of dissolved Oxygen in the aerated second stage, ten 2-Hp sheared-bubble surface aerators running 24/7 are needed, which is significantly less than the requirement (50 Hp) for submerged compressed-air aerators, thereby reducing the cost for generating the dissolved Oxygen considerably. With aeration of the second stage 3220 at this level, some of the water is pumped into the inventive aerobic filter 3250, which can be one or more of the exemplary filters of FIGS. 5 to 11 or 14 to 31. In this case, the number of filters needed is determined based upon the requirement of receiving 140,000 gallons per day having an approximate Nitrogen removal rate of 1 pound of Nitrogen per cubic foot of expanded bed volume per day. From this, it is determined that thirteen 130-gallon filters described herein working in parallel will be able to handle the processing of this water and will produce an outflow of 2.6 million gallons per day to be added into the first stage 3210 to supplement the 140,000 gallons of waste per day. In this manner, the amount of water flowing from the anoxic first stage 3210 to the aerobic second stage 3220 is 2.74 million gallons per day. The lagoon therefore becomes the sump for the aerated filters 3250. The total amount of water flowing in and out of the lagoon is only 140,000 gallons per day but 2.6 million gallons per day are cycled through the aerobic filters 3250 and through the first two zones 3210 and 3220.

As water from the second stage 3220 enters the filters 3250, in order to process the ammonia into nitrate, Oxygen is provided from an Oxygen source 3254. The Oxygen source 3254 can be either a pure-oxygen source such as an oxygen generator, liquid or gas storage vessel, or an aerator. The Oxygen is diffused into the supply stream of the filters 3250 upstream of the filters 3250 by a contactor 3252. A contactor 3252 is a device such as Speece cone or another apparatus that increases the diffusion of Oxygen into water through a number of different mechanisms including increased contact time, pressure changes, etc. It has been found that the Oxygen is not injected directly into the filter vessel 3250 because it does not have enough time to dissolve into the water and, in such a case, this relatively expensive Oxygen passes out of the filter 3250 unused. Moreover, water saturated with air or oxygen bubbles is less dense and can disrupt the fluidization dynamics within the filter cone. With a metered level of Oxygen, however, the bacteria are able to completely convert the ammonia to Nitrate ($NO_3$), thereby allowing the effluent 3256 of the filter 3250 to be anoxic and nitrate-rich, saving electrical energy costs by not dissolving more oxygen than is needed. Exemplary embodiments for generating such Oxygen includes providing liquid Oxygen (e.g., from tanks) or by producing the Oxygen on-site with an Oxygen generator that, for example, uses a zeolite affinity column that scrubs nitrogen out of air and stores the pure Oxygen in a holding tank for later use.

A second reason for reducing the BOD in the second stage 3220 is to facilitate colonization of the fluidized particles in the filters by the nitrifying bacteria. By reducing the BOD in the second stage 3220, the heterotrophic bacteria will have a slower growth rate in the filter 3250, allowing the nitrifying bacteria to proliferate. Oxygenation of the water circulating through the filters 3250 allows the nitrifying bacteria to convert the ammonia to nitrate.

Wastewater overflows the second stage 3220 and enters into an anaerobic section of the third stage 3230 through the plug-flow process. Because the third stage 3230 acts as a second anaerobic denitrifier, there is no need to have a filter stage that performs anaerobic denitrification. This is significant because it entirely eliminates the need to pump water through such filters, which saves energy. The third stage 3230 of the lagoon acts as a clarifier where solids are allowed to settle. This sump contains a sludge bed that harbors de-nitrifying bacteria. These bacteria remove additional nitrate that was not removed in the first stage 3210.

In cases where there is insufficient BOD in the final stage for the denitrifying bacteria to consume the remaining nitrate, additional BOD can be added. Therefore, in one exemplary embodiment where there is too little Carbon in the third stage 3230, a Carbon source such as Methanol, is added to the third stage 3230.

With the use of enhanced and efficient wastewater treatment and processing systems described herein, all subject to monitoring and reporting that monitoring, for example, over the Internet, makes previously unexaminable wastewater discharge facilities able to be monitored and managed by local utilities. Thus, not only can the utility actively review the previously unmanaged waste source, it can also monitor all of the other point sources of wastewater discharge into a common watershed in real time. This creates an opportunity to not only manage the water quality of the entire watershed by the utility, it also constructs a business opportunity where producers can create and trade Nitrogen credits. Even though the idea of creating and trading Nitrogen credits has been in existence for some time, those systems have only been able to calculate an estimate of the actual discharge rate based on what is referred to as best management practices of the various point-source polluters. Up until the creation of the instant systems and methods, data that would be required to actually measure and know definitively the exact amount of waste discharged has been unavailable. The described systems and methods can now actively monitor and record actual discharge data and actually measure the waste discharge loading rates. These data are not only collected but can be sent to a remote monitoring system where all of the point-source discharge data within a watershed can be collected, where a determination of the total load along with the loading rates of each point-source can be determined empirically, and not by calculation, assumption, and estimation.

The disclosed systems and processes can be applied to various businesses. One example discussed is in the agriculture area, where the disclosed systems and processes can be used by farmers to manage larger herds with the same size land but still irrigate that land because the Nitrogen is reduced enough for the farmer to stay within the applicable local regulations. Expansion of a herd is significant in terms of profits. In particular, one example is studied. If a 750-head diary has maximized its land base required for manure spreading but would like to expand its herd to 1,500 head, that dairy must remove all the nitrogen from the additional 750 cows, which is approximately 700 pounds per day. Assuming 15% of the Nitrogen is removed using mechanical solids separators, the disclosed systems and processes must remove about 600 lbs of Nitrogen per day. If the disclosed filter system required to perform this removal has a capital cost of approximately $750,000 and an operating cost of about $300 dollars per day, amortization of the capital cost with the operating cost represents a daily cost per pound of Nitrogen removed at approximately $0.30 to $0.50 cents per cow. Assuming the gross annual cost to the dairy per cow is $4,000 dollars, the cost of the disclosed system represents about 3% of the gross cost. Thus, if the dairy is realizing a net annual revenue per cow of $1,000, the purchased system will pay for itself within the first year.

Other types of industrial high-strength waste producers include food and beverage processors. Such processors include, for example, breweries and dairy products (e.g., cheese, yogurt, or ice cream) processors. Production of such products generates waste having a high BOD content. Although such producers are able to flush their waste down a municipal drain, however, such disposal comes at a very high cost by the wastewater utility in the form of BOD, Solids (TSS), Nitrogen, and Phosphorous discharge rates. Customers in this market are looking to either reduce their current cost of operating their wastewater treatment system, to upgrade their treatment system to meet environmental compliance regulations, to expand their plant but not their costs, or to reduce their expenditure of surcharges paid to discharge wastewater to the municipal wastewater treatment system. The BOD, TSS, Nitrogen, and Phosphorus surcharges from a decade ago are illustrated in the following Table.

| Nutrient Surcharges Charge By Municipal Wastewaer Treatment Facilities. | | |
|---|---|---|
| | Low $/lb | High $/lb |
| BOD | $0.13 | $0.28 |
| Total Nitrogen | $0.11 | $2.60 |
| Total Suspended Solids (TSS) | $0.11 | $0.24 |
| Phosphorus | $0.56 | $5.32 |

Data exerped from: PUBLIC TREATMENT OF PRIVATE WASTE: INDUSTRIAL USE OF MUNICIPAL WASTEWATER TREATMENT Winston Harrington and Peter Nelson, *Resources For The Future*, February 2006, based on 1996 and 2002 data These surcharges have gone up since then to as high as $3 per pound for BOD and will continue to rise. If a producer uses their own treatment system to lower the BOD in the waste they produce, they will pay the utility for BOD surcharges. Because of the compact size of the filters described herein, which require a smaller footprint than has typically been required for such processors, wastewater produced can be treated on-site at a cost that is significantly less than the BOD surcharges that apply each and every month of operating the business. As an example, a brewery discharging 30,000 gallons per day of wastewater could be facing yearly surcharges of over $100,000 for total nitrogen and BOD. A filter system described herein sufficient to handle the biomass produced in such a plant would cost approximately $200,000. Factoring in the operating expenses, it would cost the brewery approximately $0.50 to treat a pound of nitrogen or $0.21 per pound of BOD. With these costs, the described filter systems could pay for itself within two years if the municipal surcharges are $1.00 per pound for BOD and $2 per pound for Nitrogen.

Figure 34:
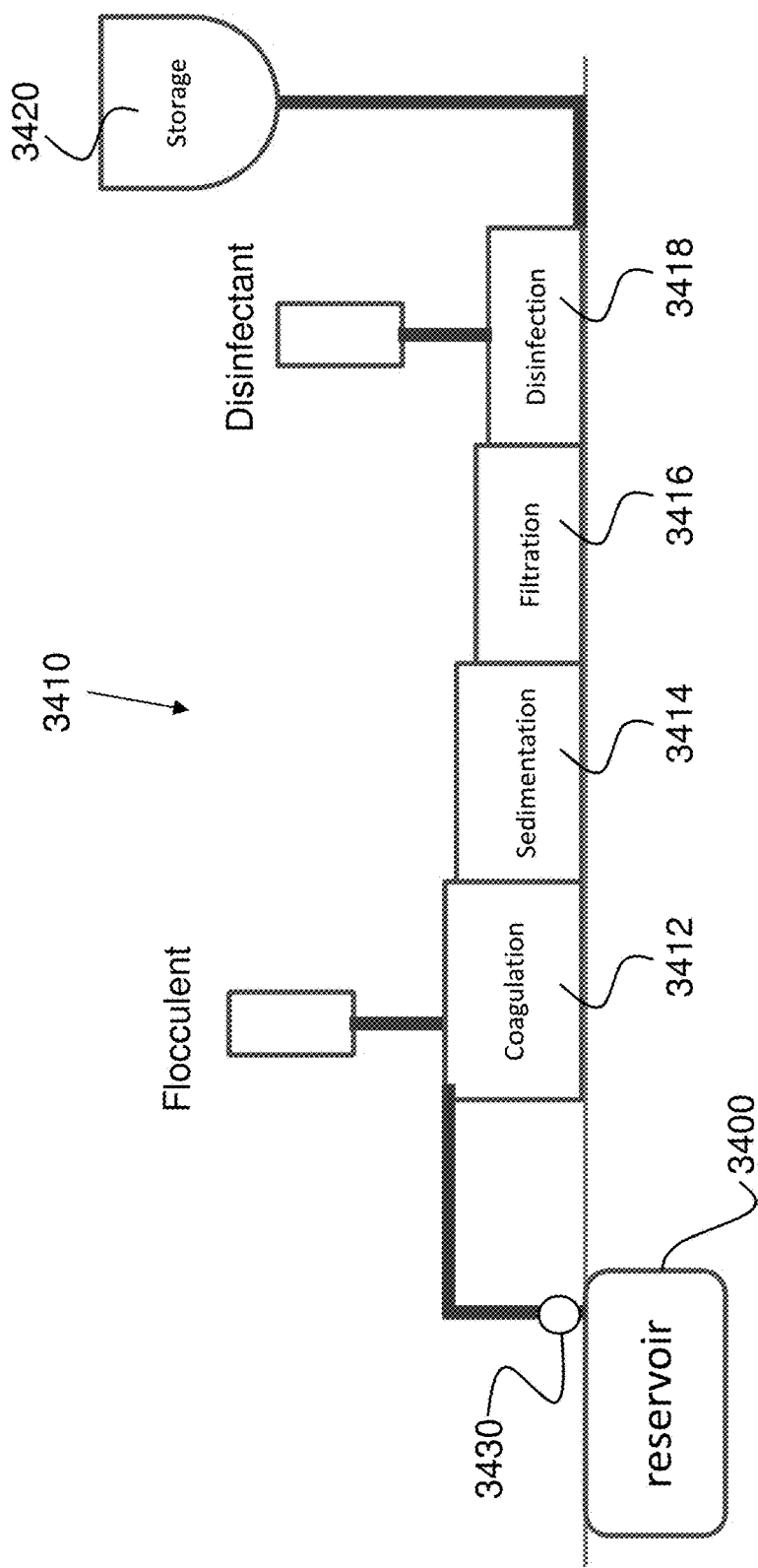
FIG. 34 is a diagrammatic side elevational view of a prior art drinking water processing plant.

Another exemplary embodiment of the inventive systems and processes described herein is in the application to drinking water. To better understand how the filters described herein can be applied to a municipal drinking water processing plant, reference is made to FIG. 34, which depicts a typical water processing plant configuration. Unprocessed drinking water is stored in a reservoir 3400 and is pumped into a processing plant 3410 where it is processed and stored for consumption. The plant has four stages, each representing a processing step. A first stage 3412 of the plant performs coagulation. In this tank, a flocculent (e.g., Alum) is added to the water to form "sticky" particles called "floc," which attract contaminants suspended in the water. The weight of the coagulated floc becomes heavy enough to sink. A second stage 3414 of the plant removes sedimentation. In this tank, water from the coagulation tank flows into a sedimentation tank where the coagulant and contaminants are allowed to settle out. In a third stage 3416 of the plant, filtration is performed. In this tank, water from the sedimentation tank flows into a tank containing filter media, such as gravel, activated charcoal, or sand, to remove fine particles in the water. A fourth stage 3418 of the plant performs disinfection. In the disinfection tank, filtered water is received and a disinfectant, such as chlorine or chloramine, is added to kill any bacteria or other microorganisms that may be in the water. Fluoride is also added in the fourth stage 3418.

Transfer of the water into the plant starts from a pump 3430 fluidically connected to the reservoir 3400. The pump 3430 moves the untreated water into the first tank. Transfer of the water within the plant, however, can be done without power by allowing the water to be gravity fed to each of the respective downstream tanks. After treatment, the processed drinking water is pumped into an elevated storage tank 3420. Water in this tank 3420 is connected to the water supply of the city or county it serves, providing pressurized drinking water. Drinking water plants such as this can process significant amounts of water per day, some large facilities being able to process from 70 to over 100 million gallons per day, for example.

Most municipalities can no longer take all of the required drinking water from the ground. This has caused the municipalities to create reservoirs 3400. Various algae, including blue-green algae blooms, and other organisms live in the reservoir 3400. These organisms can produce undesirable compounds that are difficult to treat with existing drinking water processing plants 3410. Blue-green algae, in particular, produce compounds called odorants. Odorants can impart a musky smell and taste to the water that is detectable in a parts-per-trillion concentration. Currently, such odorants (e.g., geosmin, 2-methylisoborneol (MIB)) cannot be successfully removed from the drinking water without significant cost.

Figure 35:
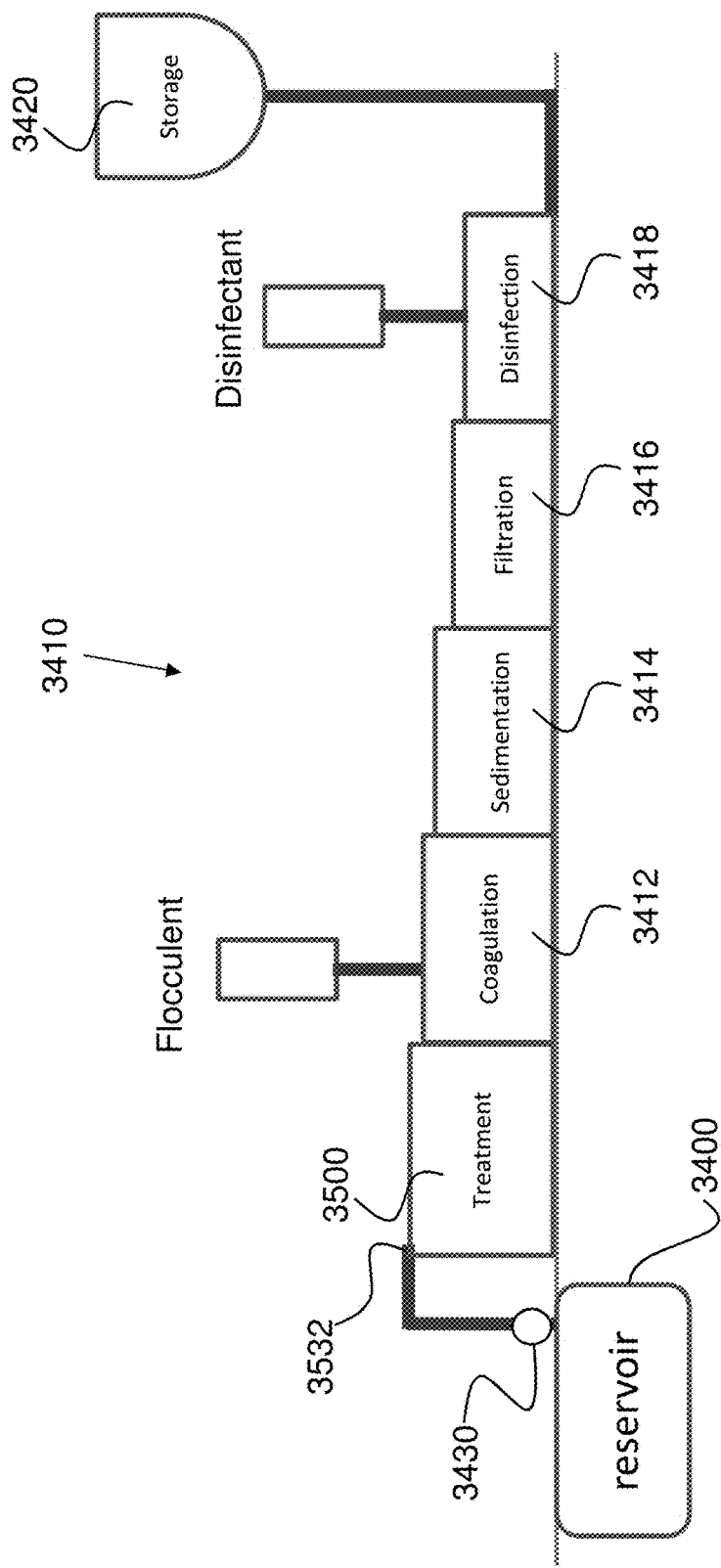
FIG. 35 is a diagrammatic side elevational view of an exemplary embodiment of a drinking water processing plant according to the invention.

The systems and methods for filtering wastewater described herein, in contrast, are able to filter out these odorants using bacteria indigenous to the reservoir that colonize the fluidized bed. While the throughput of such filters is significant, it is not sufficient for filtering 70 or more million gallons per day without creating improbably large filters. Regardless of the configuration, fluidized bed filtration with bacteria must occur upstream of the water processing plant 3410 because use of bacteria, even if beneficial, cannot be allowed to enter the processed drinking water that is stored in the tank 3420 for consumption. Accordingly, in this application the biofilter is the first or primary filtration step. In contrast, for wastewater applications, the biofilter is a tertiary filtration step. All biological matter is removed from the drinking water through all of the downstream processing stages 3412 through 3418. Accordingly, any use of the filtration disclosed herein will occur as shown, for example, in FIG. 35. Instead of pumping the water in the reservoir 3400 into the coagulation first stage 3412, the water is pumped directly into a pre-treatment tank 3500 containing the inventive filtration. In such a configuration, there is little to add to the pre-existing processing plant 3410 other than a tank 3500 that is slightly higher than the water surface in the first stage 3412. To do this, all that is needed is to raise the pump head 3532 slightly as shown in FIG. 35. In this way, the power required by the pump 3430 is incrementally very small because the water only has to be lifted a few inches more than for the first stage 3412.

The fluidized bed volume needed is a function of water throughput of the system. An example system is, therefore, discussed here utilizing a water processing plant 3410 that needs to process 72 million gallons per day. A conical filter described herein having an 8' (2.44 m) upper diameter can process 6 million gallons per day. Thus, twelve of such filters are needed to process all of the water in this exemplary plant. Because these filters would be 8' to 12' tall, support for the filters needs to be extremely strong. Taking the knowledge disclosed above that it is beneficial for the conical filters to be resident inside the sump along with the fact that cylindrical extension of the top of the cone can be used to retain filtration bed media therewithin even if the filter is entirely submerged (see, e.g., FIG. 9), the inventors discovered that, instead of having the conical filter body reside within the volume of the sump, these filters can reside at the bottom of the sump.

Figure 36:
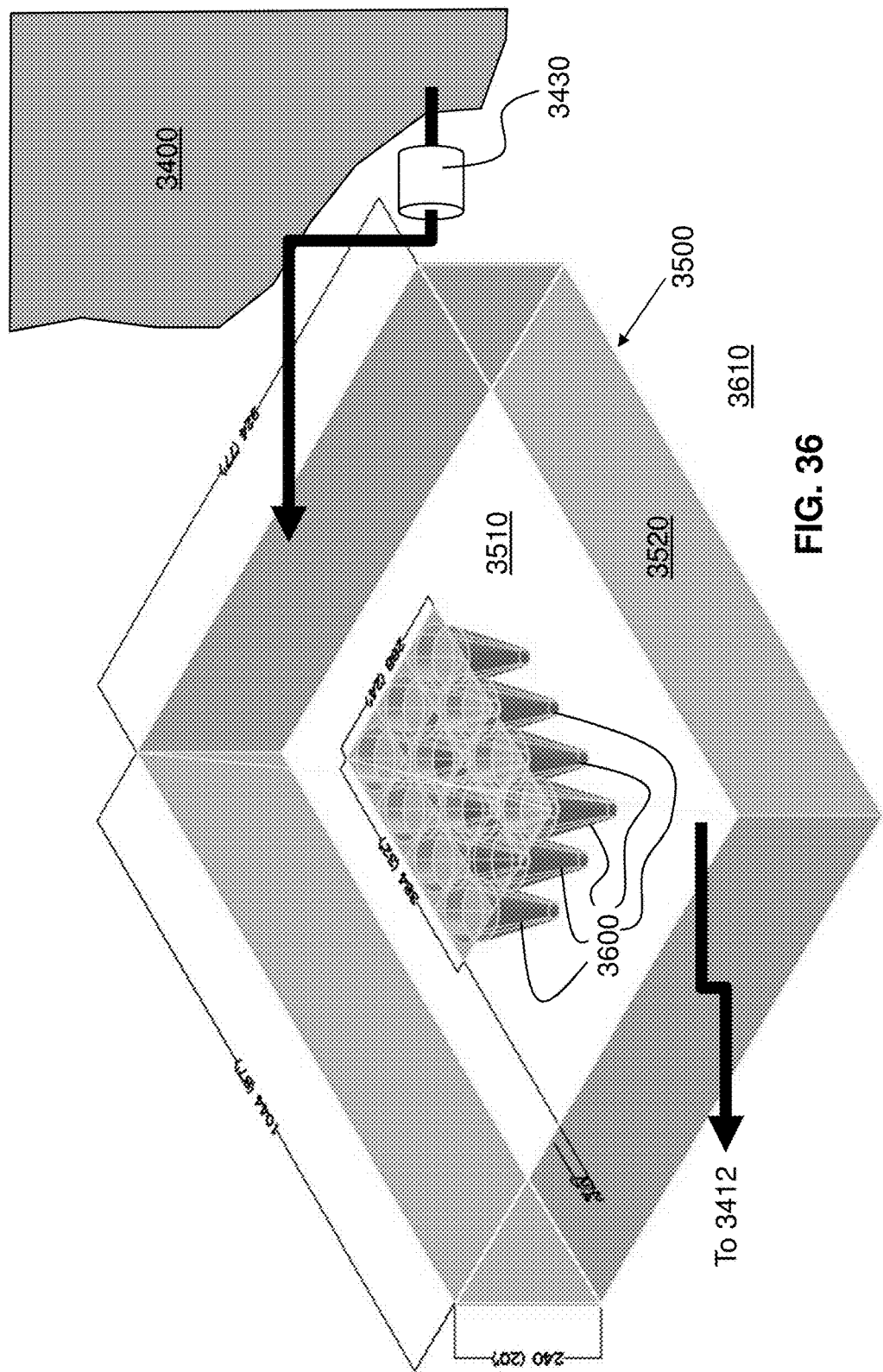
FIG. 36 is a perspective and partially transparent view of an exemplary embodiment of a pre-treatment filtration system of the drinking water processing plant of FIG. 35.
Figure 37:
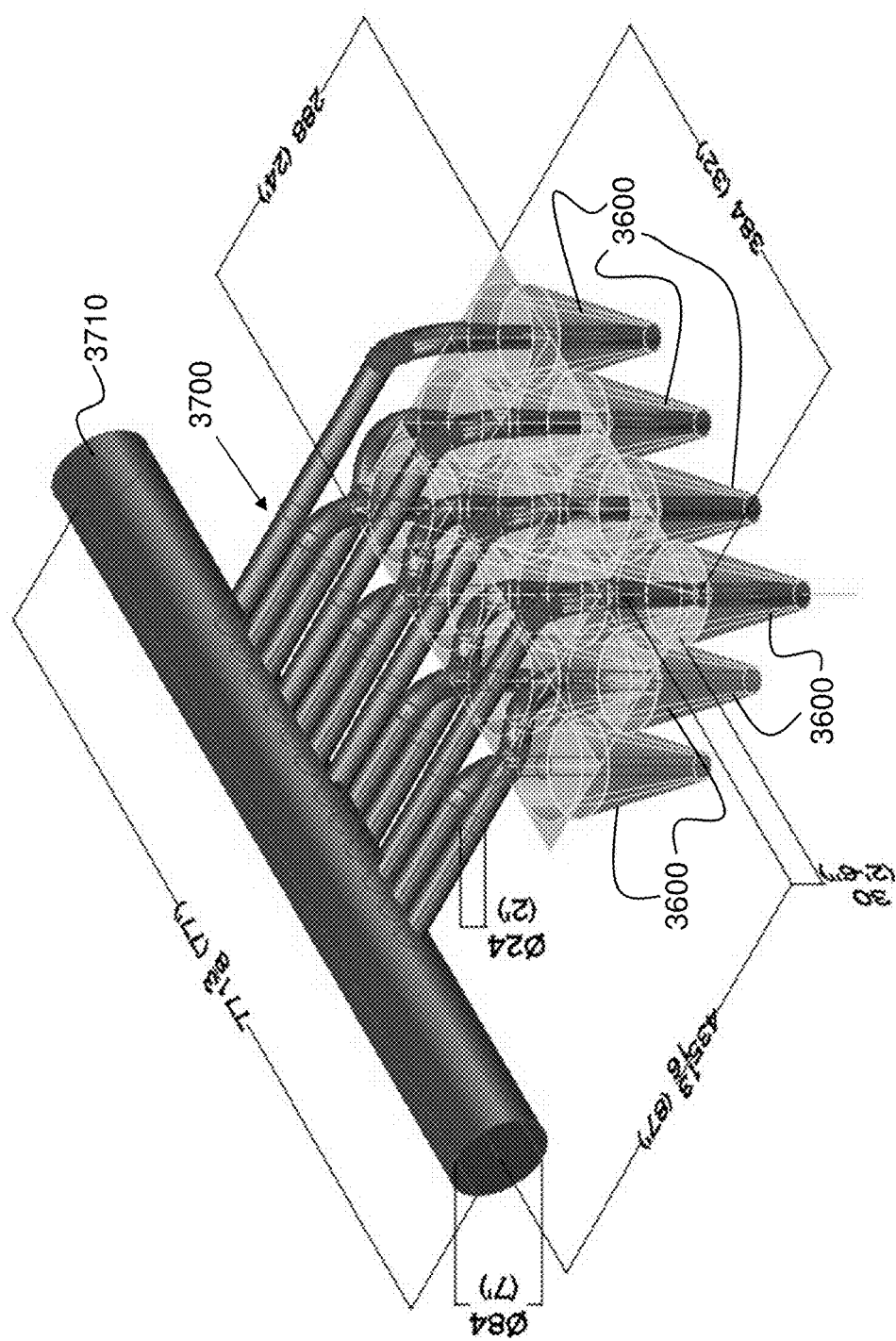
FIG. 37 is a fragmentary, perspective view of an exemplary embodiment of an inlet manifold assembly of the pre-treatment filtration system of FIG. 36.

To explain such a configuration, reference is made to FIGS. 36 and 37. More specifically, a tank 3500 is built (for example, from concrete) between the reservoir 3400 and the first stage 3412 at a height that is slightly greater than the height of the first stage 3412 so that effluent from the tank 3500 will flow by gravity into the first stage 3412. The pump 3430 is, then, directed to pump water from the reservoir 3400 into the tank 3500 instead of into the first stage 3412. Instead of having a flat bottom, the conical outer shapes of the filters 3600 are formed at the bottom of the tank 3500 protruding into the ground 3610 below the tank 3500. The floor 3510 of the tank 3500 is, then, formed as a single unit with the filters 3600, for example, from poured concrete, so that all twelve filters 3600 are integral with the base of the tank 3500 and, therefore, are watertight. The walls 3520 of the tank 3500 are also built integrally with the floor 3510 to form a single, watertight tank-shaped structure. As such, the conical filters 3600 are entirely supported on all sides by the solid ground 3610 where the structure resides.

It is noted that the conical filters 3600 need not be fed only from the sides of the bottom of the filters 550 as shown, for example, in FIG. 5, and as described with regard to FIG. 8, water to be filtered by the fluidized bed can be supplied from above through a supply tube such as the central support tube 576. This configuration can be expanded and utilized with regard to the filters 3600. In particular, with reference to FIG. 37, water feed conduits 3700 can be individually routed to the inside bottoms of each of the filters 3600. All of the water feed conduits 3700 can be connected to a single manifold 3710, which receives all of the water pumped in from the reservoir 3400 through the pump 3430 and simultaneously supplies input water to fluidize the media beds (not illustrated) of each and all of the filters 3600. The manifold 3710 is located at the top or above the tank 3500 and pressure from the pump 3430 raising the water over the top edge of the tank 3500 is enough to fluidize all of the media in the cones of the filters 3600. With selection of the cylindrical upper section height of each filter 3600 to be taller than the greatest height of the fluidized bed media, all the media will remain in place within each filter 3600 whether the manifold 3710 is supplying water or not.

A biofilter containing the fluidized particle-bed filter elements molded into the bottom of a water tank 3500 can be used as a pre-treatment stage of a water treatment plant to remove all or substantially all of the odorants from the reservoir 3400. In this configuration, except for the pump 3430, the entirety of the filter assembly 3500, 3510, 3520, 3600, 3700, 3710 has no moving parts. Further, bacteria that consume the odorants exist naturally in the reservoir 3400. Thus, with the tank 3500 disposed as a pre-treatment stage, these bacteria will colonize the biofilter naturally. When water from the reservoir 3400 is pumped through the biofilter, reduction in odorants can be as high as approximately 90%.

It is noted that multiple cones of a relatively short depth are much better and less costly than one large cone with a relatively large depth. The optimal size and number of cones required is largely a function of the site conditions and water volume capacity required.

Figure 40:
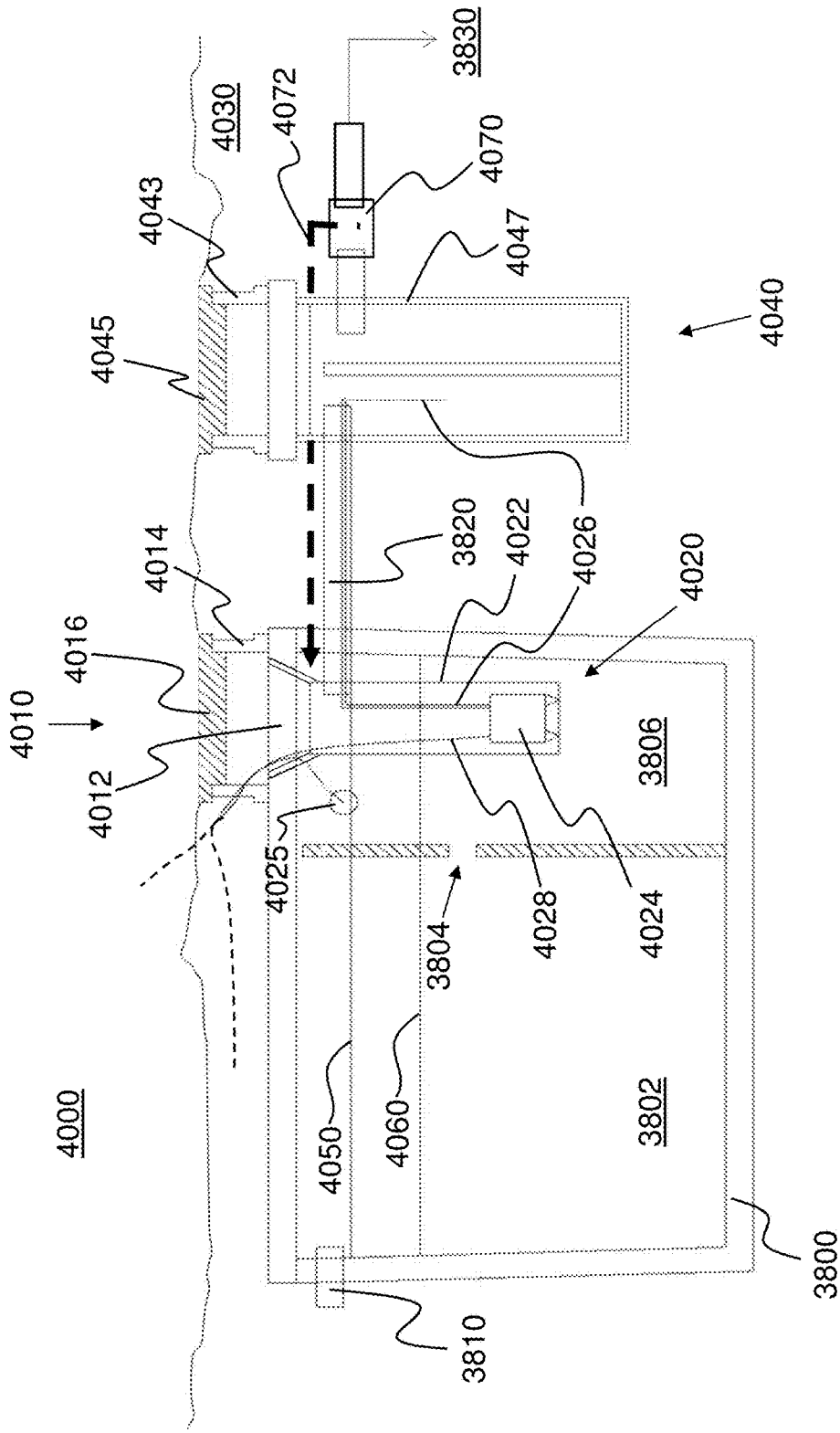
FIG. 40 is a vertical cross-sectional view of an exemplary embodiment of a retrofitted septic tank converted into a continuous duty plant.

As described above, many water treatment systems do not have the capacity to handle large surges of wastewater. One such system is a septic tank. As a result, septic tanks routinely discharge polluted water because output water is discharged at the same rate it enters the system—when input flow exceeds processing capabilities of the septic tank, the polluted water simply exits the tank to pollute the environment. FIG. 40 illustrates one exemplary embodiment of systems and processes for converting a standard septic tank 3800 into a continuous duty plant 4000 having none of the drawbacks of the standard septic tank 3800. This conversion process, in summary, places a pumping sub-assembly in the second stage 3806 of the septic tank 3800 and a multi-stage filtration system (embodiments of which are described herein) downstream of the septic tank 3800 at or within the outlet 3820 and a return conduit connecting the multi-stage filtration back to the septic tank 3800.

Figure 42:
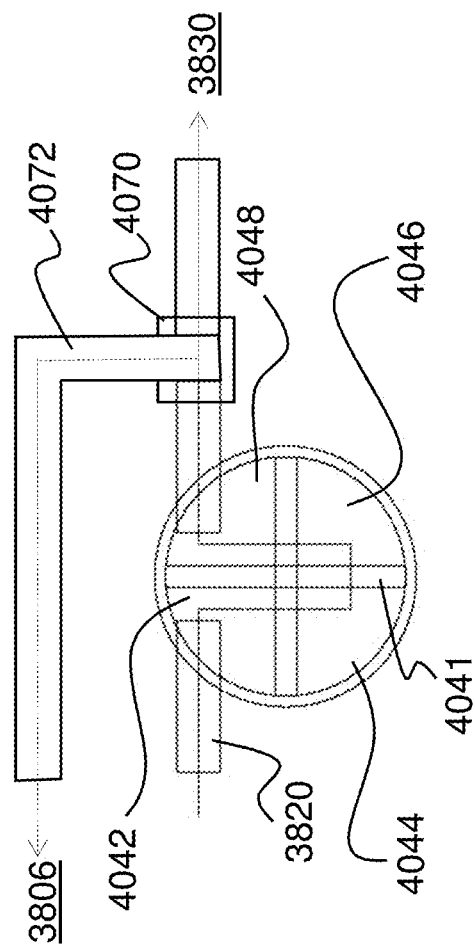
FIG. 42 is a fragmentary, enlarged horizontal cross-sectional view of the multi-stage filtration system of the continuous duty plant of FIG. 40.
Figure 41:
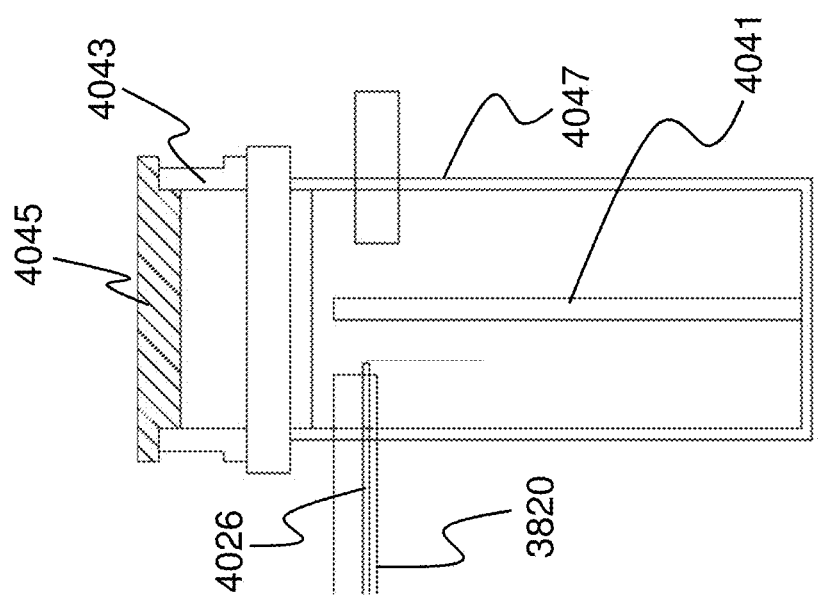
FIG. 41 is a fragmentary, enlarged vertical cross-sectional view of a multi-stage filtration system of the continuous duty plant of FIG. 40.

More specifically, with regard to FIGS. 40 to 42, one exemplary embodiment of a conversion of the septic tank 3800 into the continuous duty plant 4000 starts with creating an access port 4010 into the second stage 3806. This access port 4010 includes a subassembly port 4012, a manhole stub 4014, and a manhole 4016. The subassembly port 4012 provides access into the second stage 3806 of the septic tank 3800. If desired, the shape of the subassembly port 4012 can be made to also serve as a holding orifice retaining a pumping sub-assembly 4020 therein. For example, the subassembly port 4012 can have the shape of an inwardly sloping conical segment or chamfer (as shown) and a top retaining portion of the pumping sub-assembly 4020 can have the shape of an outwardly sloping conical segment that mates with and provides a relatively tight seal with the subassembly port 4012. Another possible exemplary configuration of the subassembly port 4012 is the shape that is shown in FIG. 40 for retaining the manhole 4016 at the manhole stub 4014, i.e., an annular flange at the top of the pumping sub-assembly 4020 and a correspondingly shaped cutout to receive the flange in the top of the septic tank 3800. The manhole stub 4012 can take any shape or form that creates a passage from above the ground 4030 where the septic tank 3800 is buried into the second stage 3806 through the subassembly port 4012. Similarly, the manhole 4016 can take any shape that is able to seal the top of the manhole stub 4014 to prevent unauthorized entry (or to make it difficult for entry by unauthorized repair personnel and to prevent, as much as possible, smells from passing out of the septic tank 3800.

The pumping sub-assembly 4020 is configured to make a fluid-tight seal with the outlet 3820 of the septic tank 3800, in an exemplary embodiment, and to have a low portion continuously submerged in the water of the second stage 3806. In this exemplary embodiment, the pumping sub-assembly 4020 has an outer shell 4022 that can be of any shape, for example, circular, square, pentagonal hexagonal, heptagonal, or octagonal. If desired, the outer shell 4022 of the pumping sub-assembly 4020 can have a sealed top so that, when placed within the subassembly port 4012, a fluid-tight or airtight seal is established. At an upper portion, the pumping sub-assembly 4020 has a fitting that is configured to seal against the outlet 3820 so that effluent can only exit into the outlet 3820 from inside the shell 4022.

Contained within the hollow outer shell 4022 is an effluent pump and an aeration pump, which in this exemplary embodiment takes the form of a single air/water pumping structure 4024, but which can also be two separate structures. If the outer shell 4022 has solid lateral walls and bottom surface that is grated, or even entirely absent but with a device that retains the pumping structure 4024 positioned at the bottom orifice (e.g., as shown), then effluent from the second stage 3806 can only enter the pumping structure 4024 from that bottom orifice. With the pumping structure 4024 having an inflow at the bottom thereof and an outflow at the top thereof, when the water pumping function of the pumping structure 4024 is engaged, effluent from the second stage 3806 will fill the cavity of the outer shell 4022 above the pumping structure 4024 until it reaches the outlet 3820, at which time all pumped effluent will exit the orifice of the outlet 3820.

As will be discussed below, a multi-stage filtration system 4040 that is separate from the septic tank 3800 and is disposed between the septic tank 3800 and the drain field 3830 has a requirement for aeration. Such aeration is provided by the aerating function of the pumping structure 4024. An aeration hose 4026 extends from the outlet of the pumping structure 4024, through the outlet 3820, and into the multi-stage filtration system 4040. Power for the pumping structure 4024 is supplied through a supply cord 4028 that runs out of the outer shell 4022, through the subassembly port 4012 and out through either the manhole stub 4014 or the manhole 4016. For safety reasons, it is desirable to have the electric power supply run out through the manhole stub 4014 and to the household mains through the ground 4030. The supply cord 4028 can also contain a snorkel that supplies fresh air to the pumping structure 4024 for aerating the multi-stage filtration system 4040. To prevent fumes from exiting out of the septic tank 3800 through the snorkel, a non-illustrated back-flow prevention device can be disposed therein.

Water pumping into the drain field 3830 is controlled by a detector that senses the water level in the septic tank 3800. In one exemplary embodiment, the detector 4025 is a float valve. Other water-level detection embodiments are equally possible, such as conductance or resistance detection devices that are placed on the outside of the outer shell 4022. When the water level is at a desired lowest level 4060 in the second stage 3806 (and, therefore, in the entire septic tank 3800 due to the intermediate communicating port 3804), pumping effluent into the drain field 3830 is not desired. In contrast, when the water level is at a preset highest level 4050 in the second stage 3806 (or even at a level that is simply higher than the lowest level 4060), pumping effluent into the drain field 3830 is desired. In order to effect this control, an outflow T-valve 4070 is disposed at the outflow of the multi-stage filtration system 4040. The outflow T-valve 4070 is controlled dependent upon the detector 4025 to either divert effluent from the multi-stage filtration system 4040 to the drain field 3830 (when the level is higher than the lowest level 4060) or to divert effluent from the multi-stage filtration system 4040 back into to the second stage 3806 (when the level is at the lowest level 4060). To carry out the latter, a back-flow conduit 4072 connects the output of the multi-stage filtration system 4040 to the interior of the second stage 3806, which is designated in FIG. 40 diagrammatically with a dashed line.

The multi-stage filtration system 4040 is a retrofitting filtering portion of the continuous duty plant 4000. As in the other exemplary embodiments of filters described herein, the multi-stage filtration system 4040 has various filtration stages. One exemplary embodiment of the multi-stage filtration system 4040 includes a fluidized-bed aerobic filter 4042, a fluidized-bed anaerobic filter 4044, a Phosphorous filter 4046, and an optional filter element 4048 for sterilization, hormones etc. The aerobic filter 4042 and anaerobic filter 4044 can be any other attached-film type bioreactor that uses a membrane, packed-bed, or other biomedia to harbor the bacteria. The flow rates and nutrient loading of wastewater in a septic tank is low enough that these types of biofilters can be effective and be small enough to fit in the canister. Each of these filtration stages are created within a single canister by a set of baffles 4041 (similar to the embodiments of FIGS. 14 and 19) instead of being separate structures as shown, for example, in FIGS. 4 and 11. The first and second stages 4042, 4044 can, for example, be micro-scale fluidized-bed filters. This exemplary configuration provides many advantages over a standard septic tank 3800. The multi-stage filtration system 4040 augments and significantly increases the capacity of a standard septic tank 3800. The multi-stage filtration system 4040 introduces aerobic processing to remove nitrogen. One stage of the multi-stage filtration system 4040 removes Phosphorous and other toxins. Significantly, the wastewater is processed at a constant (optimal) rate, instead of in boluses that have the ability to overload the system. Thus, this system is provided with a significant surge protection capacity. Bacteria are sloughed off from multi-stage filtration system 4040 and enter and revitalize this drain field. The system is easy to maintain through manhole covers (one of which is vented to allow air intake for aerobic filter). Finally, the biofilter chambers are removable cartridges that are able to provide many different filter combinations and are easy to replace.

The upper portion of the multi-stage filtration system 4040 that connects with the environment above the septic tank 3800 can be similar to the sub-system above the pumping sub-assembly 4020 on the septic tank 3800. If the two environmental connections are identical in size and shape, manufacturing time and cost for these parts can be reduced because they are modular. In particular, the upper portion of the multi-stage filtration system 4040 includes a manhole stub 4043 and a manhole 4045. The manhole stub 4043 can be integral with the outer casing 4047 or it can be secured thereto. The aeration hose 4026 enters the multi-stage filtration system 4040 through the outlet 3830 and extends into the aerobic stage 4044, where air is supplied to appropriate filter media. Each of the four stages 4042, 4044, 4046, 4048 can provide a different filtering function, including, for example, sterilization by ultraviolet radiation. In an exemplary embodiment of the multi-stage filtration system 4040, each of the stages 4042, 4044, 4046, 4048 is a separate, modular, drop-in part that can be replaced easily by a technician by merely opening the manhole 4045.

Operation of the continuous duty plant 4000 is now explained. With the subassembly port 4012, manhole stub 4014, and manhole 4016 added to the septic tank 3800, and with the pumping subassembly 4020 installed as described, the septic tank 3800 fills with waste. The pumping structure 4024 remains on 24/7 in order to operate the multi-stage filtration system 4040. Whether the multi-stage filtration system 4040 will discharge effluent to the drain field 3830 is dependent on the current water level measured by the detector 4025. To start the multi-stage filtration system 4040, the T-valve 4070 is switched to discharge into the drain field until the detector 4025 detects that the water level is at the lower limit 4060. If, for example, waste enters while discharge occurs and the water level does not reach the lower limit 4060, then discharge will be continuous. However, in septic system that typically process 300 gallons per day, this situation is unlikely. Pumping out enough water to reach a lower water mark 4060 creates a sump capacity in the septic tank 3800 to handle any large volume surges that occur. For example, if the septic tank 3800 is able to hold 1,000 gallons (illustrated with the high water mark 4050), the sump capacity of 300 gallons is created by setting the lower limit 4060 to be equal to the level after 300 is pumped out of the second stage 3806. When the lower limit 4060 is reached, the T-valve 4070 switches over to route any further effluent pumped through the multi-stage filtration system 4040 back through the back-flow conduit 4072. In this manner, the multi-stage filtration system 4040 can be run to continuously filter all of the water in the second stage 3806 until additional waste enters the first stage 3802 and causes the detector 4025 to switch the T-valve 4070 to discharge into the drain field 3830.

With the exemplary embodiments described, a standard septic tank 3800 can be converted from plug-flow operation into a continuous duty plant 4000 that provides the same output 24/7 running continuously at a fixed rate and discharging only in small amounts, never discharging unprocessed or unfiltered effluent. Even though communication lines that exist between the detector 4025, the pumping structure 4024, and the T-valve 4070 are not shown, they are understood as traversing amongst these sections in ways known to those of skill in the art. The continuous duty plant 4000 can be outfitted with sensors anywhere in the system. As there is a power supply cord 4028 traversing outside the septic tank 3800, combining this with a communications line that can connect to the Internet, for example, is now made possible. The communication capability turns the continuous duty plant 4000 into a virtual private utility because these sensors can measure parameters including flow rate into system, flow rate out of system, motor activity, motor logging, and condition of cartridge elements. Data regarding any element of the continuous duty plant 4000 can be stored in memory cell that is transmitted to a central server, for example, where a utility company can manage the wastewater of these rural entities and then charge the customer. The continuous duty plant 4000 is also able to provide an effective solution to failed septic tanks that is low-cost. The continuous duty plant 4000 improves even fully functional septic tanks by addressing nutrient and toxin remediation.

Significantly, where septic tanks 3800 previously could not be monitored in any way prior to the inventions described herein, the multi-stage filtration system 4040 allows any utility to monitor exactly how much effluent is discharged into the drain field 3830 so that the utility can charge the customer and, thereby, recoup the cost, for example, of subsidizing or entirely paying for the described retrofit to the septic tank 3800. As each cartridge can be monitored for through flow, for example, by gallons or time, signals can be sent (for example, over the internet) to the utility to change any of the cartridges in the multi-stage filtration system 4040. Similarly, if any of the cartridges are clogged, the multi-stage filtration system 4040 can signal to the utility to replace the particular clogged cartridge. It is significant that the multi-stage filtration system 4040 further processes the waste from the septic tank 3800 before it is sent to drain field 3830, thereby discharging effluent that is much less harmful than what was discharged prior to the retrofit.

Solid filtration takes place in the first chamber 3802 of the septic tank. It is noted that the inlet 3804 to the second chamber 3806 is below the lower water line 4060. In this configuration, therefore, all of the solid material that is heavy will settle to the bottom of the first chamber 3802 and all of the solids that float will be confined in the first chamber 3802. In fact, a scum layer forms in the first chamber 3802 that harbors bacteria that assist in the decomposition of waste and solids like paper. Periodically, septic tanks must be pumped out to clear out accumulated debris and non-biodegradable solids are removed.

Figure 43:
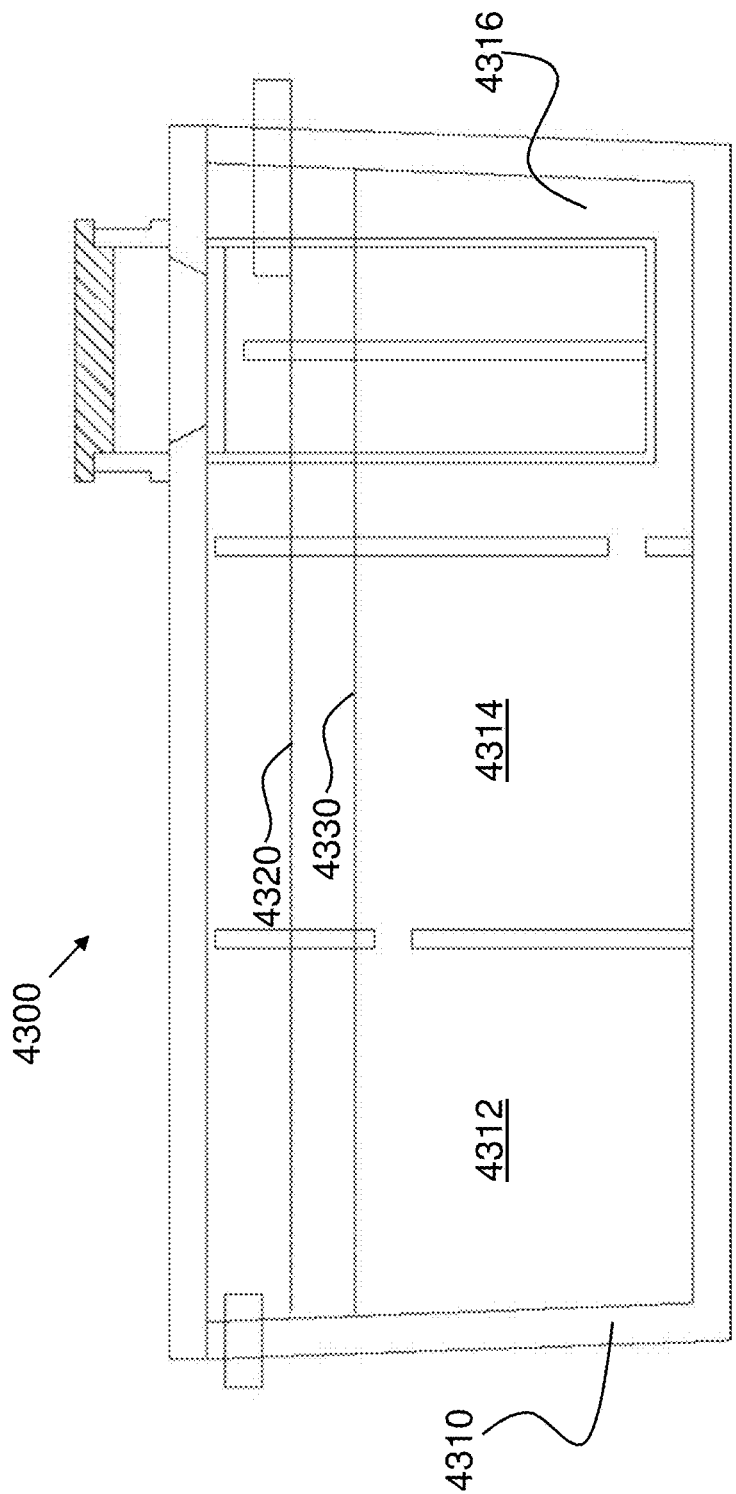
FIG. 43 is a vertical cross-sectional view of an exemplary embodiment of a continuous duty septic tank.

An alternative to the retrofitting of the septic tank 3800 into a continuous duty plant 4000 is shown in FIG. 43, in which an entirely new type of septic/filtration system 4300 is provided. Instead of adding all of the components to the existing septic tank 3800, all of the features are built-in in the septic/filtration system 4300. The tank 4310 of the septic/filtration system 4300 now has three compartments: a solids separation first stage 4312, a settling second stage 4314, and a filtration stage 4316. In this configuration, the multi-stage filtration system 4320 in the filtration stage 4316 is provided with its own sump pump (not illustrated) that continuously runs as described above, but only discharges effluent from the outlet 4320 when the water in the filtration stage 4316 is above the lower limit 4330 and continually discharges while the water in the filtration stage 4316 is at or above the upper limit 4330. This embodiment completely eliminates the requirement to have an external tank for filtration. Most significantly, if the filter capacity is more than sufficient to cover the expected household waste discharge, the actual discharge of hazardous effluent may drop to zero as the discharge may be within legal limits for irrigation, for example, and, thereby, entirely eliminate the requirement to have a drain field at all. Drain fields are very large and costly and elimination of this land-use requirement has significant health, safety, and economic benefits. Water discharged from the system that is below regulatory discharge limits can be used for irrigation when not discharged into the drain field 3830.

Reducing or eliminating the need for a drain field on a property with water wells and septic tanks can dramatically increase the economic value of the property. Some properties are "un-buildable" for residential and commercial applications because the property is either too small or it is otherwise not possible to position the well and septic tank on the lot to meet regulatory requirements. Therefore, property that is otherwise un-buildable can be now be permitted for construction. This is a common problem, particularly with water-front properties that have a relatively high economic value.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A wastewater treatment system, comprising:
   a septic tank having an operating state and a servicing state and defining:
      a primary stage having an input in which effluent is received;
      a secondary stage having an output from which processed effluent is discharged and defining a preset operating limit for the processed effluent; and
      at least one port fluidically connecting the primary stage to the secondary stage;
   an access subassembly providing access at least into the secondary stage from the environment by a user;
   a pumping subassembly disposed in the secondary stage and comprising a liquid pump:
      having a pump inlet fluidically connected to the processed effluent in the secondary stage;
      having a pump outlet; and
      pumping the processed effluent from the pump inlet to the pump outlet continuously during the operating state;
   a filtration system comprising:
      a filter comprising:
         a filter inlet fluidically connected to the pump outlet to receive the pumped processed effluent from the secondary stage;
         a filter output from which filtered effluent exits; and
         at least one removable filter element fluidically connected between the filter inlet and the filter output;
      an output subassembly comprising:
         a system outlet from which the filtered effluent is discharged to the environment;
         a back-flow conduit fluidically connected to the secondary stage and discharging the filtered effluent to the secondary stage; and
         a controllable valve fluidically connected to the filter output, to the system outlet, and to the back-flow conduit and selectively directing the filtered effluent to one of the system outlet and the back-flow conduit; and
   a detector operatively connected to the controllable valve to regulate actuation of the controllable valve to either return filtered effluent to the secondary stage through the back-flow conduit or to discharge filtered effluent to the environment dependent upon a level of the processed effluent within the secondary stage and, responsive to the detector detecting that the level of the processed effluent within the secondary stage is greater than the preset operating limit, the controllable valve continuously discharges the filtered effluent to the environment until the level in the secondary stage is drained down to the preset operating limit, at which time, the controllable valve returns filtered effluent back into the secondary stage through the back-flow conduit.

2. The wastewater treatment system according to claim 1, wherein the septic tank is a continuous duty septic tank disposed underground.

3. The wastewater treatment system according to claim 1, wherein the septic tank is a continuous duty package plant disposed one of above ground and below ground.

4. The wastewater treatment system according to claim 1, wherein the pump inlet is continuously submerged in liquid within the secondary stage.

5. The wastewater treatment system according to claim 1, wherein the liquid pump is at least one of:
a combination effluent and aeration pump;
an effluent pump and a separate air pump; and
an effluent pump and a snorkel passively suppling fresh air to the effluent pump.

6. The wastewater treatment system according to claim 1, wherein the liquid pump is submersed in liquid within the secondary stage.

7. The wastewater treatment system according to claim 1, wherein the detector comprises a float switch having a float defining the level of the effluent within the secondary stage.

8. The wastewater treatment system according to claim 1, wherein the detector is a float switch having a float defining the level of the effluent within both the primary and secondary stages.

9. The wastewater treatment system according to claim 1, wherein:
the filter is a multistage filter comprising at least one of a fluidized-bed aerobic filter portion, a fluidized-bed anaerobic filter portion, a Phosphorous filter portion, and an additional filter element; and
the at least one removable filter element comprises at least one of the fluidized-bed aerobic filter portion, the fluidized-bed anaerobic filter portion, the Phosphorous filter portion, and the additional filter element.

10. The wastewater treatment system according to claim 9, wherein the controllable valve is controlled to circulate effluent from the secondary stage through the multistage filter and through the back-flow conduit at a constant rate.

11. The wastewater treatment system according to claim 10, wherein, responsive to the detector detecting that the level of the effluent within the secondary stage is greater than the preset operating limit, the controllable valve continuously discharges the filtered effluent to the environment until the level in the secondary stage is drained down by a given percentage, at which time, the controllable valve returns filtered effluent back into the secondary stage through the back-flow conduit.

12. The wastewater treatment system according to claim 10, wherein, responsive to the detector detecting that the level of the effluent within the secondary stage is greater than the preset operating limit, the controllable valve continuously discharges the filtered effluent to the environment until the level in the secondary stage is drained down by approximately thirty percent, at which time, the controllable valve returns filtered effluent back into the secondary stage through the back-flow conduit.

13. The wastewater treatment system according to claim 1, wherein the filtration system is external to the septic tank.

14. The wastewater treatment system according to claim 1, wherein the filtration system is disposed within the secondary stage.

15. The wastewater treatment system according to claim 1, wherein the access subassembly and the filtration system are modular and the filtration system is a cartridge that fits within the access subassembly.

16. The wastewater treatment system according to claim 15, wherein the cartridge has a filter capacity sufficiently large enough to allow discharge of liquid therefrom to be dispensed as water suitable for irrigation.

17. The wastewater treatment system according to claim 1, which further comprises a microprocessor controller operating at least the liquid pump, the detector, and the controllable valve, the microprocessor controller being communicatively connected to a central monitoring location through the Internet to supply to the central monitoring location with data related to discharge of effluent through the system outlet for remote monitoring, billing, and service by an operator of the central monitoring location.

18. The wastewater treatment system according to claim 1, wherein the filter comprises an aerobic stage in which air is added to the processed effluent.

19. The wastewater treatment system according to claim 1, wherein the preset operating level is a lower water mark.

* * * * *